Dec. 27, 1938.  B. SASSEN  2,142,061
AUTOMATIC UNIVERSAL PROFILE AND DIE SINKING MACHINE
Original Filed Oct. 8, 1934  17 Sheets-Sheet 1

Inventor
BERNARD SASSEN
By AHK Parsons
Attorney

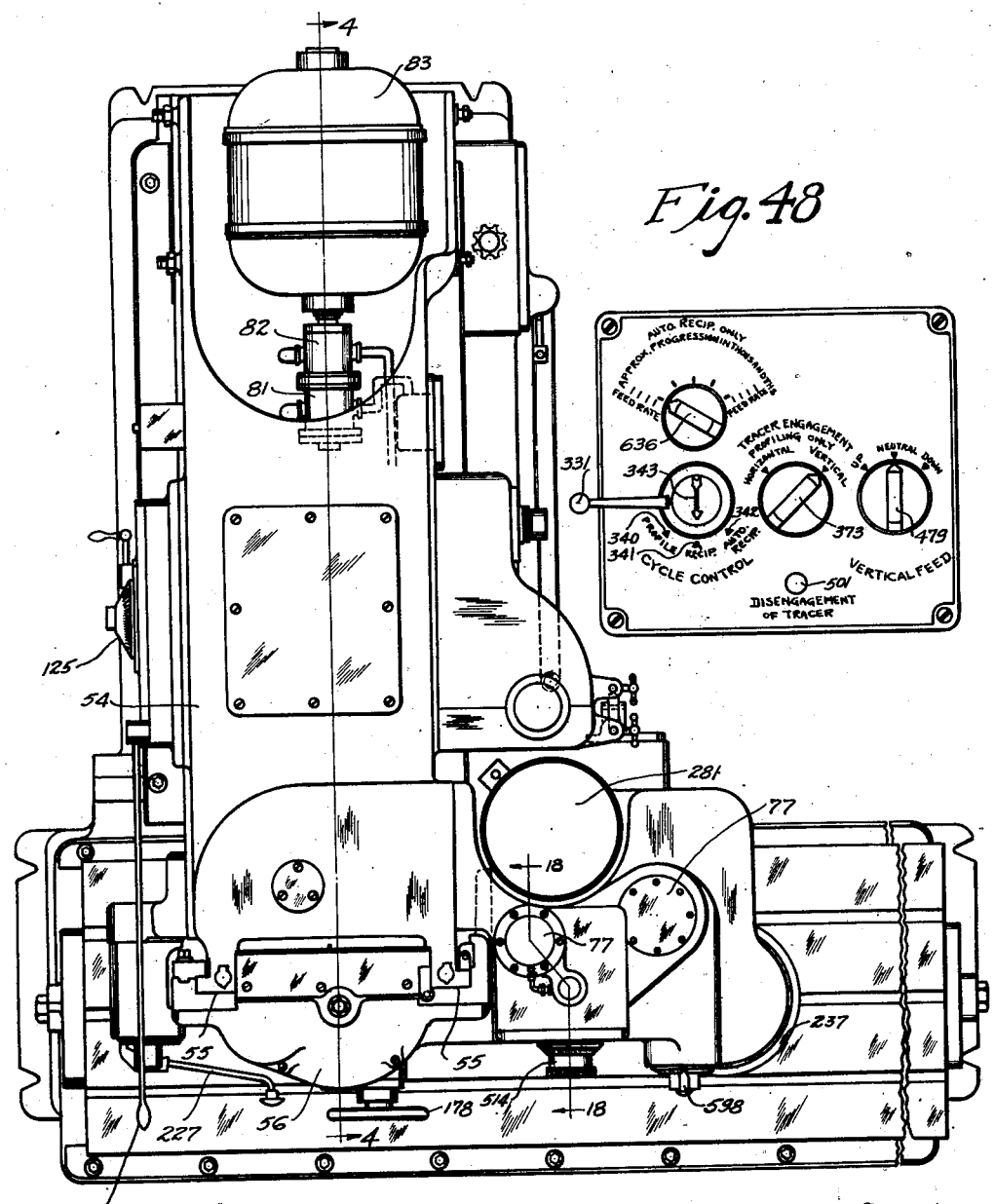

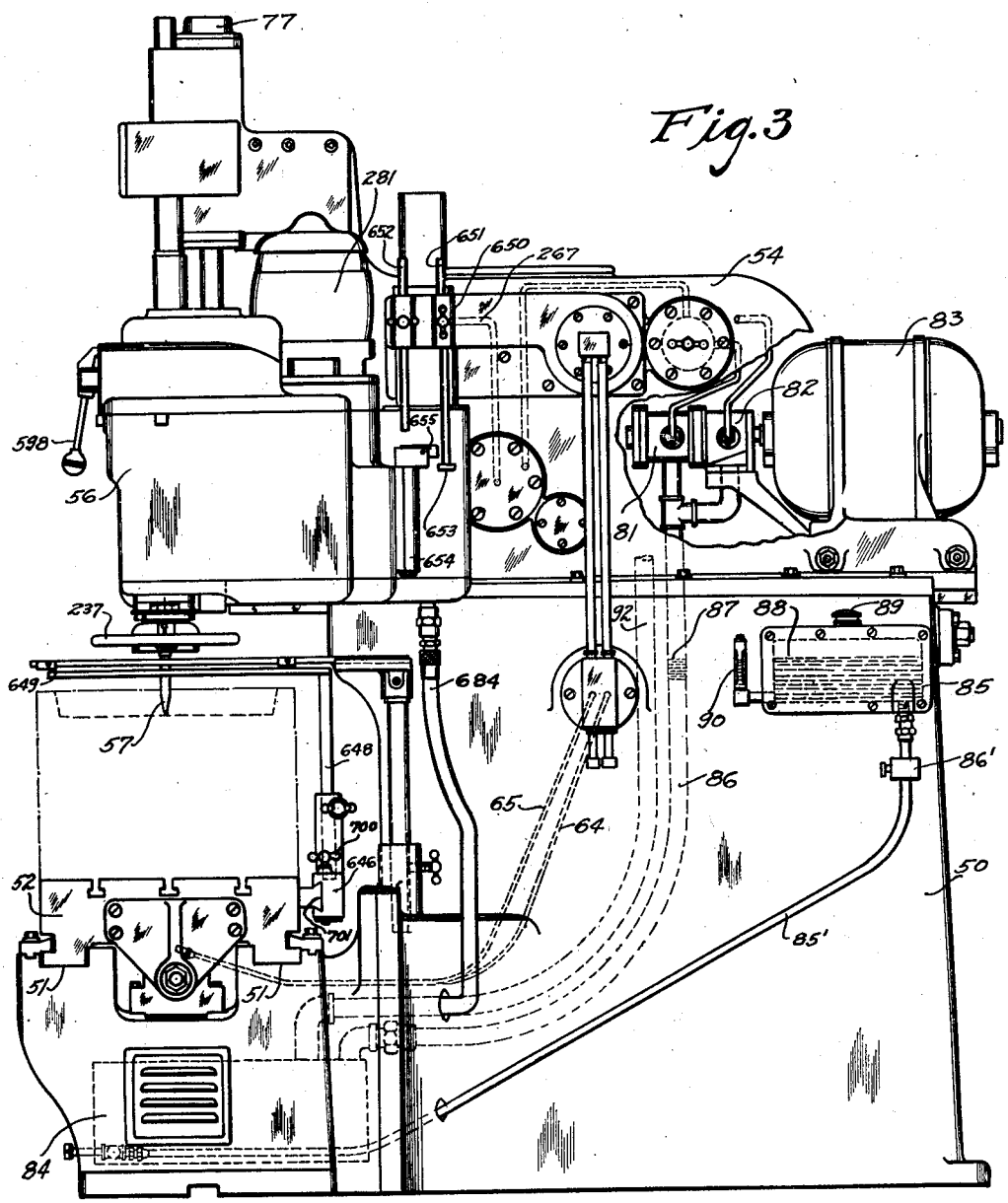

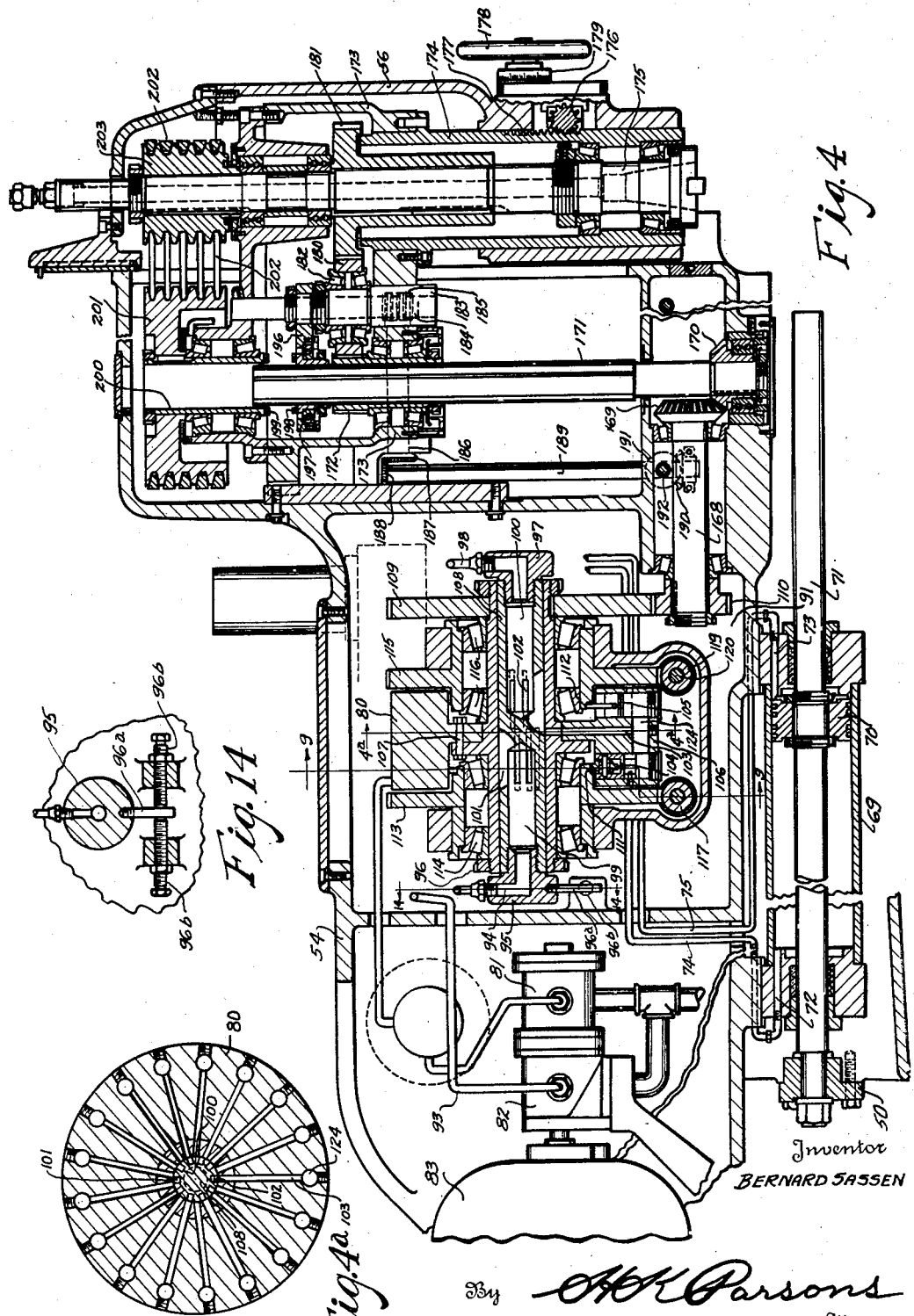

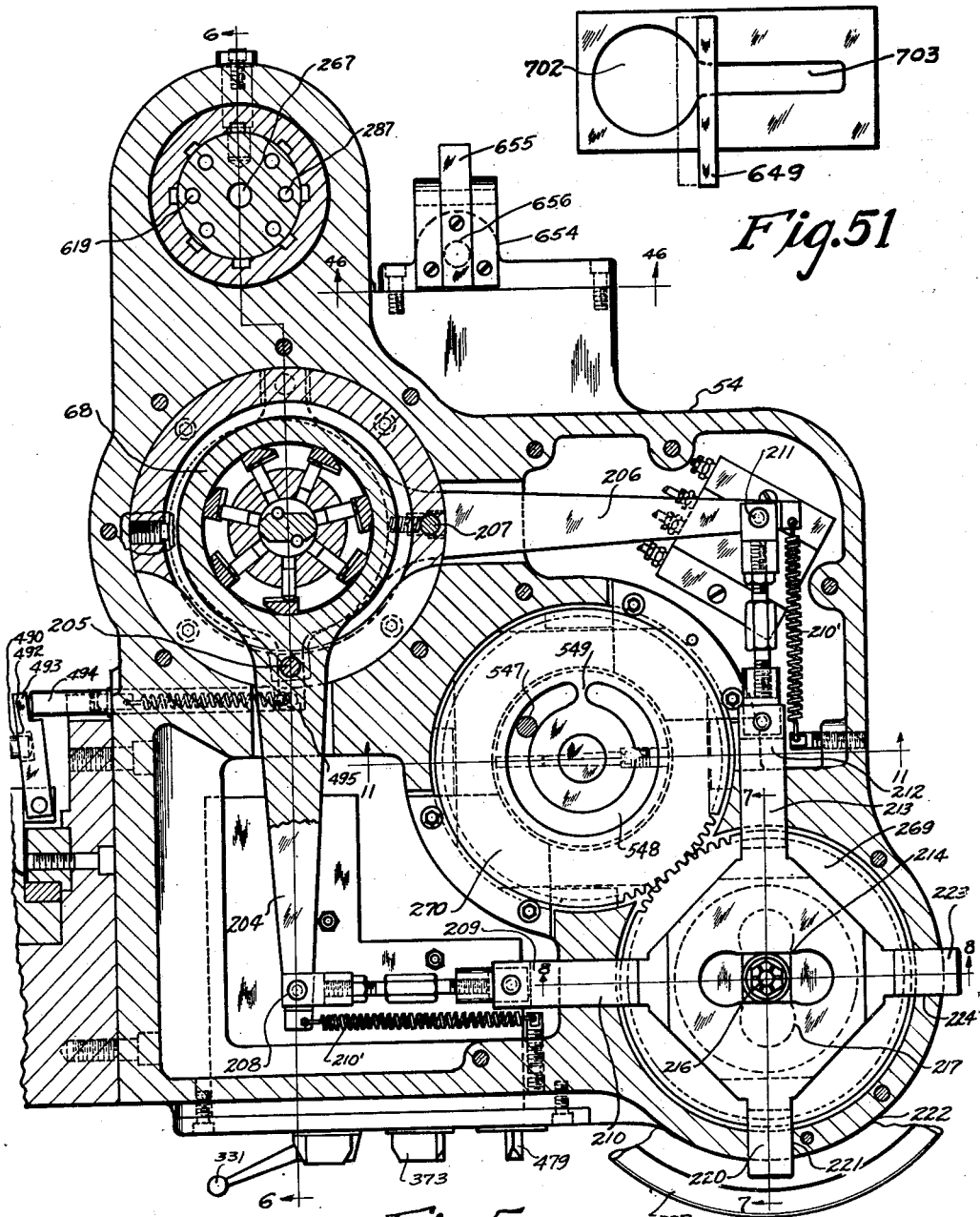

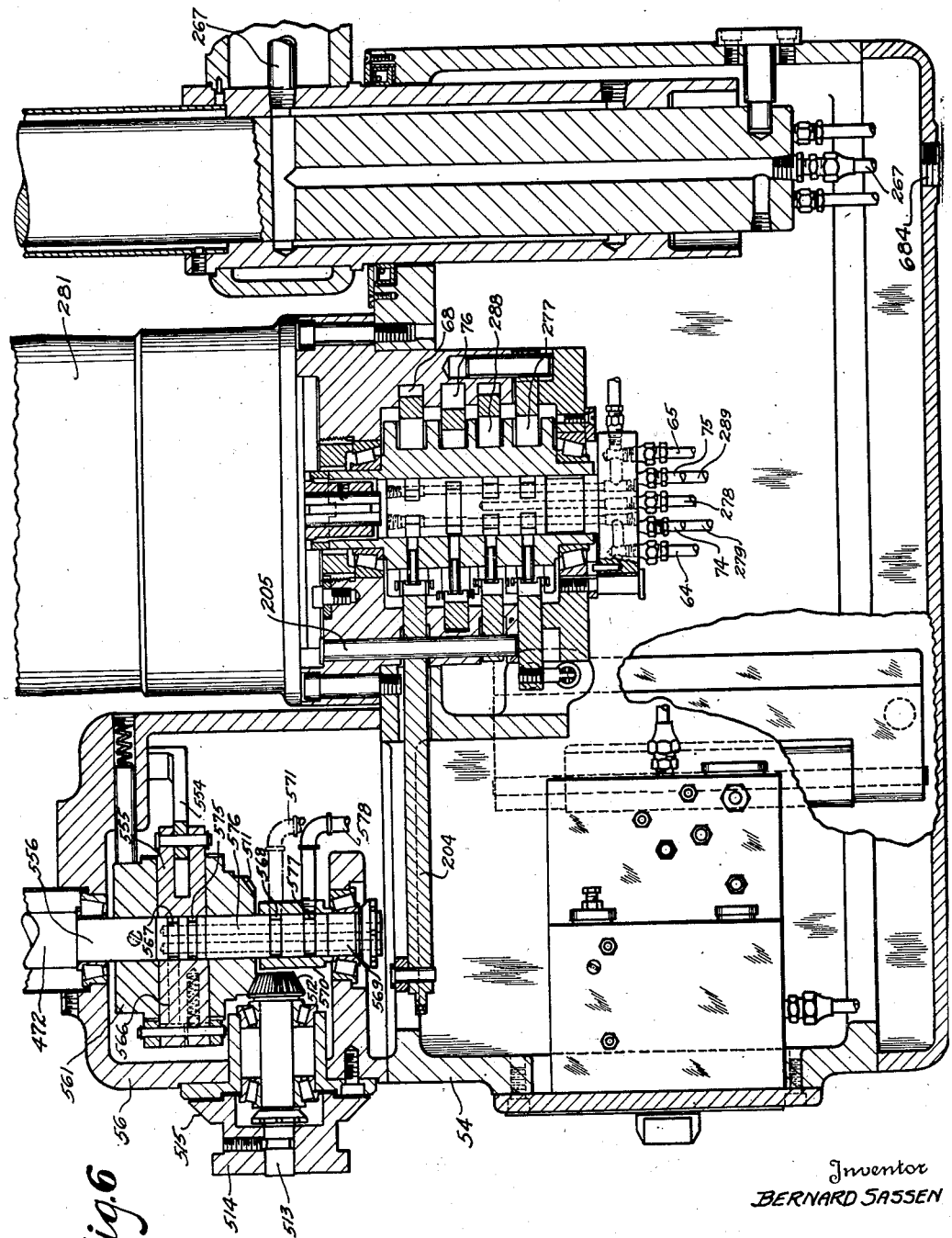

Dec. 27, 1938. B. SASSEN 2,142,061
AUTOMATIC UNIVERSAL PROFILE AND DIE SINKING MACHINE
Original Filed Oct. 8, 1934 17 Sheets-Sheet 7
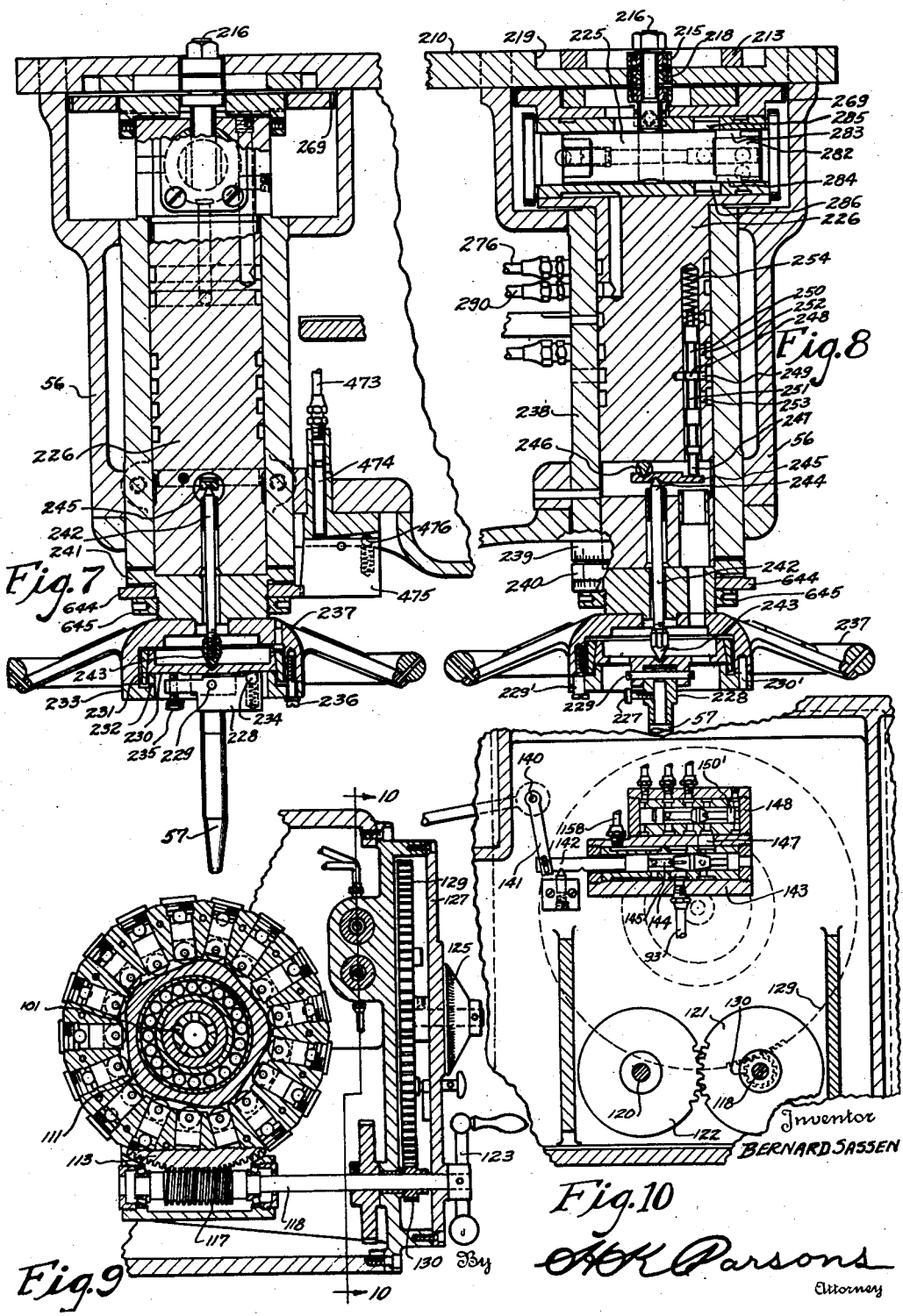

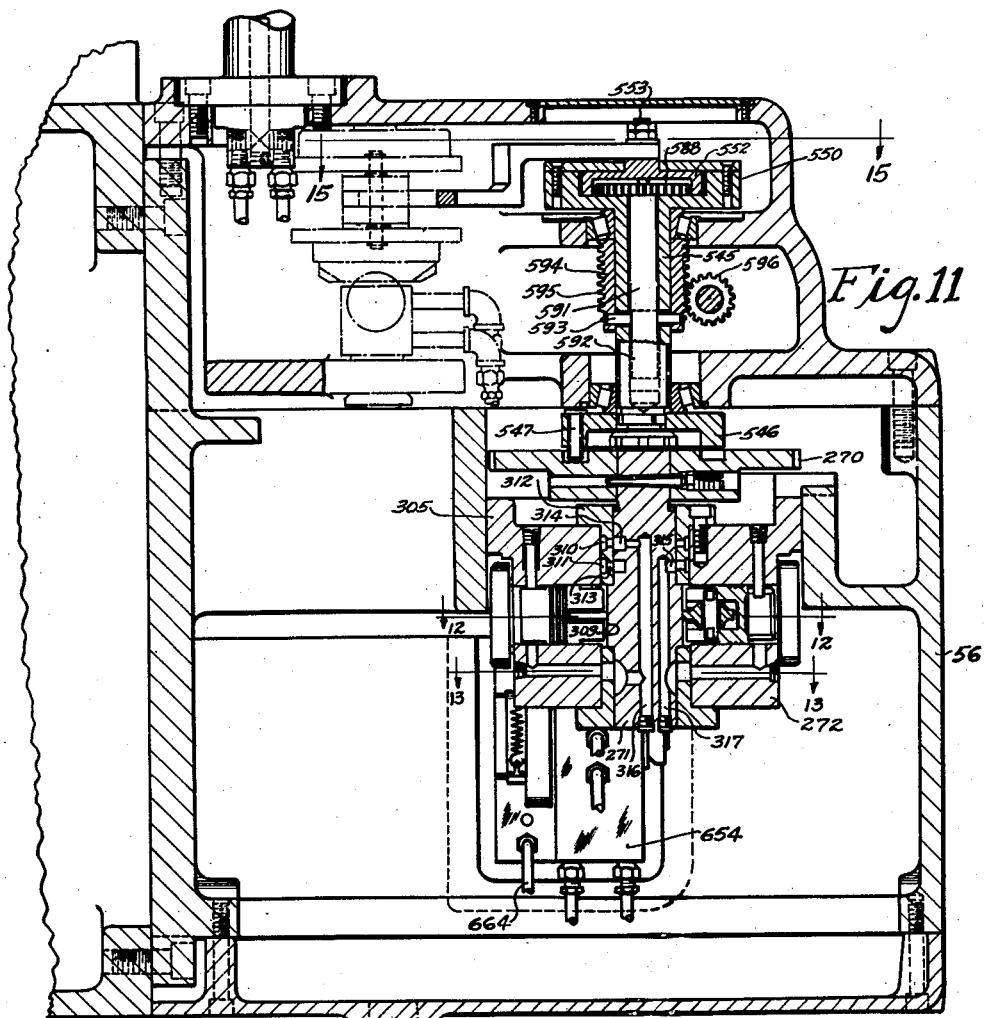
Fig. 11
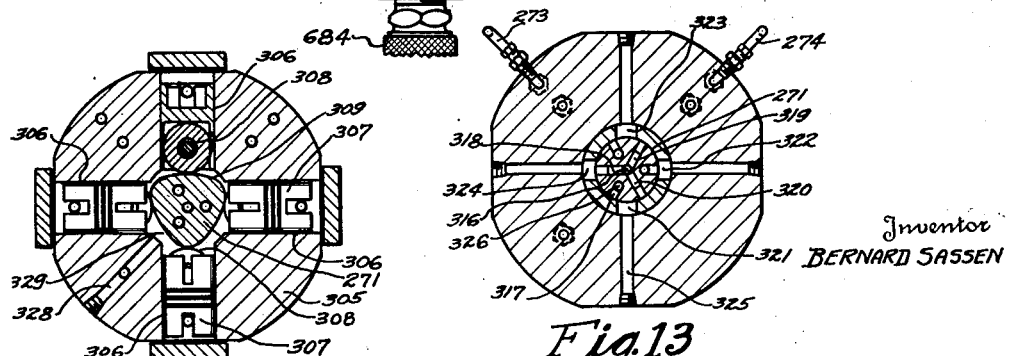
Fig. 12
Fig. 13
Inventor
BERNARD SASSEN
By A.H.K. Parsons
Attorney

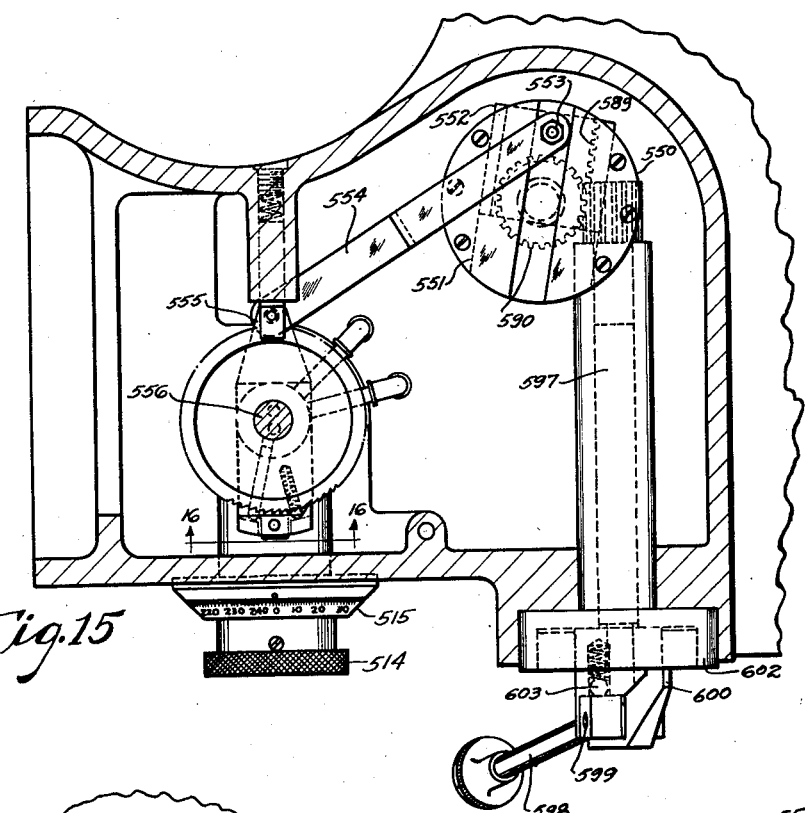
Fig.15
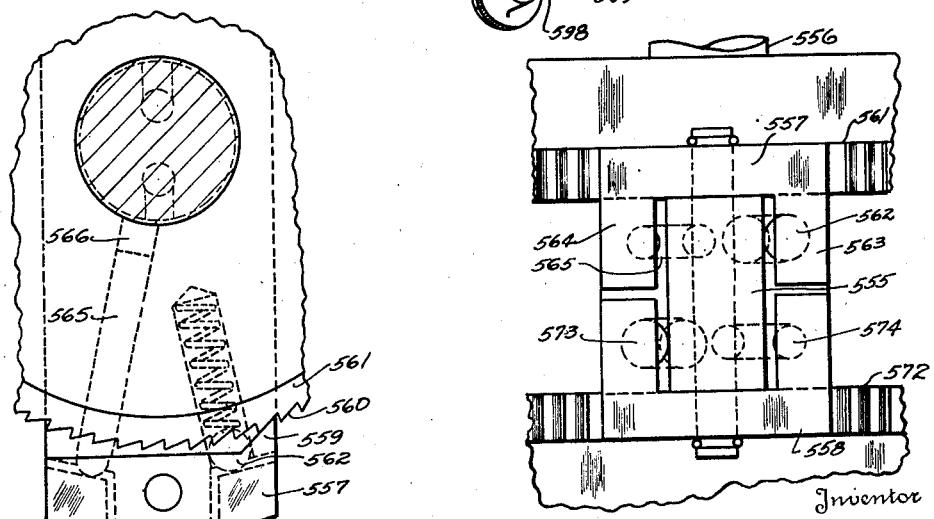
Fig.17
Fig.16
Inventor
BERNARD SASSEN
By A. H. Parsons
Attorney

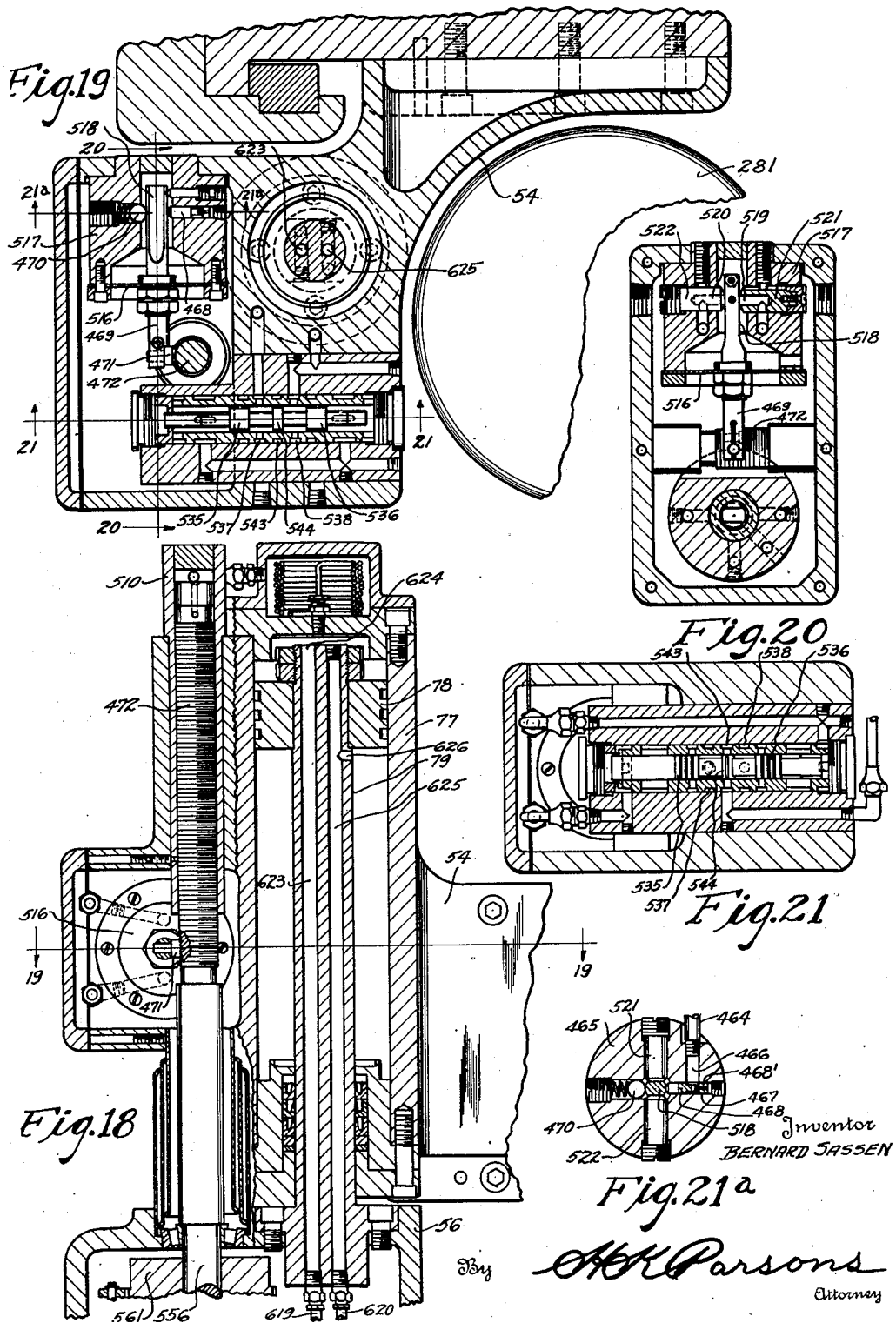

Dec. 27, 1938.  B. SASSEN  2,142,061
AUTOMATIC UNIVERSAL PROFILE AND DIE SINKING MACHINE
Original Filed Oct. 8, 1934   17 Sheets-Sheet 11
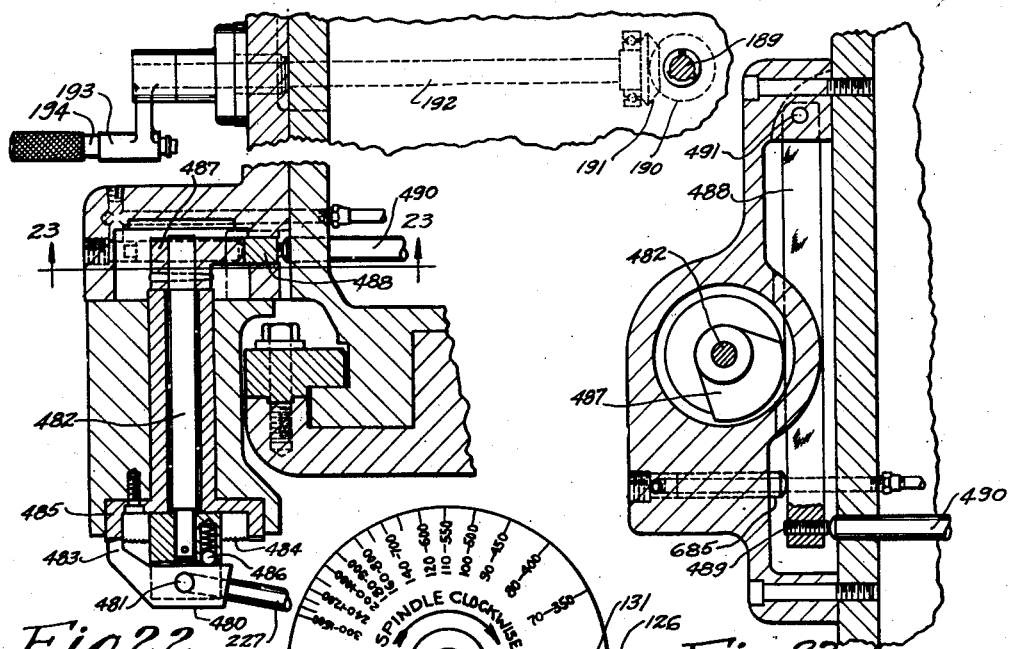
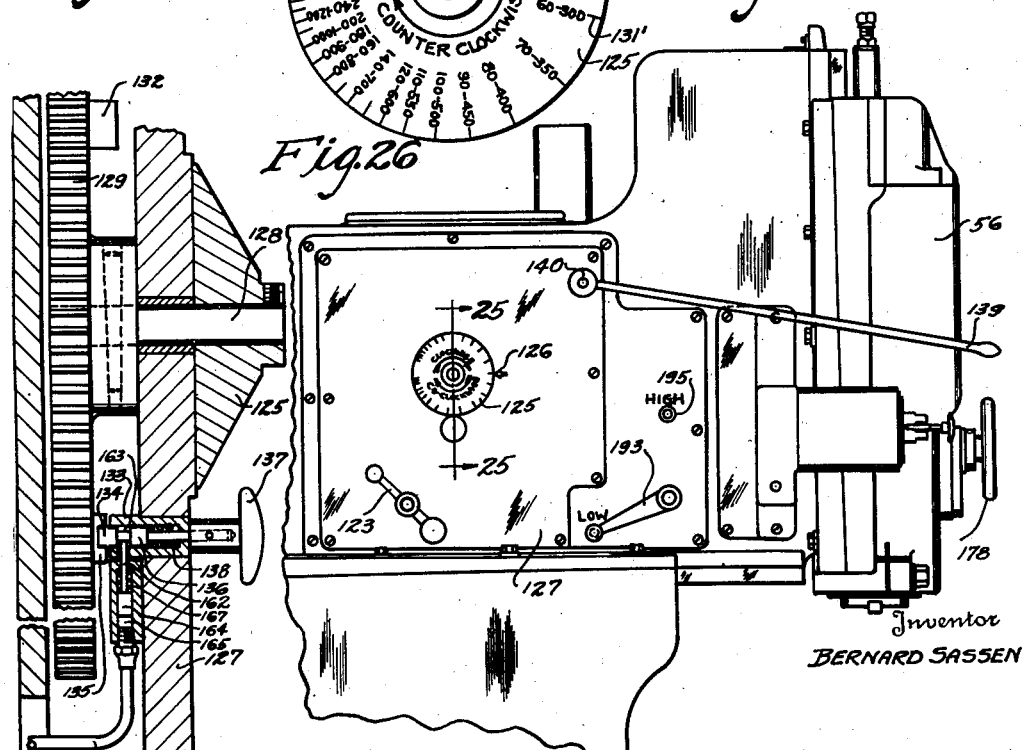
Inventor
BERNARD SASSEN

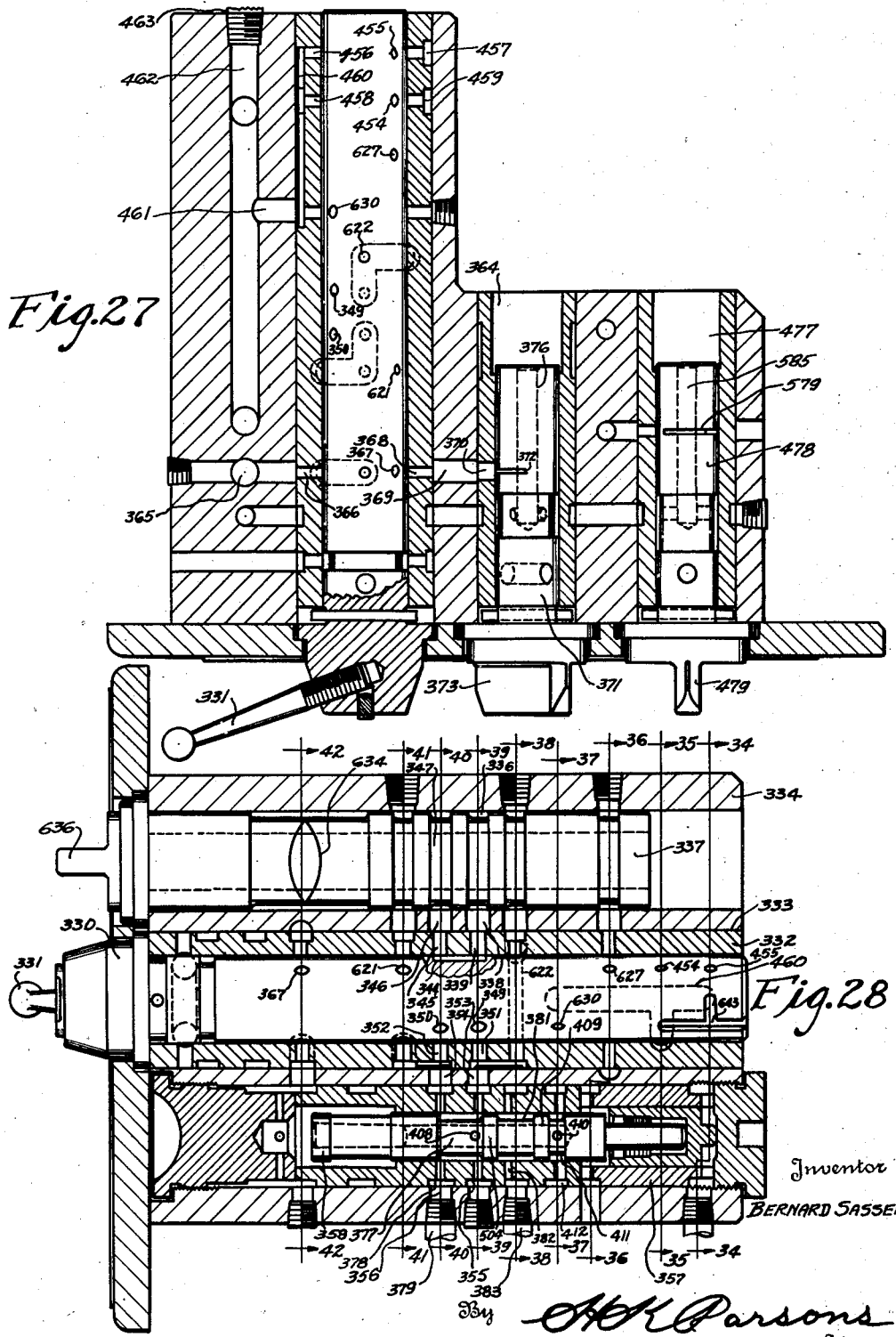

Dec. 27, 1938.  B. SASSEN  2,142,061
AUTOMATIC UNIVERSAL PROFILE AND DIE SINKING MACHINE
Original Filed Oct. 8, 1934   17 Sheets-Sheet 13
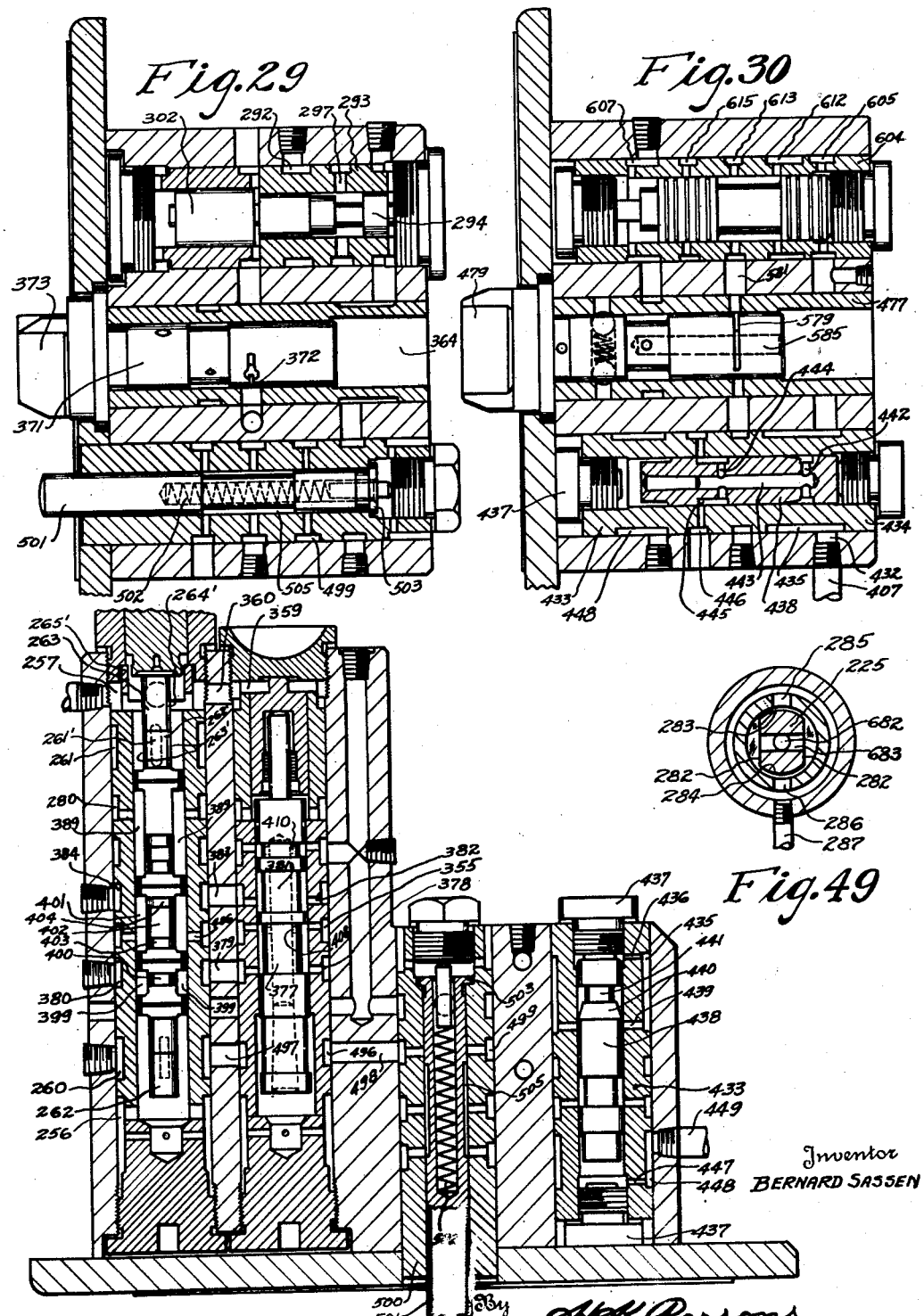
Inventor
BERNARD SASSEN
By A.H.K.Parsons
Attorney Dec. 27, 1938.   B. SASSEN   2,142,061
AUTOMATIC UNIVERSAL PROFILE AND DIE SINKING MACHINE
Original Filed Oct. 8, 1934   17 Sheets-Sheet 14
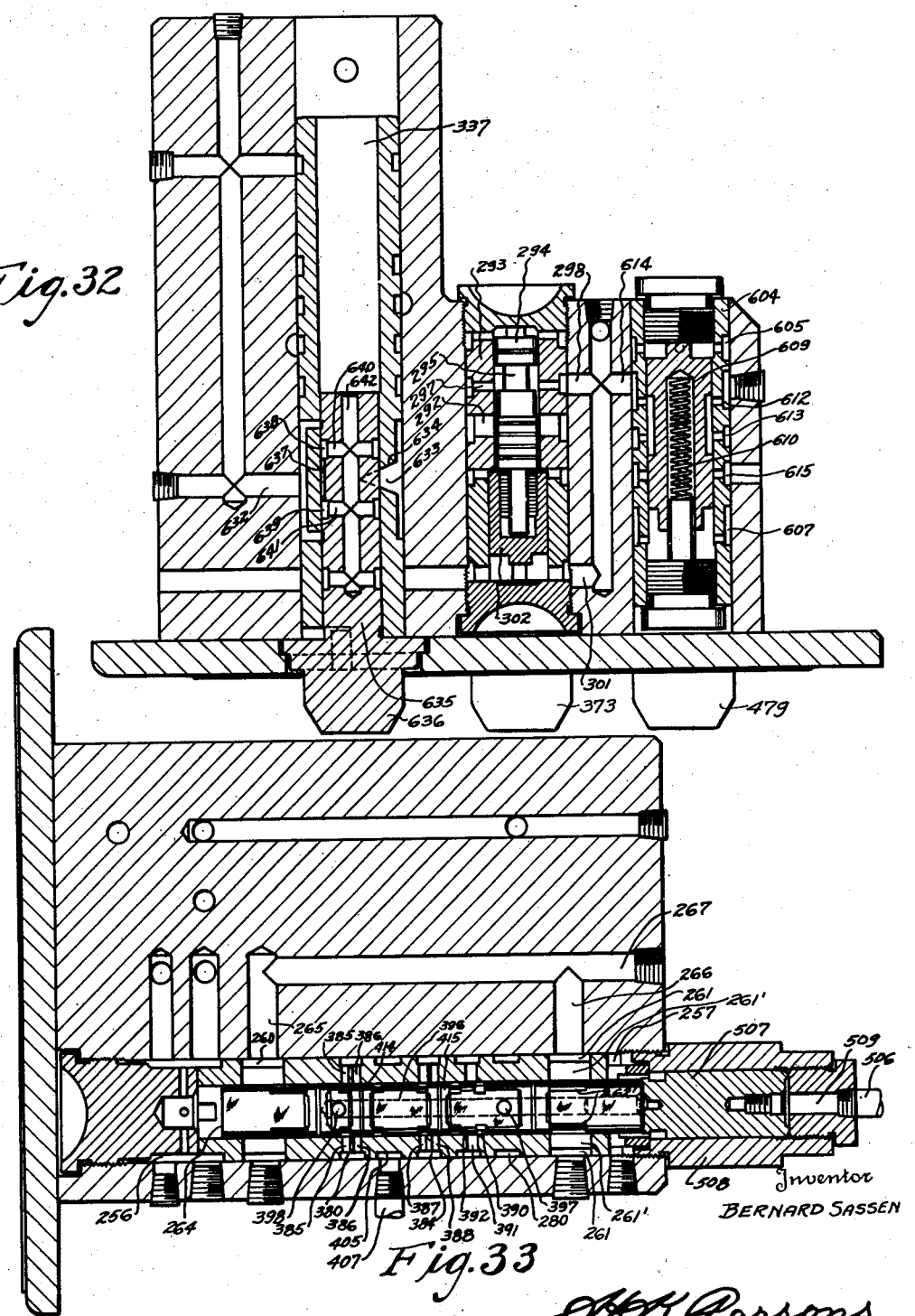

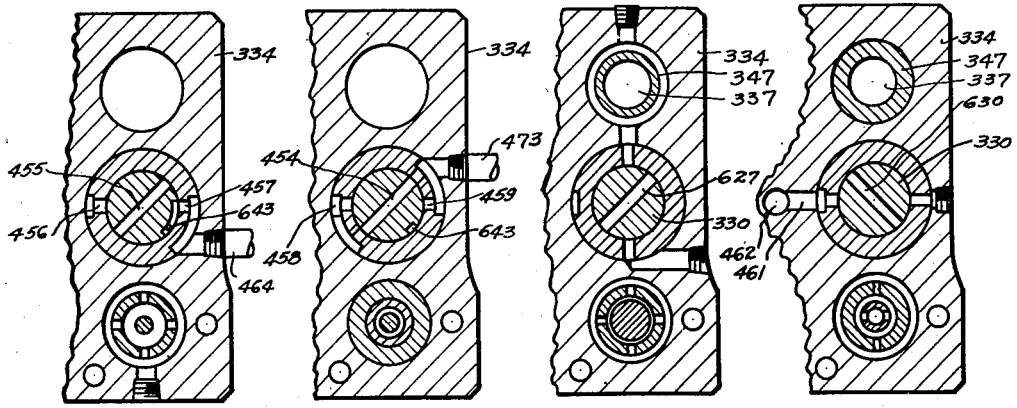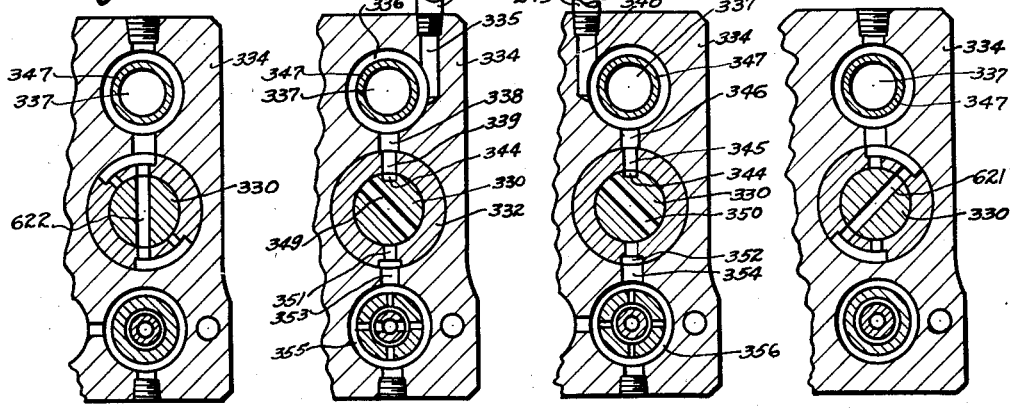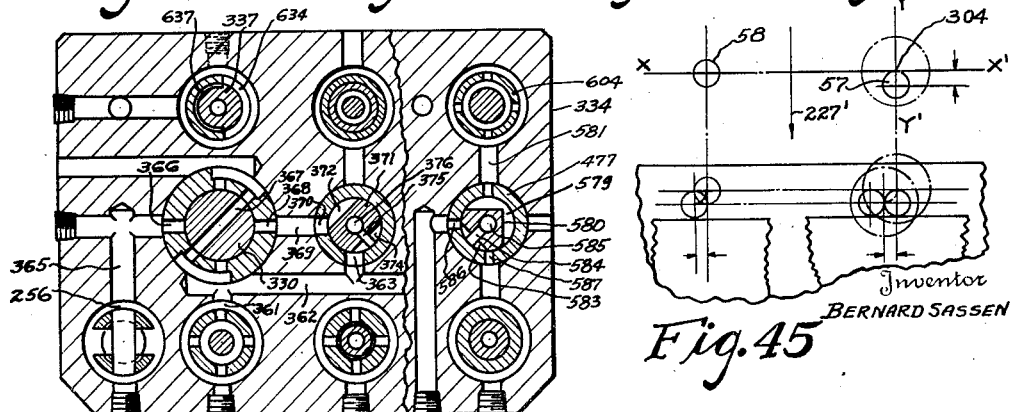

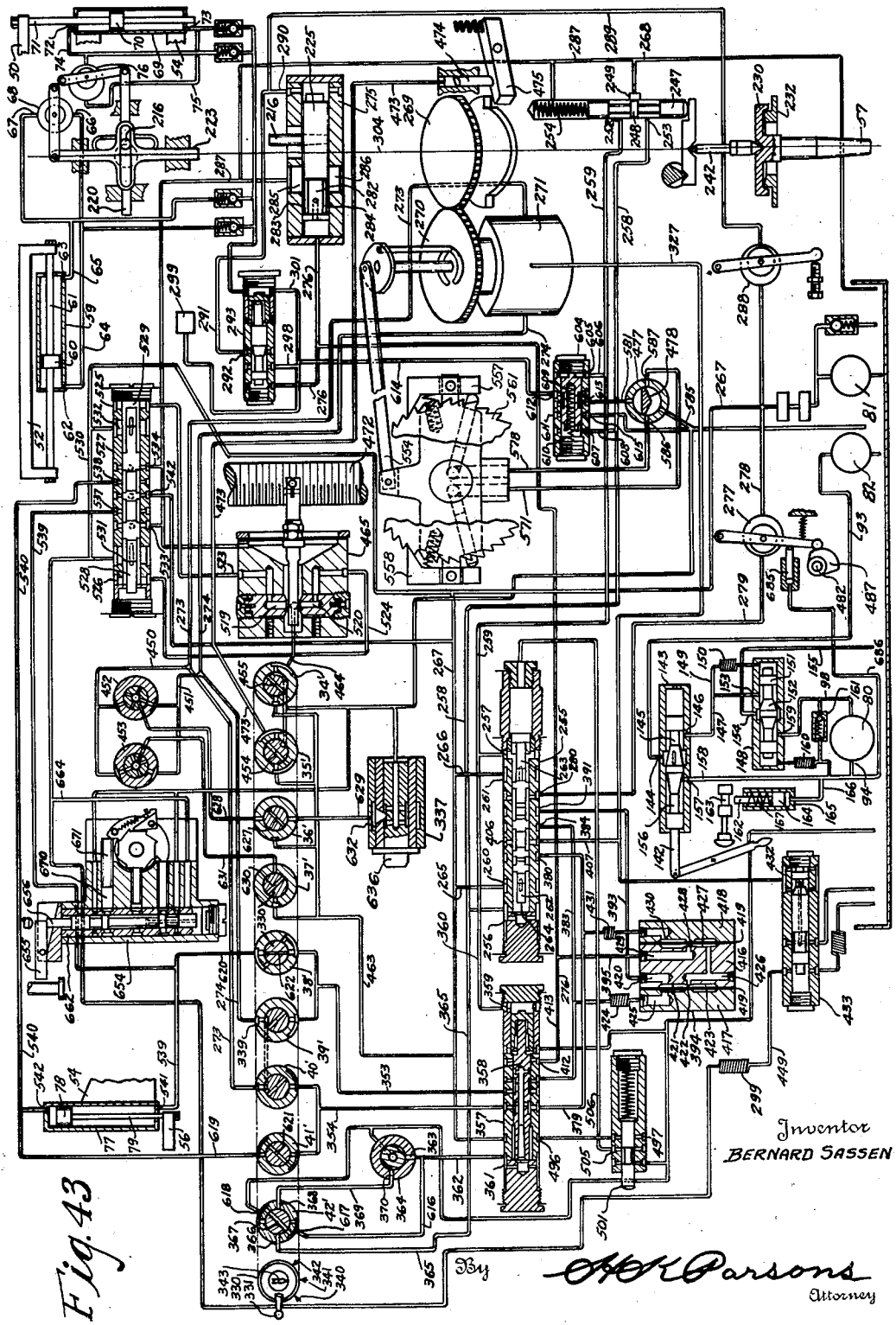

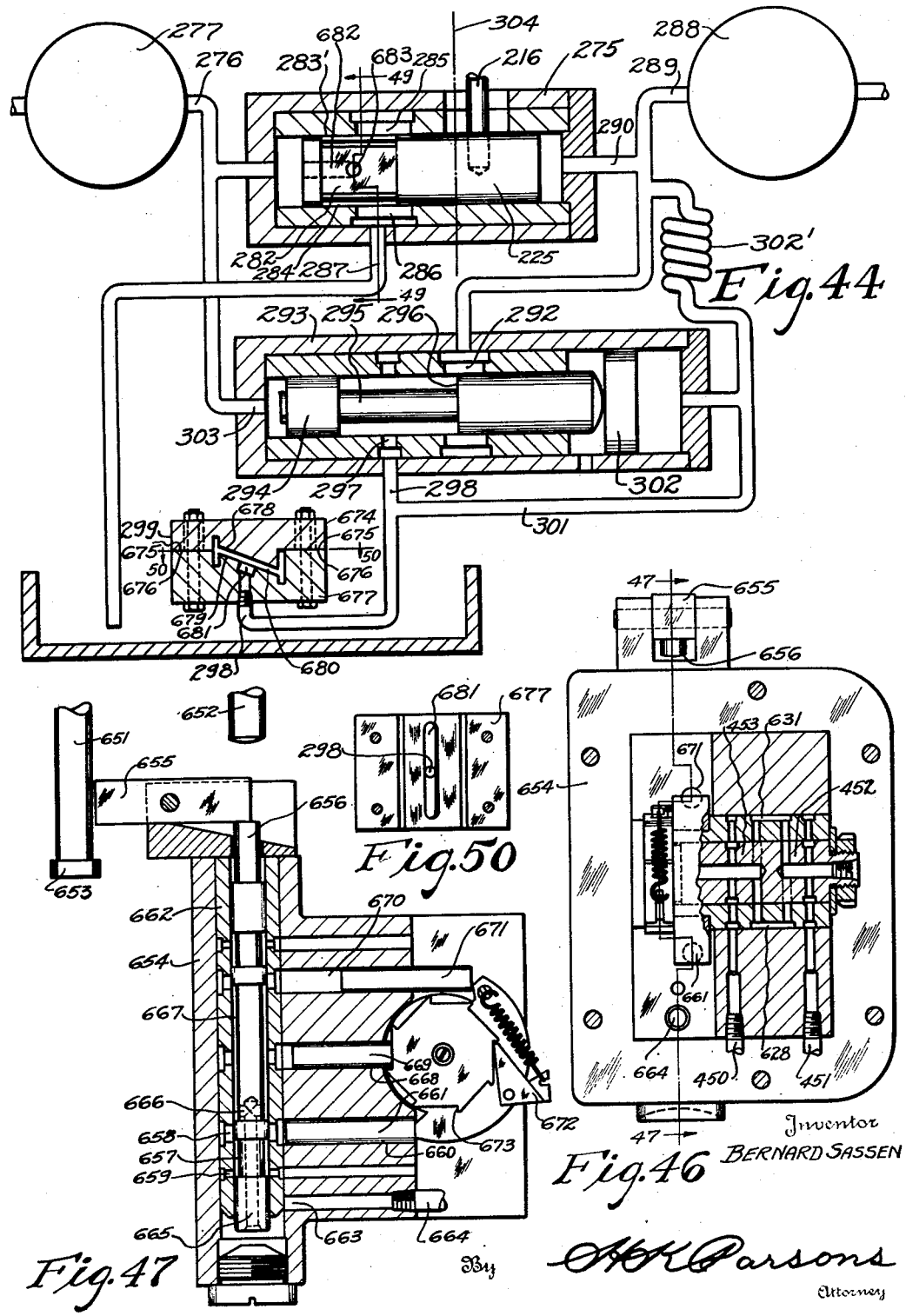

Patented Dec. 27, 1938

2,142,061

UNITED STATES PATENT OFFICE 2,142,061

AUTOMATIC UNIVERSAL PROFILE AND DIE SINKING MACHINE

Bernard Sassen, Cincinnati, Ohio, assignor to The Cincinnati Milling Machine Company, Cincinnati, Ohio, a corporation of Ohio Application October 8, 1934, Serial No. 747,267
Renewed August 19, 1937

100 Claims. (Cl. 90—13.5)

This invention relates to machine tools and more particularly to improvements in pattern controlled milling machines.

Heretofore, pattern controlled machines have been designed more or less in accordance with the class of work to be performed thereon, such as simple profiling machines for outlining work involving only two dimensional movements, and die-sinking machines for routing out dies and the like and involving three dimensional movements.

It is an object of this invention to provide a general purpose pattern controlled machine tool which may be selectively set up to operate under any one of a plurality of methods whereby with a single machine the method most suitable for the work at hand may be utilized.

Another object of this invention is to provide a profiling machine which may be selectively operated for automatic control by a pattern; or manually controlled with or without the assistance of a pattern.

A further object of this invention is to provide a machine of the class described which, for die-sinking purposes, may be selectively operated either by the reciprocating method or the rotary method and under either automatic or manual control.

An additional object of this invention is to provide an improved hydraulically operable mechanism for remotely controlling the position of a part, such as the pump displacement control pendulum.

Other objects of this invention are to improve the accuracy of slide movements, increase the selectivity of cutter spindle speeds, and generally improve the speed and accuracy of operation of the machine.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 2 is a plan view of the machine shown in Figure 1.

Figure 3 is a side elevation of the machine shown in Figure 1 and as viewed from the right of that figure.

Figure 4 is a section on the line 4—4 of Figure 2.

Figure 4A is a detail section on the line 4A—4A of Figure 4.

Figure 5 is a horizontal section on the line 5—5 of Figure 1 showing the variable delivery pump mechanism.

Figure 6 is a vertical section on the line 6—6 of Figure 5 showing more particularly the variable delivery pump block.

Figure 7 is a section through the tracer head on the line 7—7 of Figure 5.

Figure 8 is a similar section taken on the line 8—8 of Figure 5.

Figure 9 is a section on the line 9—9 of Figure 4 showing the variable speed hydraulic unit for the spindle.

Figure 10 is a section on the line 10—10 of Figure 9 showing the start and stop control mechanism for the spindle.

Figure 11 is a section on the line 11—11 of Figure 5 showing the details of the tracer head rotating motor.

Figure 12 is a section on the line 12—12 of Figure 11.

Figure 13 is a section on the line 13—13 of Figure 11.

Figure 14 is a detail section on the line 14—14 of Figure 4.

Figure 15 is a section on the line 15—15 of Figure 11.

Figure 16 is an enlarged detail of the ratchet pawl as viewed on the line 16—16 of Figure 15.

Figure 17 is an enlarged detail of a portion of Figure 14 showing the relative position of the ratchet pawl control plunger.

Figure 18 is a section through the vertical ram operating cylinder as viewed on the line 18—18 of Figure 2.

Figure 19 is a detail section on the line 19—19 of Figure 18.

Figure 20 is a section on the line 20—20 of Figure 19.

Figure 21 is a section on the line 21—21 of Figure 19.

Figure 21A is a section on the line 21A—21A of Figure 19.

Figure 22 is a detail section on the line 22—22 of Figure 1 showing the details of the feed rate control mechanism.

Figure 23 is a section on the line 23—23 of Figure 22.

Figure 24 is a partial side elevation of the machine shown in Figure 1 as viewed from the left of that figure.

Figure 25 is an enlarged detail section as viewed on line 25—25 of Figure 24.

Figure 26 is an enlarged view of the spindle rate dial.

Figure 27 is a horizontal section through the main valve control block as viewed on the line 27—27 of Figure 1.

Figure 28 is a section on the line 28—28 of Figure 1.

Figure 29 is a section on the line 29—29 of Figure 1.

Figure 30 is a section on the line 30—30 of Figure 1.

Figure 31 is a section on the line 31—31 of Figure 1.

Figure 32 is a section on the line 32—32 of Figure 1.

Figure 33 is a section on the line 33—33 of Figure 1.

Figure 1:
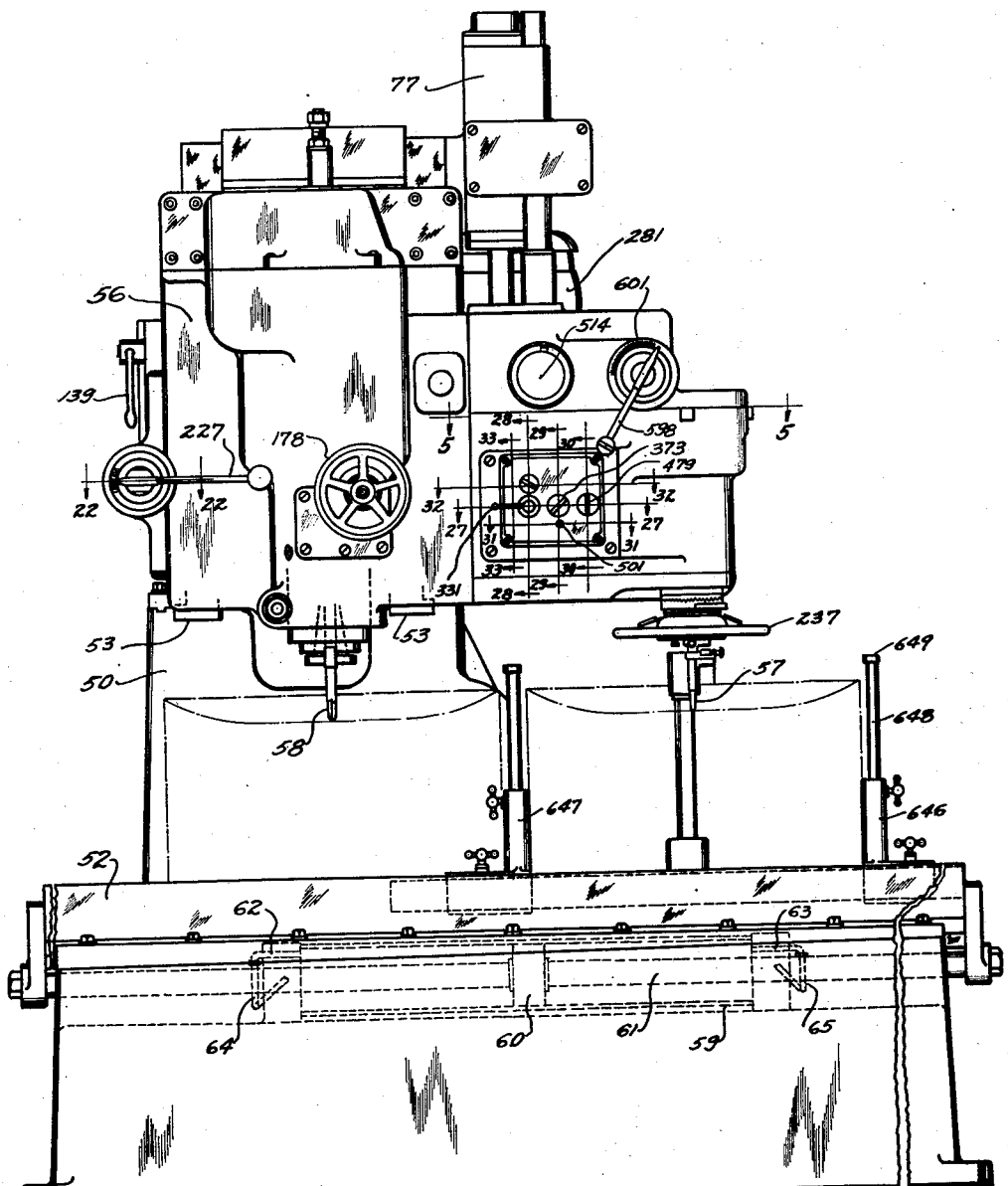
Figure 1 is a front elevation of a machine embodying the principles of this invention.

Figures 34 to 42 inclusive are sections through the valve control block taken on the respective section lines as indicated in Figure 28.

Figure 43 is a diagram of the hydraulic control circuit of the machine.

Figure 44 is a diagrammatic view of the circuit for remotely controlling the position of the pump pendulum control pin.

Figure 45 is a diagrammatic view showing movements of tracer and cutter in effecting engagement with the pattern and work.

Figure 46 is a sectional view on line 46—46 of Figure 5.

Figure 47 is a section on line 47—47 of Figure 46.

Figure 48 is an enlarged view of the control panel.

Figure 49 is a section on the line 49—49 of Figure 44.

Figure 50 is a section on the line 50—50 of Figure 44.

Figure 51 is a view showing uses of bars for changing profile.

Automatic pattern controlled machine tools are utilized for forming surfaces in conformity to a prescribed master and usually comprise a first pair of relatively movable elements, such as a cutter and a work support, and a second pair of relatively movable elements such as a tracer and a pattern support, and means for effecting relative movement between the elements of each pair in such a manner as to produce a profiling action. An analysis of a profiling action will show that a profile or contour is produced by the summation of the instantaneous components of the instantaneous relative movements between the elements of each pair in two right angular paths, and that three-dimensional surfaces are produced by periodically effecting a third relative incremental movement between the elements of each pair in a direction normal to the plane containing said right angular paths.

In practice it is well-known that in machines of various types in connection with which this invention may be applied, that the elements may be variously supported to effect these movements, and in some cases the tracer and cutter may move while the work and master remain stationary or vice versa; whereas in other cases the tracer and work, or the pattern and cutter, may be stationary, and the remaining elements of each pair the movable ones, or the reverse of either of these.

Additionally, one or more movements may be imparted to either element of each pair and the remaining movement or movements imparted to the remaining element of each pair. Furthermore, the plane which contains the two right angular paths referred to above may be any plane in space, and the third movement will always be in a direction normal to this plane. It should also be obvious that in producing the relative movement between the cutter and work in the two right angular paths, that this may involve either a lateral movement or an axial movement of the cutter spindle. All of these various forms or ways of embodying these elements in a machine are contemplated within the scope of this invention, because the improved means disclosed herein for effecting the various relative movements may be suitably applied regardless of which element or elements do the moving or regardless of the actual planes in space to which the various relative movements may be allocated. Since no useful purpose would therefore be served by showing all of these various forms, only one embodiment of the invention is illustrated in the drawings.

Referring to Figures 1, 2 and 3 of the drawings, the reference numeral 50 indicates the bed of the machine having guideways 51 formed in the front portion thereof for guiding a reciprocable slide 52 suitable for receiving work and pattern. The bed also has a second set of guideways 53 formed thereon at a higher elevation than the guideways 51 for supporting and guiding a horizontal reciprocable ram 54. The ram in turn, as more particularly shown in Figure 2, has vertical guideways 55 formed on the forward end thereof for receiving and guiding a vertically movable slide 56 which, in the present machine, carries the tracer 57 and the cutter 58. It will thus be seen that movement of the table, while the other slides are stationary, establishes a rectilinear cutting path which is of course parallel to the direction of table movement. If the table remains stationary and the ram 54 is moved, a rectilinear cutting path will be established which is perpendicular to the first described cutting path. Additionally, a simultaneous movement of both slides will result in a cutting path which is at an angle to the two previously described cutting paths, and this angle will vary in accordance with the ratio of the relative rates of movement of the two slides.

Viewed in another way, it will be seen that simultaneous movement of the vertical slide 56 and the table 52 will result in a cutting path which is at an angle to the surface of the work table and the amount of this angle will also vary in accordance with the ratio of the relative rates of movement of the two slides. From this it will be seen that various combinations of movements are possible and that a sufficient variety of cutting paths can be established depending upon the nature of the work to be performed.

The work table 52 is moved by means of a fluid motor, either a rotary type for effecting relative movement between a screw or nut, or reciprocating type, such as shown, comprising a cylinder 59, having a contained piston 60, which is connected by piston rod 61 to opposite ends of the table 52. It will be noted that the piston rod extends through opposite ends of the cylinder so that the volumes of flow to and from the cylinder will always be equal. The motor is provided with two ports 62 and 63 which are connected by channels 64 and 65 respectively to opposite ends 66 and 67 of a reversible variable delivery pump 68 whereby opposite rotation of the pump will effect opposite movements of the motor and thereby the slide or table.

The horizontal ram 54 is moved by a similar hydraulic motor comprising a cylinder 69 having a contained piston 70, as more particularly shown in Figure 4, the piston being connected by a piston rod 71 to a fixed part of the bed 50. In this instance, the cylinder 69 moves with the ram, and the piston and piston rod are stationary. It will be noted in this instance that the piston rod 71 also extends through both ends of the cylinder so that the quantities of fluid delivered to and exhausted from the cylinder will always be equal. The motor has ports 72 and 73 which are connected respectively by channels 74 and 75 to opposite ends of a reversible variable delivery pump 76, thus forming a closed circuit for opposite movement of the ram.

The vertical ram 56 is reciprocated by an hydraulic motor shown more particularly in Figure 18, comprising a cylinder 77 which is integral with the horizontal ram 54 and has a contained piston 78 operatively connected by the piston rod 79 to the vertical slide 56.

*Spindle transmission and control mechanism*

The spindle transmission is more particularly shown in Figure 4 and is driven by an hydraulic unit indicated generally by the reference numeral 80. This unit is supplied with fluid pressure from a pump 82 which is mounted coaxially along with pump 81 for actuation in tandem by a prime mover such as the electric motor 83. All of these parts are carried in the rear end of the ram 54 as more particularly shown in Figures 2 and 3.

The pumps are supplied from a reservoir 84 located in the bottom of the bed 50. It will be noted from Figure 3 that the pumps 81 and 82 are located a considerable distance above the reservoir and in order to lower the hydraulic lift and still make it possible to ascertain the fluid level, an auxiliary reservoir 85 is provided near the top of the bed 50. This reservoir is connected to the main reservoir by channel 85′ having a needle valve 86′ therein. For this auxiliary reservoir to be effective, it is necessary of course that the reservoir tank 84 be absolutely closed. A flexible supply pipe 86 serves to connect the reservoir 84 with the pumps 81 and 82 and this flexible pipe is filled with fluid up to the level indicated by the line 87 which is the same plane as the level 88 of the fluid in the auxiliary reservoir 85. The reservoir system is filled through an opening in the top of the auxiliary reservoir and this opening is closed by the cover 89. A gauge glass 90 is also associated with the auxiliary reservoir to indicate the fluid level. By this construction it is only necessary for the pumps to lift the fluid from the level 87 up to the pumps which is comparatively short, considering the distance between the level 87 and the main reservoir 84. The ram 54 is provided with a collecting chamber 91 as indicated in Figure 4 which serves to collect fluid from this portion of the machine and return it to the main reservoir through a flexible pipe 92 as indicated in Figure 3. The needle valve is opened only during filling of the machine, and after filling the tanks and pipes to the level indicated by glass 90, the valve is closed.

The pump 82 is connected by the channel 93, through a starting control valve 143, Figures 10 and 43, to the intake port 94 of the variable speed hydraulic unit 80 for supplying fluid pressure thereto. This intake port may be in the form of an elbow 95, Figure 4, threaded in one end of a sleeve 96 which is held against rotation by means of a rod 96A depending between a pair of adjustable screws 96B mounted in fixed bosses as shown in Figure 14. The other end of the sleeve has an elbow 97 threaded therein to which is connected the exhaust channel 98. The sleeve has a bore 99 formed in one end thereof and a similar bore 100 formed in the other end thereof, but these bores as will be noted from Figure 4 do not intersect one another.

Near the inner end of the pressure bore 99 are a plurality of slots 101 which are evenly spaced circumferentially as indicated in Figure 9. Similarly, the bore 100 has a plurality of evenly spaced slots 102, but these slots are positioned circumferentially so as to lie in planes intermediate to the planes of the slots 101. It will be noted from Figure 4 that the inner end of the slots 102 overlaps the slots 101 so that they will alternately register with the radially extending channels 103 which alternately serve as supply and exhaust channels for the reciprocating pistons of the motor.

The pistons, such as 104 and 105, are arranged in pairs so that each pair of pistons is supplied through a common channel, such as 103. A cylinder block 106 which carries all of the pistons, is attached, as by bolts 107, to a second sleeve member 108, rotatable about the inner sleeve 96, and has a gear 109 attached to one end which, through a pinion 110, actuates the spindle transmission. All of the pistons lying in the plane of the piston 104 engage a cam member 111, as indicated in Figure 9, and react against this cam member to effect rotation of the gear 109. Similarly, the pistons lying in the plane of cylinder 105 engage the periphery of a second cam member 112 having the same formation as the cam 111. Each of these cams has five lobes, although any other suitable number may be utilized. The number of lobes must correspond, however, to the number of slots in the sleeve. The cam member 111 is integral with one face of a gear 113 mounted for rotation on the anti-friction bearings 114. Similarly, the cam member 112 is carried on one face of a gear 115 also mounted for rotation on the anti-friction bearings 116.

The gear 113 and thereby the cam 111 is adjusted by a worm 117 secured to one end of a shaft 118, and the gear 115 is rotated by a worm 119 secured to one end of a shaft 120. As shown in Figure 10 the shafts 118 and 120 are each provided with intermeshing gears 121 and 122 so that upon rotation of the shaft 118, as by the manual control lever 123, both cams will be simultaneously adjusted. The connections, and so forth, between the manual control lever and the cams is such that the two cams will be exactly in phase with one another at either extreme position of the handle 123, and will be in opposite phase at an intermediate position of the handle. Since there are five lobes this means that the included angle of one lobe is 72 degrees and if one cam is moved 18 degrees clockwise and the other cam moved 18 degrees counter-clockwise, the cams will be in opposite phase. The other condition will be when the first cam is rotated counter-clockwise and the second cam clockwise. These adjustments make it possible to vary the rate of speed and direction of rotation of the hydraulic unit.

The mode of operation of this hydraulic unit is as follows. The pump 82 is a constant delivery pump and is driven by the electric motor 83 at a substantially constant speed, which means that the volumetric output through the delivery pipe 93 is substantially constant. The pressure fluid flows from the pipe 93 through the bore 94 to the slots 101 and thereby through whatever channels, such as 103, as are in registry with the slots. If now, the two cams are exactly in phase, both pistons 104 and 105 will be in the same position in their respective structures. For instance, if the pistons are opposite the low point on the cam lobe, both pistons will be at one limit of their stroke; or if they are on the high point of the cam lobe they will both be at the other limit of their stroke. Therefore, when the fluid flowing in channel 103 reaches the inter-connecting passage 124 between the two cylinders, it equally divides between the two cylinders to cause inward movement of both pistons simultaneously. The reaction of these pistons on the cam surfaces causes rotation of the gear 109. With this phase relation of the cams, the slowest speed of the device is obtainable. The rate of this speed may be easily computed by taking the total number of cylinders which in this case is thirty-four, and multiplying the same by the number of lobes on the cam and the volumetric displacement of one cylinder to obtain the total volumetric consumption for one revolution of the gear 109, or if this volume is divided into the total volumetric supply from the pump 82, as for instance in gallons per minute, the result will be the number of revolutions that the gear 109 will make in one minute.

As the cams 111 are adjusted out of phase with one another, it will be apparent that one piston of each pair will be moving outward for some part of a stroke during which the other piston is moving inward. If these two movements are at the same rate, it will be seen that there will be no volumetric consumption of the incoming oil and, therefore, in order to utilize the whole volumetric delivery from the pump 82 that the motor must run at a faster rate; or in other words make more revolutions in order to utilize all of the pump delivery. It should thus be apparent that as the two cams are adjusted out of phase with one another, that the speed of the motor or hydraulic unit 80 will be increased and, theoretically at least, this increase would extend to infinity for the reason that when one of the cams is exactly opposite in phase to the other, the piston 105 for instance will be moving outward throughout the total stroke of the inwardly moving piston 104. The fluid thus displaced by cylinder 105 is consumed in the displacement of piston 104 and no fluid is drawn from the channel 103. It will thus be seen that theoretically at least the device is capable of infinite speed, though as a matter of practical operation no attempt is made to use it.

As indicated in Figures 9, 24, 25 and 26, the control mechanism is provided with a dial 125 which is rotatable relative to a fixed pointer 126 formed on the cover plate 127. This dial is secured to a shaft 128 which extends through the cover plate for receiving the large gear 129. This gear meshes with a small pinion 130 secured to the shaft 118 as more particularly shown in Figures 9 and 10. The ratio of the pinion 130 to the gear 129 is such that the gear 129 and thereby the dial 125 will make a little less than one-half of a complete revolution for the total number of revolutions of the shaft 118 necessary to effect movement of the cams from an in-phase position to an opposite phase position. When the dial 125 is in the position shown in Figure 26, that is, with the graduation mark 131 opposite the pointer 126, the spindle will be rotated in a clockwise direction at either 60 revolutions or at 300 revolutions a minute, depending upon the position of the back gears to be explained hereafter. As the dial is rotated clockwise it will increase the rate of rotation of the spindle up to the maximum of the capacity of the device.

Furthermore, when the graduation mark 131 is opposite the pointer 126, the cams 111 and 112 are in one position of being in-phase with one another. Movement of the cams out of phase with one another corresponding to clockwise rotation of the dial 125 from the position shown in the drawings, will effect one direction of rotation of the spindle, the rate increasing up to the limit indicated upon the dial. Counter-clockwise rotation will reduce the speed until the lug 132 carried by gear 129 hits the fixed boss 133 at which time the dial 125 will be back to the position shown in Figure 26.

It is impossible, however, to pass from high speed in one direction directly to high speed in the opposite direction such as might be inferred from the dial, because due to the inherent nature of the device reverse rotation cannot be effected in this manner. To prevent the operator from inadvertently attempting to do this, a second lug 135 is placed on the gear 129 which will hit the pin 134 when the high speed position is reached as indicated in Figure 25.

The stop 134 is carried on the end of a plunger 136 which is provided with an operating knob 137. A spring 138 normally holds the stop 134 in the path of the block 135 so as to relieve the operator of the burden of watching the dial.

It will now be seen that adjustment of the dial over the range for effecting clockwise rotation of the spindle is limited in one direction by the lug 132 and in the other direction by lug 135.

Opposite rotation of the spindle is effected in the following manner. The spindle is stopped and the plunger 134 is withdrawn by pulling outwardly on knob 137. The dial is then rotated clockwise almost a complete revolution by handle 123 or until the graduation mark 131' is opposite pointer 126. This results in the cams being rotated to another in-phase position. In other words, there are two different in-phase positions of the cams, wherein a single lobe on one cam is first in-phase with a first lobe of the second cam, and secondly in-phase with a different or succeeding lobe on the second cam, but there is only one common out-of-phase position in which said single lobe is midway between said first and second lobes on the second cam. It will now be seen that increase of spindle rotation in one direction is effected by adjusting the cams from one in-phase position toward a common out-of-phase position, and that to change the direction of spindle rotation, the spindle must first be stopped, the cams adjusted or rotated through the out-of-phase position to the other in-phase position and then starting the spindle. After the spindle is started in the opposite direction, the direction of the rotary adjustment of the cams is reversed to increase the rate, the cams moving back toward the common out-of-phase position.

Starting and stopping of the spindle is controlled by the starting lever 139, Figures 10 and 24, which is pivotally mounted on a shaft 140, the lever being long enough to project to the front of the machine within easy reach of the operator. The shaft 140 extends through the cover plate 127 and is provided with a crank 141 having a slotted connection with the valve stem 142 of the flow dividing valve 143. The pressure line 93 from pump 82 is connected to port 144 of this valve which, supplies pressure to the cannelure 145 formed in the valve stem 142. When the valve stem is in the position shown in Figure 43 the cannelure connects port 144 to port 146 to which is connected the channel 147 leading to the balancing valve 148. A branch line 149 connects the port 146 through the bleeder coil 150 to the left end of the balance valve. This bleed might be effected by simply providing a small flat on the spool 150', Figure 10, thus eliminating outside connections.

The balance valve has a shiftable plunger 151 in which is formed a cannelure 152 for connecting the port 153, to which the line 147 is connected to port 154, which is connected to reservoir by channel 155. In this position of the parts, the pump delivery is returned to reservoir without the same passing through the motor 80.

Upon movement of the plunger 142 toward the right, Figure 43, a second cannelure 156 connects port 144 to port 157 which is connected by channel 158 to the intake port 94 of the motor. Progressive movement of the control lever gradually opens this port and effects progressive increase of spindle speed up to the maximum indicated by the dial setting. This insures smooth starting and also makes it possible to inch the spindle around by small amounts. The return channel 98 from the motor is connected to port 159 of the balance valve which, during operation of the motor, is shifted toward the right because the left hand end of the balance valve casing 148 is connected through a bleeder coil 160 to the high pressure line 158 while the right hand end of the balance valve is connected to the lower pressure in channel 147 due to the fact that there is a greater pressure drop between the fluid in the incoming line 93 and the line 147, than there is between line 93 and channel 158. A one-way check valve 161 is inserted between the return line 98 and the supply line 158 so that upon movement of the valve plunger 142 to a stop position, the high pressure which is apt to be developed in line 98 will act as a spindle brake but if the pressure rises beyond a predetermined limit it will be relieved through the check valve into line 158.

Because of the inherent nature of the motor 80, it is necessary that this motor be stopped in order to reverse the same, and in order to insure that the same is stopped before the interlock plunger 136 is withdrawn, a second interlock plunger 162, Figures 25 and 43, is provided, the end of this plunger being engageable in an annular groove 163 formed in plunger 136. The plunger 162 has a piston 164 formed on the end thereof and slidably mounted in a cylinder 165, the lower end of the cylinder being connected by line 166 to the supply line 158 of the motor. As long as there is pressure in the line 158 the plunger 162 will be held in an advanced position inter-engaging the groove in plunger 136 to prevent withdrawal of the same. A spring 167 serves to effect withdrawal of the plunger 162 when the pressure in line 158 has been reduced to zero. From the foregoing it will now be seen that suitable control mechanism has been provided for starting and stopping the motor 80, as well as for determining its speed and direction of rotation.

The gear 110, which is driven by the hydraulic motor 80, is secured to one end of a shaft 168, Figure 4, having attached to its other end a bevel gear 169 intermeshing with a similar bevel gear 170. The bevel gear 170 is fixed against axial movement in a fixed part of the ram housing 54 and has secured for rotation therewith a vertical spline shaft 171 which inter-engages the spline bore of a vertically movable gear 172. This gear is anti-frictionally journaled in a housing 173 which housing is integral with the quill 174 that carries the cutter spindle 175. The housing 173, quill 174 and spindle 175 are vertically adjustable by means of the pinion 176 interconnecting rack teeth 177 formed on the quill. The pinion 176 is rotated through the usual hand wheel 178 having a micrometer dial 179 associated therewith for indicating the amount of adjustment imparted to the spindle. The pinion 172 drives through an intermediate idler 180, the large gear 181 which is keyed to the spindle. This constitutes the low speed drive to the spindle, and when the idler 180 is in the driving position shown, the inner circle of speed rates on the dial 125 are utilized for determining the rate of rotation of the spindle.

The idler gear 180 is anti-frictionally journaled, as by roller bearings 182, on a vertically movable shifter rod 183 which has rack teeth 184 formed on the lower end thereof intermeshing with a pinion 185 secured to shaft 186 which is journaled in the housing 173 and movable therewith. The shaft 186 has a bevel gear 187 intermeshing with a bevel gear 188 also carried by the housing 173 for vertical movement relative to a vertical spline shaft 189. The spline shaft is fixed against longitudinal movement and is inter-connected through bevel gears 190 and 191 to a horizontal shaft 192 which projects through the side of the machine, as shown in Figure 22. This shaft is provided with an operating handle 193 which has a spring pressed plunger 194 in the end thereof for selectively engaging either one of two notches 195 or 195' formed in the cover plate 127, one of the notches indicating high speed and the other low speed, Figure 24.

Counter-clockwise rotation of the handle 193 to engage the notch 195 will rotate vertical shaft 189 and, through the inter-meshing bevel gears 188 and 187, will effect rotation of shaft 186 and pinion 185, the pinion effecting axial movement of the shifter rod 183. This rod carries a shifter fork 196 which inter-engages with a clutch member 197 splined on the vertical shaft 171 so that upward movement of rod 183 will cause engagement of the clutch teeth 198 of clutch 197 with complementary clutch teeth 199 formed on the lower end of sleeve 200. This sleeve is anti-frictionally journaled in the housing 173 and has keyed thereto the multiple belt pulley 201. This pulley is interconnected through a plurality of belts 202 with a second multiple belt pulley 203 keyed to the upper end of the spindle 175. It will be noted that the pulley 201 is larger than the pulley 203 and thereby a step-up in speed will be effected between the shaft 171 and the spindle 175. This provides a silent high speed drive for the spindle. The spindle transmission therefore comprises a multiple speed hydraulic motor which is reversible, and a pair of branch mechanical transmissions inter-connecting the final output shaft of the motor with the spindle in two different ratios, one being indicated herein as low speed, and the other as high speed. Furthermore, the spindle is provided with a quill adjustment which does not interfere with the drive thereto.

It will be noted that the spindle transmission has the same prime mover, motor 83, as the hydraulic transmission for the slide motors, which are supplied from the pump 81. Attention is also invited to the fact that the starting valve 143 functions to divide the flow from motor 82 which divisions of flow are maintained by the balance valve 148. Normally, after the motor 80 has been started, the valve 143 is positioned to direct all the flow from pump 82 to the motor 80 so that the spindle speeds will be in accordance with the dial readings, but still it may be utilized to slow down the spindle at any desired time instead of rotating the lever 123 and connected cams.

*Tracer head construction and mode of operation*

The rotary tracer head shown in Figures 7 and 8 is also mounted in the vertical slide 56 which carries the cutter spindle and transmission therefore just described in connection with Figure 4. In other words, the tracer head and cutter spindle are bodily movable with the vertical slide, but the cutter spindle is adjustable relative to the tracer head and slide by means of the quill adjustment.

The tracer head carries control mechanism which may be interconnected for simultaneously controlling the rate of movement of the table 52 and the ram 54 as when performing plane profiling operations on flat work lying on the table 52; or it may be utilized for controlling the table 52 and the vertical slide 56 when performing profiling operations in a vertical plane. The description will be confined for the present to the construction and method of operation of the tracer head for performing profiling operations in a horizontal plane. This means that the tracer must control the flow of fluid to the table cylinder 59 and the ram cylinder 69 in such a manner as to determine not only the proportionate rates of movement of the respective slides but also their directions of movement.

As previously explained, each slide motor has its own variable delivery pump. These pumps are of the reversible type and the pump 68, for instance, is provided with a pendulum 204 which has a central position as shown in Figure 5, in which position the delivery of the pump is zero. This pendulum is mounted for oscillation about a pin 205 whereby movement of the pendulum 204 to the right from the position shown in Figure 5 will cause the pump to deliver fluid into one end of the table cylinder 59 to effect movement of the table in one direction; and movement of the pendulum 204 to the left from the position shown in Figure 5 will cause movement of the table in an opposite direction. Similarly, the other variable delivery pump 76 is provided with a pendulum 206 pivotally mounted for movement about a pin 207 for changing the direction of flow from the pump as well as changing its rate of flow and thereby the rate of movement of the connected slide.

The pendulum 204 is pivotally connected at 208 to the end 209 of a Scotch yoke 210 and the pendulum 206 is pivotally connected at 211 to one end 212 of a second Scotch yoke 213. The yoke 213 has a cross-slot 214 formed therein for engaging an anti-friction roller 215 carried on a pendulum control pin 216. Similarly, the yoke 210 has a cross slot 217 formed therein which engages an antifriction-roller 218 also carried by the pin 216. As will be seen in Figure 5, the yokes overlap one another and this is made possible by milling away one-half of the yoke 210 to form a cross groove 219 therein, and similarly milling away the bottom half of the yoke 213 as shown in Figure 8, thereby making it possible to overlap these two members without increasing the total thickness thereof.

The yoke 213 has a square-ended extremity 220 slidably mounted in a similar shaped opening 221 formed in the housing 222. The member 210 also has a square-ended extremity 223 slidably mounted in a square opening 224 formed in the housing 222. The pendulum control pin 216 thus extends through both of the Scotch yokes so that movement of the pin from the central position shown in Figure 5, parallel to either slot, will vary the displacement of one or the other of the variable delivery pumps 68 or 76; or both pumps simultaneously if the pin is moved at an angle to the two slots.

The pin 216 is so arranged relative to the table and ram cylinders that movement of the pin 216 in any given directions from the central position shown in Figure 5 will generate a cutting path in that direction. In reality, the pin 216 therefore has two functions, one of which is to determine the direction of the cutting path, and the other to determine the rate of movement along that path. Separate control means have been provided for each of these functions, the pin being integrally connected with a slidable member 225 carried by the rotatable tracer head 226 so that rotation of the head will determine the plane of movement of the member 225 and thereby the plane of movement of the pin 216 which in turn will determine the plane of the cutting path. Movement of the member 225 relative to the rotary head 226 will determine the eccentricity of the pin 216 relative to its center position shown in Figure 5, and thereby the rate of relative movement between the cutter and work along the cutting path as determined by the rotary position of the head 226. It will thus be seen that the pin has two movements, one of which determines direction, and the other rate. The first of these movements is controlled by the angular position of the tracer head, while the other movement is remotely controlled by a manually operable rate control lever 227 positioned on the left hand side of the machine as viewed in Figure 1.

The tracer 57, as shown in Figures 7 and 8, is detachably connected as by the set screw 227a to the holder 228 which is pivotally supported as by a pin 229 to the disc 230. This disc has a peripheral flange 231 projecting from one face and outwardly tapered so as to engage the periphery of the upwardly extending flange 232 of the tracer support 233. The tracer 57 is mounted for pivotal movement about the pin 229 so that the end of the tracer may be adjusted relative to the pattern to compensate for differences in diameter between cutter and tracer. A spring pressed ball 234 is mounted in the holder 228 to effect a constant urge of the tracer arm in one direction about the pivot and a set screw 235 is threaded in the holder on the opposite side of the pin 229 from the ball 234 to limit the movement thereof and transmit motion positively to the member 230. The support 233 is secured as by bolts 236 to the bottom face of the hand wheel 237 which in turn is integrally secured to the lower end of the rotatable head 226. The bolts 236 may be loosened to permit eccentric adjustment of the tracer axis relative to the axis of the tracer head by the eccentric screw 229'. This causes movement of parts 230 and 243 about pin 230' which movement it will be noted is at right angles to the other adjusting movement. This eccentric adjustment provides the necessary advance of the tracer relative to the cutter to anticipate changes in contour of the pattern. The head 226 is rotatably journaled in a sleeve 238 which is fixed in the housing 56 and the lower end of the sleeve is provided with graduation marks 239 which cooperate with other marks 240 formed on the periphery of the enlarged portion 241 of the head 226. The hand wheel 237 is utilized for rotating the head 226 to determine the direction of feed movement and is utilized when the machine is under manual control; or for set-up purposes.

A vertically movable pin 242 is mounted in the center of the tracer head and has an adjustable head 243 threaded on one end engaging the center of the support 230 for axial movement thereby and the other end 244 engaging the pivoted lever 245. The lever 245 is fulcrumed on the pin 246 which has a V-shaped edge thereby insuring line contact between the parts which improves the accuracy of movement thereof. The other end of the lever 245 engages the end of the valve plunger 247 of the primary tracer controlled valve. This valve plunger has a central spool 248 for controlling the flow through port 249. Cannelures 250 and 251 are formed in the valve plunger on opposite sides of the spool 248 for registry respectively with ports 252 and 253. A spring 254 continuously acts on the upper end of the plunger to force the same downward and thereby through the lever 245 and the pin 242 tends to maintain the member 230 in peripheral engagement with the flange 232.

When the parts are in the position just described, it will be seen that any lateral movement of the tracer 57 or any axial movement thereof will effect upward movement of the pin 242 and thereby upward movement of the valve plunger. When the tracer 57 is out of contact with the pattern, the head 243 on pin 242 is so adjusted that the spool 248 is slightly off center with respect to port 249; in other words, is moved downward a sufficient amount to interconnect port 252 with the port 249. The purpose of this is to insure that when the machine is started and the tracer is out of contact with the pattern, the work support will automatically power feed the pattern into contact with the tracer.

It is necessary, however, that the spool 248 be movable to either side of the center of port 249 so as to record positive and negative deflections of the tracer 57 relative to its normal working position.

The movements of the primary valve are utilized to control the position of a secondary valve 255 which has its end ports 256 and 257 connected by channels 258 and 259 respectively, as shown in Figure 43, to ports 253 and 252 of the tracer controlled valve. The secondary valve is shown in detail in Figures 31 and 33. The secondary valve is provided with a pair of pressure ports 260 and 261 at opposite ends thereof adjacent the ports 256 and 257 for the purpose of supplying pressure to opposite ends of the valve, which pressure flows through fluid resistance ports 262 and 263 formed on opposite ends of the valve plunger 264. The ports 260 and 261 are connected by branches 265 and 266 to a common supply line 267 which, as shown in Figure 43, is connected to the main supply pump 81.

The construction of one of these fluid resistance ports will be described in detail here because the same construction is utilized not only in this valve but in other valves of the circuit where the same is necessary. This description is therefore intended to suffice for other valves herein having fluid resistance ports.

Referring more particularly to Figures 31 and 33, the annular groove, such as 261, in the valve sleeve, has a pair of narrow diametrically opposed slots or openings 261' formed in the bottom of the groove, the axis of the slots being parallel to the axis of the valve and of a length equal to the width of the groove. An annular portion 262' on the valve plunger which is to provide variable resistance to fluid flow through these slots is reduced in diameter by a few thousandths of an inch relative to the inside diameter of the sleeve. The greatest flow through this port can occur, or in other words, the fluid resistance of this port is lowest when the reduced portion 262' has the position shown in Figure 31 relative to slot 261'. As the valve moves downward, Figure 31, the flow is gradually reduced to substantially zero, or in other words the fluid resistance rises to a maximum. The opposite sides of the annular reduced portions are slabbed off to form flat sides 263' which lie in planes parallel to the sides of the slot. They are spaced a large enough distance apart to prevent free flow from the slots into the enlarged spaces formed by the reduced sides of the plunger, which relation is more particularly shown in Figure 31, whereby they will not interfere with the control of fluid resistance but still will serve as a flow connection with an adjacent longitudinally spaced port.

Alignment of the circumferential reduced portions 262' with the slots 261' is maintained by extending the flat sides 263' of the plunger for guidance by a correspondingly formed cross slot 264' formed in an auxiliary guide sleeve 265' mounted in the end of the bore and held against rotation by any suitable interlocking connection with the valve sleeve.

There is therefore a constant flow of high pressure fluid to ports 260 and 261 during rotation of the pump 81, and this fluid flows through the fluid resistances indicated generally by numerals 262 and 263 which cause pressure drops to the respective ports 256 and 257 and these reduced pressures are communicated to ports 252 and 253 at which point the spool 248 determines the quantity of flow from these lines to the port 249, and thereby to the return channel 268. The opposite ends of the spool 248 also constitute fluid resistances which cause a further change in the respective pressures. From the foregoing it will be seen that this arrangement in effect is an hydraulic amplification system in which a constant source of fluid pressure is supplied through a first pair of fluid resistances, the flow then continuing through a second pair of serially arranged fluid resistances, and the intermediate pressures between the resistances in each branch is utilized to control the position of the plunger 264. This method of control is more particularly described and explained in co-pending application, Serial Number 629,197 filed in the United States Patent Office on August 17, 1932, and therefore further description thereof is not believed to be necessary. Suffice it to say that the resistances are so designed that slight movements of the tracer 57 will be transmitted to the valve plunger 247, and that by means of the hydraulic amplification control small movements of the valve plunger 247 will effect larger movements of the secondary valve plunger 264.

The function of the secondary valve is to control automatically the rate of rotation of the tracer head as well as the eccentricity of the pump control pin 216. The tracer head 226 has a gear 269, Figures 7, 8 and 43, secured to the upper end thereof which intermeshes with a gear 270, Figures 11 and 43, secured to the upper end of the hydraulic motor shaft 271 of an hydraulic motor 272. The hydraulic motor is connected by channels 273 and 274 to the secondary valve, and the left end of the cylinder 275 which contains the plunger 225 for moving pin 216 is also connected as by channel 276 to the secondary valve in such a manner that when the valve is in a right-hand position as shown in Figures 33 and 43 all of the flow from an independent supply of fluid pressure will go to channel 276 and no flow will go to channels 273 and 274. The result will be that the tracer head will not be rotated but the pin 216 will be moved radially to cause feeding movement of the slides in a resultant direction, depending upon the rotary position of the tracer head. Since the direction may be manually controlled by the hand wheel 237, it will be apparent that the operator may by use of this hand wheel determine the direction initially for subsequent automatic operation or entirely control the direction of movement when there is no pattern.

The secondary valve plunger will be, in such a case, in the position shown in Figure 43 for the reasons previously described so that when the tracer is not contacting the pattern, the primary valve plunger 247 will be moved downward by the spring 254 to its lowest position, which will thereby decrease the resistance or pressure drop between the ports 252 and 249 and increase the resistance to flow from port 253 to port 249 whereby the pressure in line 258 will be higher than the pressure in line 259.

Since the line 259 has the lower pressure and is connected to the right end of the secondary valve, that is, to port 257, it will be seen that the higher pressure at port 256 will act on the left end of the valve plunger and shift the same all the way to the right against the lower pressure at that end of the plunger. When the tracer, however, contacts the pattern the following phenomena occur. The first slight deflection of the tracer as it makes contact with the pattern causes a slight movement of the spool 248 which is sufficient to change the fluid resistances at port 249 so that the value of the fluid resistance to flow from port 252 to port 239 will be equal to fluid resistance to flow from port 261 to port 257, and the value of the fluid resistance to flow from port 253 to port 249 will be equal to the value of the fluid resistance to flow from port 261 to port 257. This results in the equal pressures in lines 258 and 259 because when the resistance to flow into a channel is equal to the resistance to flow out of a channel then the pressure in the channel is equal to one-half of the supply pressure. Since both channels are supplied from the same source, it follows that the pressures in each channel are equal to one-half of the supply pressure and therefore equal to each other. This does not mean, however, that one pair of serial resistances must have the same value as the other pair. As a matter of fact, it will be noted that each resistance of one serial pair has a high value and each resistance of the other pair has a low value.

This first slight movement of the tracer and its valve therefore merely equalized the pressures at opposite ends of the secondary valve without causing movement thereof. As the tracer is deflected further by the pattern, the spool 248 continues to move toward a central position with respect to port 249. Each minute movement of the spool unbalances the one to one ratio of the respective pairs of serial resistances, causing unbalancing of opposing pressures on valve plunger 263 and a sufficient resultant movement thereof to re-establish said one to one ratio of the serial resistances. In this manner the plunger 261 is gradually moved to a central position in its housing and will attain that position when the spool 248 has attained a position central of port 249.

When the secondary valve plunger reaches a central position, it will have cut off all flow to the motor channels 273 and 274 and the entire flow from the independent source of pressure will be delivered to channel 276 which will cause movement of the pin 216 to its extreme position, causing maximum feed of the work slides relative to the cutter and tracer.

The tracer in its normal working position is deflected sufficiently to centralize the spool 248 with respect to the port 249 so that undeflection of the tracer or over-deflection of the tracer will cause movement of the secondary valve plunger in one or the other direction depending upon which of the two lines 258 or 259 has the larger quantity of flow. As the secondary valve plunger moves away from its normal central position, it will decrease the flow to channel 276 and thereby decrease the feed rate, and at the same time initiate flow to the motor 272 to effect rotation of the tracer head, because it is due to the fact that the tracer has become undeflected or over-deflected that the secondary valve has been moved and therefore it is necessary to rotate the tracer head in order to change the direction of feed and thus reposition the tracer in its normal working position. It will now be evident that rotation of the tracer head changes the angular position of the pin 216 and thereby the resultant direction of movement of the two slides so that the pattern and thereby the work will be moved in a new direction and in such a direction that the tracer 57 will assume its normal working position again, if possible. The independent source of pressure which supplies fluid to position the pin and rotate the tracer head motor comprises a variable delivery pump 277 which, as shown in Figure 43, is supercharged by the main pump 81 through the branch line 278. The delivery line 279 from this pump is connected to port 280 of the secondary control valve. The pump 277 is mounted coaxial along with pumps 68 and 76 and a fourth pump 288 whose function will be described hereafter, for actuation by a common prime mover 281.

*Circuit for remotely controlling position of pendulum pin*

From the brief description of the secondary valve, it will be apparent that the rate of feed movement of the slides is really determined by the volume of fluid delivered to the line 276. In other words, when the volume delivered to line 276 is decreased, the volume delivered to the tracer head motor is increased whereby the motor is accelerated in either direction and the feed rate necessarily decreased. The control circuit whereby the rate of feed may be controlled simply by controlling the volumetric flow in line 276 will be more clearly understood by referring to the diagram in Figure 44.

The fluid delivered to line 276 flows into the left hand end of the cylinder 275 and its pressure acts on the left end of plunger 225 to shift the same. This plunger has flats 282 formed on opposite sides thereof, as more particularly shown in Figures 8, 44 and 49. The top and bottom rounded portions 283 and 284 are slightly reduced in diameter of the order of a few thousandths of an inch, and these reduced portions slide longitudinally relative to elongated slits 285 and 286 formed on the top and the bottom of the cylinder 275. The incoming fluid passes through bore 682, radial holes 683, and between the flats 282 and the side of the bore 282' in a rather free manner, and then passes over the top and bottom of the valve to the slits 285 and 286. This forms a fluid resistance similar to that described in connection with the secondary valve and causes a drop in pressure between the incoming and outgoing fluid.

In other words, the fluid delivered to line 276 passes through a fluid resistance which may be varied in accordance with the longitudinal position of the valve member 225 and then escapes to reservoir whereby a definite pressure drop is created between lines 276 and 287 for each position of the valve 225 and for each change in the volume of the incoming fluid. If nothing else were present, it is apparent that the pressure of the incoming fluid would shift the valve 225 to entirely open the exhaust line and no control would be possible. It is therefore necessary to set up an opposition to the pressure acting on the left end of plunger 225.

In addition, however, to the pressure acting on the left end of plunger 225, there is the load on the pin 216 caused by the reactions of the pump pendulums and the attached back lash eliminating springs 210' which reactions are directionally variable and their resultant direction may therefore be positive or negative with respect to the constant direction of the supply fluid pressure. This means that the opposition to be set up must take these directional external forces into account, in such a manner that the total force acting in one direction on piston 225 equals the total force acting in the opposite direction.

This opposition may be created by hydraulic pressure, the resultant effect of which is controlled by auxiliary means in the form of a differential valve which is so inter-connected that by balancing the total pressures on its respective ends, the position of member 225 may be determined regardless of the external forces acting thereon, or its own friction acting to oppose movement thereof.

The differential valve as shown in Figure 44 comprises a housing 293 having a slidable plunger 294 in which is formed a cannelure 295 having a shoulder 296 to form a variable fluid resistance to flow through the port 292. An exhaust port 297 is formed in the valve housing in constant communication with the cannelure 295, and has connected to it a channel 298 leading to a constant resistance.

It is preferable that this resistance take the form of a narrow slit having restrictive characteristics identical to those of the slits formed between the arcuate positions 283, 284 of plunger 225 and the bore 282' so that for changes in temperature and therefore in the viscosity of the fluid medium, the values of these resistances will vary in like proportions whereby inaccuracies of plunger movement normally caused by such viscosity changes will be balanced out, and therefore eliminated. In order for the slits to have the same restrictive characteristics, it is desirable that they have the same thickness and then the resistive value will depend upon their length. These results are accomplished in the following manner. A divided block 299 is provided, one half 674 of which has spaced surfaces 675 which respectively abut spaced surfaces 676 on the other half 677 of the block. The halves of the block also have opposed inclined surfaces 678 and 679 respectively which are spaced to form a slit 680. This permits the halves of the block to be oppositely shifted on surfaces 675 and 676 to vary the thickness of the slit until it is equal to the thickness of the slit as formed by surface 283 of plunger 225.

A central depression 681, having a shape such as shown in Figure 50, is formed in one half 677 of the block to which is connected channel 298, so that the incoming fluid will fill this depression and escape in all directions through the slit surrounding the periphery of the depression. If the length of the periphery of the depression 681 is now made equal to the combined length of the former slits as measured axially of plunger 225, then the restrictive characteristics of each resistance will be the same for the same quantity of fluid is flowing therethrough.

The port 292 is connected by channel 289 to pump 288 which is actuated by the prime mover 281. This pump may be a variable delivery one which is initially set when the machine is built and usually further adjustment thereof is not necessary. In view of this, the delivery from pump 288 into channel 289 is substantially volumetrically constant and will be so considered in this explanation. The line 289 has a branch 290 which leads to the right hand end of cylinder 275 to act on the right end of plunger 225 and create the opposition above referred to.

The return line 298 has a branch 301 connected to the right hand end of the valve housing 293 which is enlarged at that end to receive a piston 302 larger in diameter than the piston portion 294 on the left hand end of the plunger. The left end of the valve housing 293 has a port 303 connected to channel 276 so that, whatever pressure is created in channel 276 by the fluid resistance at port 286 will act on the left end of plunger 294 and the pressure created in line 301 by the resistance 299 will act on the right end of plunger 294.

The position of valve 225 depends not on the balancing of the hydraulic pressures acting on opposite ends, but by balancing the pressures acting on the ends of the differential valve, which is possible because no external force is acting on it, and its own friction is of such a small value as to be negligible.

This is accomplished in the following manner. The total pressure acting on the left end of the differential valve is constant because the resistance 299 and the flow in line 298 are both constant. As a scholium thereto, the unit pressure in line 301 is constant. If the valve is not to move, then the total pressure on the left end of plunger 294 must be equal and opposite to the total pressure on the right end. This total pressure must be a constant regardless of the longitudinal position of the plunger if the same is not moved, which means that the unit pressure must be constant. The unit pressure in line 276 is determined, however, by the longitudinal position of the valve 225 which in turn determines the value of the resistance 283'. Since the unit pressure in line 276 must remain a constant because it is opposed by the constant pressure in line 301, it follows that the plunger 225 must take different definite positions for different volumetric flows so that the resistance will be changed accordingly to produce the same unit pressure. From this it will be seen that if the plunger is not in the right position, the unit pressure will be too high or too low. The result is that the plunger 294 will shift in one direction or the other to increase or decrease the resistance at port 292 and thereby vary the pressure in line 289 and thereby the value of the opposition in such a manner as to shift the plunger 225 to its proper position. When it reaches the correct position it will balance the forces on plunger 294 which in turn will create and maintain the proper opposing force on plunger 225.

It is to be remembered that the pump 288 is delivering a constant volume of flow to the line 289 and that the only path of escape to reservoir for this flow is through resistance 299. The pressure in line 291 is therefore determined by the position of the shoulder 296 relative to the port 292. The pressure in lines 298 and 301 is substantially constant at all times throughout the operation of this device because this pressure is determined by the substantially fixed resistance 299.

When the volume of flow in line 276 is constant, the total pressure on the left end of the spool 225 is equal to the algebraic sum of the fluid pressure on the right end of the spool plus any external force acting on pin 216. Also, the total pressure on the left end of plunger 294 is equal to the total pressure on the enlarged piston 302. It therefore follows that if the pressure rises in line 276, due to a volumetric change in the flow, that this increased pressure acting on the end of valve 294 will be sufficient to overcome the pressure on 302 and shift the valve 294 toward the right. This will enlarge the opening at port 292 decreasing the resistance thereof and simultaneously decreasing the pressure in line 291 and thus the total pressure on the right hand end of plunger 225. In other words, one pressure rises and the other falls to quickly create a differential, which will cause shifting of the plunger 225. The differential between these opposing pressures will be sufficient to overcome any external force or frictional resistance acting on pin 216. Movement of the plunger will continue until the hydraulic resistance 283' has been reduced a sufficient amount to lower the pressure in channel 276. When the pressure in line 276 decreases to a point lower than the constant pressure on the piston 302, the plunger 294 will shift toward the left and thereby cause an increase in pressure in the line 291. It will therefore be seen that a large pressure differential is momentarily created to cause a shifting movement and then the pressure in line 276 falls and the pressure in line 291 rises to quickly establish equilibrium again.

It therefore becomes possible to connect the line 276 to the secondary valve and provide means in the valve whereby movement thereof from a normal central operating position to cause rotation of the tracer head will decrease the volumetric flow in line 276 and thus decrease the feed rate of the machine.

It is important to remember, however, that the pin 216 always moves in one direction relative to the center line 304 which, in Figure 44, is utilized to indicate the center of the tracer head. In other words, the pin as viewed in this figure, will always move radially away from the center line 304, and will never cross this line. This is true because the radial arm connecting the center line 304 with the center of the pin 216 indicates direction and this arm is coplanar with the axis of the plunger 225, which itself is rotatable with the tracer head to any angular position within a complete circle. It therefore follows that when the pin 216 is being moved away from the center line 304 the reaction of the pump pendulums must be overcome and therefore a certain amount of work must be done; whereas during movement in the opposite direction, or toward the center line 304, the reaction of the pump pendulums tends to assist this movement and the work to be done is negligible.

*Tracer head motor and control thereof*

The hydraulic motor for rotating the tracer head to determine the angular direction of feed is more particularly shown in Figures 11, 12 and 13. This motor comprises a cylinder block 305 in which is formed a plurality of radially arranged cylinders 306, each having a piston 307. Each piston has a roller 308 anti-frictionally mounted in the end thereof, and these rollers engage the periphery of the cam lobes 309 formed of the shaft 271. There are three lobes arranged in such manner that opposed pairs of pistons will be in opposite phase to one another at all times. The channels 273 and 274, Figure 13, are connected through interdrilling in the block to annular grooves 310 and 311 formed in the bushing 312, and these grooves have radial bores 313 in the bottom thereof to establish communication between the grooves and the radial bores 314 and 315 formed on the shaft 271. These radial bores interconnect respectively with longitudinal channels 316 and 317, which in turn interconnect respectively with a plurality of ports, as shown in Figure 13.

For instance, the channel 316 is central of the shaft 271 and has three radially extending branches 318, 319 and 320 which terminate in ports adapted to register in predetermined succession with the fixed ports 321, 322, 323 and 324 which are respectively connected as by radial passages 325, to the outer end of respectively cylinders 306. The longitudinal channels 317 which are three in number are jointly connected with the groove 311 but each terminate in a separate port 326 equally spaced between the terminal ports of channel 316. The result is that the end of the shaft 271 has a series of six equally spaced ports around its periphery for registry with the four cylinder ports. It will therefore be apparent that when one of the channels as 316 is placed under pressure, one pair of opposing pistons will have one piston under pressure, and the other connected to exhaust, while the second pair of pistons will be momentarily disconnected from both pressure and exhaust.

It will be noted from Figure 43 that an additional channel 327 is connected to the motor and this channel terminates in a radial bore 328 formed in the cylinder block and extending in a radial direction into the center chamber 329. The pressure delivered through channel 327 will always be at a lower pressure than the back pressure of the exhaust or the incoming pressure, and is injected into this chamber for the purpose of relieving the load on the small anti-friction members supporting the cylinder rollers 308.

Cycle control valve

The hydraulic motor is of such construction that the admission of pressure to one line, such as 274, will effect rotation of the motor in one direction, and the admission of pressure to line 273 will cause rotation in the opposite direction. These lines as shown in Figure 43, extend to a cycle control valve having a plunger 330 which is rotatable by the handle 331. Referring to Figure 28, this plunger is rotatable in a sleeve 332 which is fixed in a bore 333 fixed in a main valve block 334. This block contains most of the control valves of the machine and various sections through the block are shown in Figures 27, 28, 29, 30, 31 and 32. Also various sections through the cycle control valve itself are shown in Figures 34 to 42 which sections are taken successively from the right toward the left as noted from Figure 28 and for the purpose of convenience the various sections in Figure 43 of the cycle control valve are arranged in the same order, and the different sections are numbered from 34′ to 42′ inclusive to correspond with Figures 34 to 42.

The lines 273 and 274 are connected to sections 39′ and 40′ of the cycle control valve, which sections are shown enlarged in Figures 39 and 40 respectively. Referring to Figure 39, the line 274 is connected to the top of the valve block 334 and for ease of manufacture the fluid flows through a short drilled hole 335 which is tangential to an annular groove 336 in the progression control valve 337, and then through an interconnected passage 338 to port 339 formed in the sleeve 332. The cycle control valve plunger 330 which is rotatable in its sleeve has three positions as indicated by the fixed arrows 340, 341, and 342 in Figures 43 and 48, adapted to cooperate with the movable arrow 343 carried by the end of the plunger. When the plunger is in a position shown in Figure 43, the port 339 registers with a longitudinal groove 344 which, as shown in Figure 28, is only long enough to extend to the next port 345 formed in the sleeve 332, which port is connected by means of passage 346, annular groove 347, in plunger 337, and the tangential intersecting bore 348 to motor line 273. It will be now seen that when the cycle control valve is in a central position, which position is adapted to yield a reciprocating cycle of operation of the machine, that the tracer head motor is short-circuited and therefore the tracer head is not power rotated during operation of the machine. The purpose of interconnecting the two motor lines in this manner makes it possible for the operator to manually rotate the hand wheel on the tracer head, and thus manually control the direction of feeding movement.

When the handle 331 of the cycle control valve is moved clockwise as viewed in Figure 43, the ports 339 and 345 are disconnected from the groove 344 and simultaneously connected to separate diametrical bores 349 and 350 respectively, which now register with ports 351 and 352 formed in the lseeve opposite ports 339 and 345. The ports 351 and 352 are connected by passages 353 and 354 to annular grooves 355 and 356 formed in the periphery of the sleeve 357 which is fixed in the valve block and contains the reciprocable plunger 358 which constitutes the automatic tracer engagement control valve.

Automatic tracer engagement control valve

Figure 1A:
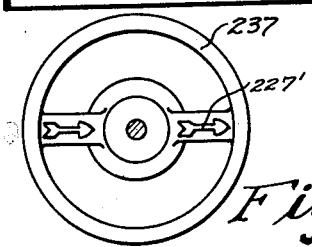
Figure 1A is a detail of the tracer head handwheel.

The engagement valve is interposed between the secondary valve and the motor lines, and is effective only at the beginning of a machining operation to insure that the tracer is brought into operative engagement with the pattern in a safe and easy manner. In other words, when the operator starts the machine, he rotates the hand wheel 237 on the tracer head so that the arrow 227′, Figure 1A, points toward the pattern to cause the tracer and cutter to move directly toward the pattern and work. If the tracer head rotated during this movement, it is of course apparent that approach may never be effected because the parts would merely move around in a circle without ever contacting one another. The engaging valve acts automatically upon the first slight deflection of the tracer by the pattern to stop the approach movement and start motor rotation. The valve, therefore, has two positions, one in which it short-circuits the tracer head motor to prevent rotation thereof until the tracer has contacted the pattern, and a second position wherein it interconnects the two motor lines with the secondary valve for control thereby.

The automatic movement of the engagement control valve to its two positions is effected in the following manner. As shown in Figure 43, the right hand end of the engagement valve has a port 359 which is connected by channel 360 to channel 259 extending to the tracer controlled primary valve. A second port 361 at the opposite end is connected by channel 362 to port 363 of a tracer engagement selector valve 364. The port 256 at the left end of the secondary valve is connected by a passage 365 to port 366 of the cycle control valve, as more particularly shown in Figures 42 and 43. Port 366 is adapted to be connected by the diametrical bore 367 in plunger 330, upon clockwise rotation thereof from the position shown in Figure 42, to an opposite port 368 which is inter-connected by channel 369 to port 370 of the tracer engagement selector valve.

The tracer engagement selector valve 364 has a rotatable plunger 371 in which is formed a narrow slot 372, Figures 27 and 29, which is segment-shaped as shown in section in Figure 42, and upon counter-clockwise rotation of the valve plunger through an angle of 90 degrees will interconnect port 370 with port 363, and thereby through channel 362 to port 361 of the engagement control valve.

This corresponds to the "horizontal" position of the operating knob 373 which is secured to the end of plunger 371. This position conditions the circuit for the case where the end of the tracer lies in the same horizontal plane as the pattern and engagement between the two is effectible by a relative horizontal movement. Thus, the term "horizontal" for defining one of the positions of the tracer engagement selector valve, means that when the machine is started, automatic engagement will be effected in a horizontal plane. Should the end of the tracer lie above the plane of the pattern, engagement will not be effected because the automatic movement which will take place will be only in a horizontal plane. Therefore, the operator must manually position the vertical ram 56 so as to get the end of the tracer down into the plane of the pattern.

When the nature of the work is such, as for instance in die-sinking operations, that it becomes desirable for the tracer to engage the pattern by a vertical movement and automatically, the tracer engagement selector valve is placed in its "vertical" position which is the one shown in Figure 42 and in which the port 363 is connected by a second slot 374 and radial bore 375 to an axial bore 376 formed in the plunger. This axial bore, as more particularly shown in Figure 27, is open at the end to permit the oil to discharge to reservoir. The effect of this is to separately connect lines 379 and 383 to lines 354 and 353 respectively, so that when the machine is started the tracer head will rotate, but no relative movement will take place between the tracer and pattern because the supply to the feed line 276 is reduced to zero. With the tracer head thus rotating, the operator manually feeds the vertical ram 56 downward through the medium of a servo-motor mechanism until the tracer engages the pattern. When this occurs, the tracer is obviously deflected and will immediately assume automatic control of subsequent movement.

Another improved function of the tracer engagement selector valve is that after automatic engagement has been effected in a horizontal plane with the tracer engagement selector valve set in its "horizontal" position, the valve may then be turned to its "vertical" position which yields the advantage that during a profiling operation with the feeding rate relatively high and conducive to disengagement of the tracer with the pattern, when encountering a sharp corner in the work, that, instead of the feeding movement continuing at the same fast rate and off at a tangent with respect to the pattern, causing further separation between the tracer and pattern, the feed rate will be reduced automatically to zero and the tracer head rotated, thereby producing the possibility that the tracer will re-engage the pattern due to its eccentricity, and thus automatically re-establish the tracer into automatic engagement with the pattern and without attention on the part of the operator.

The tracer engagement selector valve thus serves to condition the circuit in accordance with the direction in which the relative approaching movement between the tracer and pattern is to take place so that upon engagement of the tracer with the pattern the tracer will assume control and automatically effect a subsequent profiling movement, and in addition, the valve also serves to prevent accidental disengagement of the tracer from the pattern. It will thus be seen that when the cycle control valve is set to "Profile" and the tracer engagement selector valve is set to "Horizontal" that the opposite ends of the engagement control valve are subjected to the same pressures as the opposite ends of the secondary valve, so that when the secondary valve is shifted to a right hand position during non-engagement of the tracer, the engaging control valve is also shifted to its right hand position. When the pressure differential changes due to deflection of the tracer, then the engaging valve will shift to its other extreme position because the piston portion on the right end of the engaging valve is larger in diameter than the piston portion of the left end of the valve. Thus the engaging valve shifts prior to movement of the secondary valve because as soon as the equalization stage is passed, a pressure differential of opposite effect will be set up to cause movement of the secondary valve. It is necessary that the engaging valve shift under equal pressures and remain shifted because after each movement of the secondary valve, the pressures equalize to hold the secondary valve in its new position.

The engaging valve plunger 358 has an annular groove 377 formed therein which interconnects (Figure 28) port 354 with port 353 thereby short-circuiting the tracer head motor during movement of the tracer toward engagement with the pattern. The annular groove 378 in the sleeve 357 opposite the port 354 serves to permanently connect port 354 with port 356 and the latter port is connected by channel 379 to annular groove 380 of the secondary control valve.

The valve plunger 358 has a second annular groove 381 formed therein which, upon movement of the plunger to the left, interconnects port 353 with the port 382 which is connected by channel 383 to annular groove 384 of the secondary control valve. It will now be seen that when the engaging valve is shifted to the left, that port 354 is connected to channel 379 and that port 353 is disconnected from this channel and connected to channel 383. The annular groove 380, as shown in Figure 33, is sufficiently wide to have a first pair of diametrically opposed radial holes 385 and a second pair of diametrically opposed radial holes 386 drilled therein side by side. Similarly, the annular groove 384 has a first pair of radial holes 387 and a second pair 388 drilled therein side by side.

As previously mentioned, the annular groove 280 formed in the secondary valve sleeve is connected to the variable delivery pump 277 and the fluid entering the valve from this pump will fill the spaces 389 formed on opposite sides of the plunger and tend to flow past the hydraulic resistance 390 to the port 391. This port will be nearly closed by the portion 392 when the secondary valve is to the right, and therefore the flow thereto will be a negligible quantity. The port 391 is connected by the feed supply line 393 to the balance valve block 394 from which it emerges as line 395 to interconnect with line 276.

When the secondary valve is all the way to the right, practically no flow will pass to channel 393 through the secondary valve as just explained, but it will be remembered that it is necessary to effect a feeding movement while the secondary valve is to the right in order to effect engagement of the tracer with the pattern. This result is accomplished, however, while still maintaining the tracer head motor stationary in the following manner. The secondary valve plunger has an axial bore 396 formed therein, Figure 33, which is closed at opposite ends but connected by a radial hole 397 to the incoming pressure from variable delivery pump 277, and at the other end by a similar radial hole 398 which is in constant communication with the lateral spaces 399 on opposite sides of the plunger 262. The top and bottom of the valve adjacent the grooves 399 has arcuate shaped grooves 400 ground therein which are a few thousandths of an inch deep, to permit flow from the lateral grooves 399 to the ports 385. This forms in effect a fluid resistance which will regulate the quantity of flow therethrough, as the secondary valve is shifted.

The valve plunger 262 has another pair of opposed lateral grooves 401, Figure 31, forming an intermediate section 402. The opposite ends of this section have arcuate grooves 403 and 404 ground therein a few thousandths of an inch deep to permit flow from the radial holes 387 into the lateral grooves 401 which are in constant communication with annular groove 405 through radial holes 406. The annular groove 405 is connected to the exhaust line 407.

It will now be seen that when the secondary valve is to the right, that the incoming pressure from the variable delivery pump 277 is practically disconnected from the feed line 383 and that the entire flow passes through the axial bore 396 and channel 379 to annular groove 378 in the engaging valve sleeve. Although this groove is continuous about the sleeve so that regardless of the position of plunger 358, the fluid would continue to port 354; yet when the plunger 358 is to the right, the fluid will flow through the radial holes formed in the groove 378 to the annular groove 377 formed in the valve plunger and thereby to port 353.

Since these two ports are connected to opposite ends of the motor and since the same pressure will be applied to both lines, no rotation of the motor will be effected and thus no consumption of fluid. The annular groove 377 has a radial hole 408 formed therein, which intersects an axial bore 409 in the center of the plunger, which terminates in a second radial hole 410 formed in the bottom of the annular groove 411 formed in the right hand end of plunger 358, Figure 28. This annular groove communicates, when the plunger 358 is to the right, with port 412 which is connected by branch line 413, Figure 43, to channel 276 leading to the feed positioning control valve. This by-pass connection through the axial bore in the valve plunger 358 serves to divert the fluid which normally would go to the motor, and return it to the feed supply line and thus make possible engagement of the tracer with the pattern without rotation of the tracer head. It will also be noted that the control mechanism for the tracer head motor includes the diametrical bores 349 and 350 formed in the cycle control valve plunger which serve to interconnect the motor ports with the secondary valve only when the cycle control valve plunger is in "Profile" position. In other words, the tracer head is automatically rotated only when the machine is set up for following a peripheral horizontal profile, regardless of whether it is simple profiling or die-sinking.

It will also be noted that the function of the secondary valve after engagement of the tracer with the pattern is to divide the incoming flow from the variable delivery pump 277 between the feed line 276 and the motor lines 383 and 379. This flow is proportioned by the fluid resistances formed on the secondary valve plunger which have previously been explained and as the valve moves toward the left, the port 385 is gradually closed and the feed port 390 gradually opened. When the plunger reaches a central position, the spool 414 on the plunger 264 will exactly close the motor port, represented by the radial holes 385 and 386, and a second spool 415 formed on the valve plunger will exactly close the other motor port represented by the radial holes 387 and 388. At this time the feed port 391 will be wide open and the maximum feed rate will be obtained. Further movement of the secondary valve plunger to the left will connect the motor port 386 with the exhaust channel 407 and connect the other motor port 388 with the pressure existing in the lateral grooves of the valve plunger. This will cause reverse rotation of the tracer head motor.

The secondary valve thus has a normal working position in which maximum feed is obtained without motor rotation but upon movement of the secondary valve to one side of the central position the tracer head motor will be rotated in one direction, and upon movement of the secondary valve to the other side of the central position the tracer head motor will be rotated in an opposite direction. It will also be remembered that as the secondary valve plunger departs further from this center position, that the feed rate will be decreased and the rate of rotation of the motor increased.

The balance valve block 394 contains means for balancing the flow between the motor line and the feed line and is necessary because it will be remembered that the secondary valve device divides the incoming flow between these two lines and the proportions may be uneven and in order to maintain these proportions it is necessary that means be provided for balancing the pressure in one line against the pressure in the other line. The block comprises a center section 416, side sections 417 and 418, and flexible metal diaphragms 419 inserted between each side section and the center section. The incoming feed line 393 is connected to port 420 in the center section 416 which communicates with a depression 421 formed in the side of the center section 416 so that the pressure fluid therein will act on one side of the diaphragm 419. The fluid in the depression 421 flows through the restricted passage 422 to a second depression 423 formed on the other side of the center member 416. The fluid flowing in the motor line 383 is connected through a choke coil 424 to port 425 formed in member 417 and this port communicates with depressions formed in the face of the member 417 adjacent the opposite side of the diaphragm 419 so that the fluid pressure in line 383 acting on one side of the diaphragm is opposed by the fluid pressure in line 393 acting on the opposite side of the diaphragm. As the diaphragm is moved laterally by the pressure differential acting thereon, it will vary the resistance to flow through restriction 421 and thereby vary the pressure in line 393 relative to the pressure in line 383. It will therefore be seen that if the motor line 383 is the one under pressure, that it will be balanced against the feed line 393.

If line 383 is a return line from the motor, there will no longer be any restriction to flow at 421 caused by the diaphragm and the fluid will flow through the inter-drilled passages 426 to a depression 427 formed on the opposite side of the center block 416 which depression is adjacent the side of the diaphragm 419 located between the center block 416 and the side piece 418. The fluid in this depression will flow through the restriction 428 to port 429 formed in block 416 which port is connected to the feed line 276. The block 418 has a depression 430 formed therein adjacent the opposite side of the diaphragm 419 which depression is connected by the choke coil 431 to the other motor line 379. When the line 379 is under pressure for operating the motor in reverse direction, this pressure will act on one side of the diaphragm in opposition to the incoming feed line pressure so as to vary the resistance to flow at the restriction 428. It is therefore possible to balance the flow between either motor line and the feed line to maintain the volumetric proportions established by the secondary valve.

The motor exhaust line 407 from the secondary valve is connected to port 432 of the motor relief valve 433. This valve is shown in detail in Figures 30 and 31. The motor relief valve comprises sleeve 434 fixed in the valve block and has a wide annular groove 435 formed therein, one end of the groove having a radial bore 436 which communicates with one end of the cylinder formed in the sleeve by the threaded plugs 437. The pressure in the motor exhaust line 407 thus acts on one end of the reciprocable plunger 438 slidably mounted in the sleeve. The groove 435 has additional radial bores 439 formed therein which terminate adjacent a tapered spool 440 formed on the plunger 438. A reduced portion 441 adjacent the tapered portion 440 has a pair of drilled radial holes 442 communicating with a longitudinal hole 43 extending through the center of the plunger. This hole terminates in radial holes 444 which communicate with a second annular groove 445 formed in the periphery of the plunger and in constant communication with port 446 leading to reservoir.

It will now be apparent that the pressure in the motor exhaust line will tend to shift the plunger longitudinally to such a position that the tapered spool 440 will uncover the radial holes 439 and permit escape of fluid through the center of the plunger to reservoir.

The opposite end of the sleeve cylinder is connected by radial holes 447 to the wide annular groove 448 to which is connected a pressure line 449. As shown in Figure 43, the line 449 is connected in a circuitous manner to line 298 which is the exhaust line from the feed positioning control valve 293, previously explained in connection with Figure 44. A constant volumetric flow from pump 288 is delivered to this line, and since the pressure therein is constant, the pressure acting on the left end of the motor relief valve will be constant and will not vary with the position of the valve, such as would be the case if a spring were utilized for this purpose.

The line 407 has a branch 327 which supplies fluid pressure to the radial channel 328 of the tracer head motor shown in Figure 12, for balancing the pressures therein as previously described in connection with that figure.

*Set-up and control of machine for plane profiling*

The set-up and operation of the machine for plane profiling will now be described, and by plane profiling is meant such cutting operations as can be performed by one pass of the cutter as around the periphery of the work in a circumambient movement, such as when cutting templates, blanking dies, plates, cams and the like or along only a portion of the periphery as when the profile portion is rectilinear in nature. In other words, the length of the cutter is assumed to be equal to or greater than the thickness of the work piece. As shown in Figures 1 and 48, the various valves in the valve block which are adjustable to determine the machine cycle are provided with control knobs which are nested in a centralized position and suitably marked for easy access by the operator. The first of these, and possibly the most important, is the cycle control valve which has previously been explained, and which is provided with a control handle 331 for selectively positioning the valve in any one of three positions. These positions are marked "Profile", "Reciprocate" and "Automatic Reciprocate".

For plane profiling therefore the handle 331 is rotated until the arrow 343 points to "profile". This means that the plunger 330 of the valve is rotated clockwise from the position shown in the various sections 34' to 42' inclusive to Figure 43, so that the cross bore 367 in Figure 42 interconnects ports 366 and 368. The tracer engagement selector valve knob 373 is rotated counterclockwise in Figures 1 and 48 from the position marked "Vertical" to the position marked "Horizontal". The effect of this will be apparent from Figure 42 in which it will be seen that the lateral groove 372 will be moved to a position to interconnect port 370 with port 363. By this adjustment, it will now be seen that the port 256 at the left end of the secondary valve is interconnected through line 365, port 366, cross-bore 367, port 368 of the cycle control valve, channel 369, port 370, groove 372, port 363 of the tracer engagement selector valve, and channel 362 to port 361 of the engagement control valve 357. This means that whatever pressure exists at port 256 will likewise exist at port 361 minus any slight drop in pressure which may be caused by flow through the various inter-connections. The other port 359 of the engaging valve is constantly inter-connected by channel 360 to port 257 at the other end of the secondary valve so that whatever pressure exists at that port also exists at port 359. It will be assumed for the moment that the machine is stopped and likewise that all pumps are stopped, and that the plungers in the secondary valve and the engaging valve are in their right hand positions.

It will be noted from Figure 43 that the cross bores shown in sections 36', 37', 38' and 41' will not effect any port connections upon rotation of the cycle control valve plunger to the assumed position and therefore the parts connected thereto may be left out of consideration for the time being. The cross bores shown in Figures 39' and 40' will, however, be moved to a position to interconnect the two motor ports of the engagement control valve with lines 273 and 274 respectively, which extend to the tracer head motor 271.

To avoid any misunderstanding, it will be pointed out at this time that channels 273 and 274 have branches 450 and 451 respectively, as shown in Figure 43, which are connected to a pair of reversing valves 452 and 453, but these valves will be ineffective during this set-up because the cross bores in sections 36' and 37' of the cycle control valve are in such position as to prevent flow through the reversing valves and therefore they may be neglected for the time being.

The cycle control valve has another pair of cross bores 454 and 455 therein as represented in sections 34' and 35' which, upon rotation of the cycle control valve to the "profile" position, will establish certain inter-connections with the vertical feed mechanism. As shown in Figure 34, the cross bore 455 interconnects port 456 to port 457. As shown in Figure 35 the cross bore 454 interconnects port 458 with port 459. As shown in Figure 27 the ports 456 and 458 intersect an elongated depression 460 formed in the sleeve 332 of the cycle control valve, the shape of this depression being more particularly indicated in dotted lines in Figure 28. This depression is connected by a cross bore 461 to a longitudinal bore 462 formed in the valve block, and threaded at one end to receive pipe 463. In Figure 43 it will be noted that this pipe is a branch of the main supply line 267 so that they receive their supply directly from pump 81.

Port 457 is connected by channel 464 to the primary servo-screw valve 465 and more particularly to port 466 thereof as shown in Figure 21A. This port intersects a bore 467 formed in the valve block 465, having a reciprocable plunger 468 therein which acts on the end of a pivotally mounted arm 469 against the resistance of a spring pressed ball 470. The fluid pressure flows from the port through an inter-drilled passage 468' to the end of the bore to cause actuation of the plunger. The other end of the arm 469 carries a half nut 471 adapted to inter-engage the side of an elevating screw 472. The screw 472 does not directly effect movement of the vertical slide but is part of a servo-motor mechanism for this purpose, and the function of the plunger 468 is merely to interconnect the nut member 471, Figure 19, with the screw and therefore serves as a means for connecting and disconnecting the screw with the servo-motor mechanism. When the pressure is disconnected from plunger 468, the spring pressed ball 470 acts automatically to disconnect the nut and screw. Further description of the elevating control mechanism will be deferred for the present.

The port 459, Figure 35, is connected by channel 473 to an interlock plunger 474 which, as shown in Figure 7, acts on one end of a pivoted stop member 475 which is normally held in the position shown by a spring pressed ball 476. The member 475 serves to limit the amount of rotation of the tracer head, but since the pressure acting on the plunger 474 renders the member 475 ineffective during the profiling operation under consideration, the same need not be considered further at this time.

The valve block also contains the vertical feed control valve 477, more particularly illustrated in Figures 27 and 30, and comprising a plunger 478 which is rotatable to three positions by the control knob 479. For present purposes the plunger 478 is in a central or neutral position corresponding to the position shown in Figure 43, which position interconnects some ports to reservoir and blocks off the remaining ports, so that further consideration thereof need not be given at the present. The progression feed rate control valve 337 is also disconnected as shown in Figure 43 by the cross bore shown in section 36', and therefore is rendered ineffective during profile operations. It will therefore be seen that in order to set up the machine for plane profiling operations, it is merely necessary to set the cycle control valve 330, the tracer engagement selector valve 373, and the vertical feed control valve 477 to the respective positions previously indicated whereby the proper connections will be made throughout the entire hydraulic circuit to cause the tracer and cutter to circumscribe the pattern and work respectively.

The machine is put into operation by starting the electric motors 281 and 83 which may be so inter-connected as to be simultaneously connected to an electrical power source. This will cause rotation of the main supply pump 81 and the spindle transmission operating pump 82 whereby rotation of the cutter spindle may be effected by shifting the spindle rate control lever 139 from its neutral position.

The four pumps connected for rotation by the motor 281 will be actuated but although the variable delivery pumps 68 and 76 are running, their control pendulums will be in a central position, due to the center position of the pendulum control pin 216 effected by the higher pressure acting on the right hand end of plunger 225. This pressure will be higher because the pump 277 is not delivering fluid at this time.

As previously explained in connection with Figure 44, the setting of pump 277 determines the feed rate; therefore, when this pump is set at zero, no feed will result. The rate of delivery of this pump is controlled by the feed rate control lever 227 shown on the left side of the machine in Figure 1, and this lever is inter-connected for adjustment of the pump in the following manner, reference being more particularly had to Figures 22, 23 and 5. The lever 227 is integrally connected to a block 480 which is pivotally mounted on a pin 481 carried by the end of a rotatable shaft 482. The block 480 has a detent finger 483 adapted to engage a plurality of notches 484 formed in a fixed member 485. A spring pressed ball 486 acts on the block 480 to normally maintain the finger in engagement with the notches and therefore hold the lever in any selected position.

The shaft 482 terminates in a cam member 487, Figure 23, which is suitably profiled for laterally moving a depending pivoted arm 488. The lower end of the arm has an adjustable set screw 489 which contacts a shiftable plunger 490. It will be noted that the set screw 489 is approximately twice the distance from the pivot point 491 of arm 488, than the point of contact between the arm and the cam 487, whereby the movement effected by the cam is multiplied in the movement of the plunger 490. This plunger extends crosswise of the machine and as shown in Figure 5 fits into a notch 492 formed in the pivoted arm 493. The end of this arm engages a plunger 494, the opposite end of which contacts a pendulum 495 of the variable delivery pump.

It will now be seen that as the control handle 227 is moved clockwise, the cam 487 will swing the arm 488 to the right causing longitudinal movement of the plunger 490 which in turn will rotate the arm 493 causing axial movement of plunger 494 and adjustment of the pump pendulum 495 away from its central position to cause fluid to be delivered to the feed rate positioning control valve 293. The flow from the pump to channel 279 will be immediately directed to channel 276 causing movement of the feed positioning control valve plunger and thereby of the pendulum control pin 216 away from its central position to cause operation of the slides at a rate dependent upon the amount of movement of the feed rate control lever 227 in accordance with the explanation heretofore presented in connection with Figure 44.

The path of this flow is as follows: channel 279, port 280 of the secondary valve, lateral groove 389 in plunger 262, cross bore 397 in the plunger, axial bore 396 and cross bore 398, lateral groove 399, port 385, annular groove 380 in the secondary valve sleeve, channel 379 to engaging valve, annular groove 378 in the engaging valve sleeve, cannelure 377 in engaging valve plunger 358 (Figure 28) cross bore 408, axial bore 409, and cross bore 410 in the plunger, cannelure 411 formed in the plunger, port 412, channel 413, and channel 276. Since no rotation of the tracer head motor will take place, due to the fact that both motor lines are interconnected by cannelure 377 in the engaging valve plunger 358, the work and pattern will be moved relative to the cutter and tracer. The direction of this movement will be determined by the hand wheel 237 and the operator will position this hand wheel so that the arrow 227' thereon will point toward the plane of the pattern surface to be engaged by the tracer because this arrow indicates the direction in which the cutting path will be generated.

During this time the pump 81 will be supplying pressure to line 267 from which the fluid will be branched to ports 260 and 261 of the secondary valve flowing through the fluid resistances at opposite ends thereof, and escaping through ports 256 and 257 which ports are respectively connected by channels 258 and 259 to the ports 252 and 253 respectively of the tracer control valve 247. Since the tracer is not in contact yet with the pattern, the plunger 247 will be biased relative to the exhaust port 249 so that the pressure in line 258 will be greater than the pressure in line 259 thereby causing the secondary valve plunger to take up its extreme right position. The flow in channel 267 will also continue to the annular groove 496 formed in the sleeve of the engaging valve which, as more particularly shown in Figure 31, is connected by a cross bore 497 with the pressure groove 260. The groove 496 also communicates with a cross bore 498 which directs the fluid to an annular groove 499 formed in a sleeve 500 of the disengaging valve. This valve has a manually operable plunger 501 which is normally held in an extended position by a central spring 502. A flange 503 formed integral on the inner end of the plunger limits the outward movement of the plunger. It will be noted from Figure 31 that in the normal position of the plunger 501 the annular groove 499 is blocked off.

The flow from port 256 of the secondary valve not only passes through channel 258 to the tracer control valve but also passes through the branch 365 to port 366 of the cycle control valve, Figure 42, cross bore 367, port 368, channel 369, port 370, groove 372 and port 363 of the tracer engagement selector valve, and channel 362 to port 361 of the engaging valve, and since this pressure is higher than the pressure acting on the other end, this valve will be shifted to its extreme right position. The tracer when undeflected thus causes the engaging valve and the secondary valve plungers to take up an extreme right position.

As diagrammatically shown in Figure 45, the tracer 57 and cutter 58 will move in the direction of the arrow 227' until the tracer 57 contacts the pattern. During this movement, attention is invited to the relative relation of the center of the tracer head represented by the axis 304 to the center of the tracer 57. For accurate work the center of the tracer 57 is slightly in advance of the axis X—X' which passes through the center of the cutter and the center of the tracer head. Also, the center of the tracer button 57 is slightly in advance of the axis Y—Y'. This off-set relation of the axis of the tracer button relative to the axis of the tracer head will be known as the eccentricity of the tracer button. This eccentric relation which is determined by the adjustable eccentric 229', Figure 8, causes the tracer button to contact the pattern before the cutter reaches the required depth. It thus makes it possible for the tracer to be deflected a predetermined amount before the cutter has reached the required depth.

As the tracer deflects, it causes axial movement of the tracer control valve plunger 247 which in turn will obliterate the pressure differential in channels 258 and 259 and thus cause a complete shift of the engagement control valve plunger. The pressure in lines 258 and 259 will now be equal but as they become equal they cause shifting of the secondary valve plunger 262 to a central position. It will now be seen that the engagement control valve constitutes a means for detecting the fact that the tracer has touched the pattern and immediately makes the necessary circuit changes to stop the rectilinear feeding movement and start rotation of the tracer head whereby the tracer may be eased into its proper working position without attention on the part of the operator.

The circuit changes effected will be a disconnection of the cross bore 410 of the plunger 358 (Figure 28) from port 412 and movement of spool 504 to a position intermediate ports 378 and 385 thereby preventing the incoming fluid through port 378 from entering motor channel 353. In other words, one of the motor channels will now be under pressure and the other disconnected from pressure. This will start rotation of the tracer head motor 272 in a clockwise direction as viewed in plan. This means that the tracer and cutter will always move in a counter-clockwise direction around the exterior of a work piece which is correct for a right hand cutter. An additional reversing valve would have to be inserted in the motor lines if use of left hand cutters was desired.

Movement of the secondary valve toward its central position will immediately effect a pressure connection to port 391, Figure 33, through the hydraulic resistance 390 and will tend to reduce the flow to port 385 through the hydraulic resistance and connect port 387 to the exhaust line 407. When the valve reaches its central position, however, the spools 414 and 415 will exactly cover the motor ports connected with annular grooves 380 and 384 so that all incoming flow will then be directed to the feed line. In other words, as soon as the engaging valve is shifted, it immediately disconnects flow from the feed line and connects the two motor lines, one to pressure, and the other to exhaust, so that the motor begins to rotate at its highest rate of speed. Most of the incoming fluid from line 267 is therefore utilized for effecting tracer head rotation and a very small amount is utilized for effecting the feeding movement.

This tracer head rotation will cause the center of the tracer button 57 to move about the center 304 and it will also cause the pump pendulum control pin 216 to move about the axis 304 to change the direction of feeding movement. This operation will continue until the direction of feed or in other words until the arrow 227' has moved to a position which is substantially parallel to the surface of the pattern, but of course it will veer slightly towards the pattern in order to maintain sensitivity of the tracer button. When the tracer head has finally rotated to a position in which the arrow 227' is almost parallel to the surface of the pattern, the secondary valve will be in substantially a central position to reduce to a minimum the flow to the tracer head motor so that a maximum flow will now be directed to the feed positioning control valve and the profiling operation will proceed at substantially a constant rate which is manually determinable by the control 227.

*Tracer disengaging valve*

When the profiling operation has been completed, it is desired of course that the tracer and cutter be moved out of contact with the respective pieces without leaving a mark on the work and to insure that this is done in a careful and accurate manner, means have been provided for causing the tracer and cutter to automatically disengage the pattern and work. The disengaging valve plunger is mounted on the front of the machine and is located directly below the tracer engagement selector valve and is more or less in the form of a push button. When it is desired to effect disengagement, the operator merely presses this button or plunger and holds it depressed until the disengagement is effected. The effect, as shown in Figure 31, is to connect the annular groove 499 which is constantly under pressure by means of a cannelure 505 to line 506 which extends to the right hand end of the secondary valve. As more particularly shown in Figure 33, an enlarged plunger 507 is reciprocably mounted in a separate sleeve 508 threaded in the end of the valve bore. The plunger 507 is separate and independent of the plunger 264, but upon admission of pressure to port 509 it will shift the plunger 264 to the left of its central position sufficiently to maintain a feeding and also to connect the annular groove 380 through port 386 to the motor exhaust line 405 and connect groove 384 through port 388 to pressure, thereby reversing the direction of rotation of the tracer head motor, and causing the tracer head to rotate in such a direction as to disengage the tracer from the pattern. This will also change the relative direction of feed so that the cutter and work will separate. The operator will hold the plunger 501 depressed until the desired separation of the parts has been effected. Since the tracer is now undeflected, a rectilinear feeding movement will take place upon release of the button by the operator and in whatever direction the arrow points at the time of release. If the feed rate control 227 is now returned to a stop position the entire machine will be stopped so that the work may be changed.

*Vertical adjustment of tracer and cutter*

The vertical slide 56 is actually moved as shown in Figure 18 by the piston 78. Movement of this piston may be automatically or manually controlled.

The manual control mechanism is in the form of a servo-motor and includes the elevating control screw 472 which is antifrictionally journaled at the lower end in the movable slide 56 and at the upper end is slidingly journaled in the tube 510 which is fixed with the ram 54. A beveled gear 511, Figure 6, is secured to the lower end of the screw which inter-meshes with a bevel pinion 512 secured to the inner end of shaft 513. This shaft extends through the housing 56 where it is provided with a handle 514 having a micrometer dial 515 integral therewith. It will now be seen that rotation of the shaft 513 will effect rotation of the screw 472.

When the pressure acts on the plunger 468, Figure 21A, as previously described, it will move the arm 469, which is supported for universal movement by the diaphragm 516 in the servo motor primary valve block 517, in one plane to cause interengagement of the nut 471 with the screw 472 so that rotation of the screw will in turn effect through the nut 471 a movement of the arm in a plane at right anges to the first movement and cause the inner end 518 of the arm to move toward or from a pair of opposed ports 519 and 520 formed in members 521 and 522 fixed in block 517. These ports are connected by inter-drilling in the block, as more particularly shown in Figure 43, to channels 523 and 524 which extend to ports 525 and 526 respectively of the secondary servo-screw valve 527. These latter ports connect with chambers 528 and 529 formed in opposite ends of the secondary servo-screw control valve, which are respectively supplied with fluid pressure from line 530 through fluid resistances 531 and 532 in the same manner as the main secondary valve. Pressure is supplied to line 530 from the exhaust line 298 of the feed positioning control valve.

The movement of the arm 469 relative to the ports 519 and 520 act substantially in the same manner as the tracer control valve because it varies the resistance to flow from the two ports 519 and 520 and thereby varies the pressure in the end chambers of the secondary servo-screw valve which in turn causes the same to shift in accordance with the amount of the pressure differential so as to vary the fluid resistances 531 and 532 in such a manner as to cause an equal pressure drop therethrough in accordance with the volume of flow. The plunger 528 thus takes up various positions in accordance with the position of the arm 469.

The secondary servo-screw control valve serves to direct flow to opposite ends of the cylinder 77. The supply fluid for this purpose is taken from the exhaust line 287 of the feed positioning control valve and connected to ports 533 and 534. When the plunger 528 is in a central position, the ports 533 and 534 are disconnected by spools 535 and 536 from ports 537 and 538 respectively, the latter ports being connected by channels 539 and 540 to ports 541 and 542 formed in opposite ends of the cylinder 77. The valve 527, Figures 19 and 43, has a central port 543 which is normally closed by a spool 544 on the plunger 528. It will now be seen that when the valve plunger 528 is in a central position, that the pressure ports are disconnected from channels 539 and 540 and that these channels are also disconnected from the return line 542. Upon shifting of the plunger in either direction, however, one of the lines will be connected to pressure and the other connected to exhaust, causing movement of the piston 78 and thereby of the vertical slide 56 either upward or downward.

Since the screw 472 also moves with the slide 56, any movement of the slide 56 will cause movement of the servo-motor control arm 469 and thus after manual adjustment of the arm 469 relative to the ports 520 and 519, the actual movement of the slide will continue until the slide itself re-centralizes the arm 469 relative to these ports, when the movement will stop. This manual vertical adjustment is provided for positioning the tracer and cutter toward and from the table for plane profiling operations, such as those just previously described.

Profiling operations may also be performed on the machine by substituting a scriber for the tracer in which case a drawing may be substituted for the pattern, and the scriber adjusted close enough to the drawing that the operator may accurately follow the lines without the scriber actually contacting the drawing.

*Automatic vertical feed mechanism for profile die-sinking*

In cutting blanking dies and punches, the most efficient and time-saving method to use would be the rotary profile method previously described, but since the work will be of greater thickness than could be properly formed in one pass of the cutter relative to the work, it is necessary to provide mechanism for imparting incremental feed or indexing movements between the cutter and work in a direction parallel to the axis of the cutter. This mechanism is connected to the tracer head motor so that for each complete revolution of the tracer head motor which will be equivalent to one rotation of the pattern and work about the tracer and cutter, the vertical head is moved downward or upward a desired incremental amount.

To this end a vertical shaft 545, Figure 11, is journaled in the upper part of the vertical slide coaxial with the tracer head motor shaft, and provided with a flange 546 on the lower end thereof which carries a pin 547 adapted to ride in a groove 548 formed in the top of gear 270 as more particularly shown in Figure 5. It will be noted from this figure that the groove is not continuous but contains an abutment portion 549 which, upon rotation of the gear, will contact the pin. The purpose of the groove 548 is to provide a certain amount of lost motion between the gear 270 and the pin 547 so that in case the die or punch to be cut has re-entrant surfaces causing rotation of the motor for a short period in a reverse direction, it will have no effect upon the vertical feeding mechanism. Otherwise, if the pin were directly connected to the gear, the vertical slide would be moved up and down for every re-entrant surface that happened to be about the profile of the die.

The upper end of shaft 545 is provided with an enlarged head 550 in which is formed a guideway 551, Figure 15, for receiving a pin carrying block 552. The pin or stud 553 carried by the block is connected by link 554 to the ratchet arm 555. The ratchet arm is pivoted for free rotation on the reduced end 556 of the elevating screw 472. The other end of the arm 555 has pawls 557 and 558 pivotally mounted on the top and bottom thereof, as more particularly shown in Figures 16 and 17. The pawl 557 has a tooth 559 for engaging ratchet teeth 560 formed on the ratchet wheel 561. A spring pressed ball 562 acts on a depending lug 563 of the pawl 557 to normally maintain the pawl tooth out of engagement with the ratchet wheel.

The pawl 557 also carries a second depending lug 564 which is acted upon by a plunger 565 to move the tooth 559 into engagement with its ratchet wheel. Plunger 565 is reciprocably mounted in a bore 566 which is formed in the arm 555 and is in constant communication with an annular groove 567 formed on the reduced portion 556 of the elevating screw as shown in Figure 6. This groove is interconnected with a second annular groove 568 by an axial bore 569 formed in the portion 556. Surrounding this groove is a fixed sleeve 570 to which the channel 571 is so connected as to be in constant communication with groove 568. The result of this is that when fluid pressure is delivered to channel 571 it will flow through the interconnecting grooves to the bore 566 and cause the plunger 565 to effect and maintain engagement between the pawl tooth 559 and the ratchet wheel 560. This engagement will be maintained regardless of relative movement between the parts because of the annular grooves 567 and 568.

The teeth on the ratchet wheel 561 and the tooth 559 are so constructed as to cause rotation of the elevating screw in one direction. The pawl 558 is utilized for effecting rotation of the screw in the opposite direction and is of similar construction except that the teeth 572 thereon point in opposite direction to the teeth on wheel 561. This pawl is also normally maintained out of engagement with its ratchet wheel by a spring pressed ball 573 and is moved into engagement by a plunger 574. This plunger is connected in a similar manner to an annular groove 575 which is inter-connected by a longitudinal bore 576 to a second annular groove 577 formed in the portion 556. The sleeve 570 carries a second channel 578, the end of which is in constant communication with channel 577. The channels 571 and 578 extend to the vertical feed control valve 477 as more particularly shown in Figure 43. The details of the valve are shown in Figures 42 and 27. This valve has a kerf 579 cut in the periphery thereof which has a V-shaped bottom 580, Figure 42, and when the plunger 478 is in a neutral position this kerf interconnects the pressure port 581 with the exhaust port 582.

This plunger is also provided with a second kerf 583 in the same plane with the previous one, but this kerf is interconnected by a radial bore 584 with a longitudinal bore 585 which is open at one end to reservoir. When the valve plunger is in a neutral position the kerf 583 interconnects ports 586 and 587 to reservoir. These ports are connected respectively to channels 578 and 571. It will thus be seen that when the vertical feed control valve is in a neutral position that both of the ratchet plungers are in a retracted position, due to the fact that ports 586 and 587 are connected to the return channel 585. Upon rotation of the valve plunger 478 in a clockwise direction from that shown in Figure 42, the pressure channel 581 will be connected to port 587 while port 586 will still be connected to the return channel 585. This will cause advance of one of the ratchet pawls into engagement with its respective ratchet wheel and place the same in condition for actuation by the tracer head motor. Rotation of the valve plunger 478 in a counter-clockwise direction from the position shown in Figure 48 will connect the pressure line 581 with port 586 and connect the other port 587 to return channel 585 thereby effecting retraction of one plunger and advance of the other plunger. It is thus possible by means of this vertical feed control valve to predetermine the direction of feed that will be imparted by the tracer head motor and regardless of the direction of rotation thereof because of the inherent nature of the ratchet mechanism.

Means have been provided for varying the eccentric relation of the pin 553 in order to vary the increment of the vertical feed. To this end the block 552 which carries the pin 553 is provided with a diametrical slot 588 upon one side of which are formed rack teeth 589, Figure 15. A pinion 590 intermeshes with these rack teeth and this pinion is secured to a shaft 591 mounted in a longitudinal bore 592 formed in the shaft 545. Shaft 545 has a cross bore containing a pin 593 which interconnects the interior shaft 591 with an external sleeve 594 having peripheral rack teeth 595. The shaft 545 has a spiral slot in which the pin 593 rides so that upon movement of the pin 593 axially of the shaft 545 it will effect rotation of the interior shaft 591 and thereby movement of the pin 553 through intermeshing of the pinion 588 with the rack teeth 589. A spur gear 596 is mounted on the end of a horizontal shaft 597 in intermeshing relation with the peripheral rack teeth 594 so that upon rotation of the shaft 597 the eccentricity of the pin 553 will be varied.

The shaft 597 extends through the vertical slide housing at the front of the machine and is there provided with an operating handle 598 which is pivotally connected by pin 599 to the end of the shaft. The lever arm 598 is provided with a detent 600 adapted to engage teeth 601 formed on the face of the fixed annular ring 602. A spring pressed ball 603 normally maintains the detent 600 in engagement with the teeth and thereby locks the eccentric pin 553 in its various eccentric positions. Indicator mechanism may be associated with this device to indicate the amount of vertical feed for various eccentric positions of the pin 553. It will thus be seen that in rotary die-sinking operations that in addition to the previous settings which the operator will make for plane profiling operations, it is also necessary to set the vertical feed control valve for either up or down feed as desired; and also set the control lever 598 for the amount of vertical feed desired for each rotation of the work.

*Neutralizing valve*

In performing die-sinking operations by the profiling method, the tracer controls the table slide and cross slide while the downward movement is more or less positively effected by the ratchet mechanism with the result that danger exists when the bottom of the die is reached, because there is no means responsive to excessive end pressure on the tracer to relieve this condition or in other words to stop the vertical feed. When the tracer is moved endwise by such a condition, the tracer controlled valve plunger 247 is moved to such an extent that a high pressure will be created in channel 259 due to disconnection of this channel from the exhaust port 249 by the valve spool 248, while the pressure in channel 258 will drop to about atmospheric pressure due to the connection of that channel with the exhaust port 249. It will thus be seen that abnormal deflection of the tracer in the form of axial movement will cause this pressure differential between channels 258 and 259 and advantage is taken of this condition to actuate a neutralizing or safety valve 604 which has a port 605 at one end connected by channel 606 to line 259 and a port 607 at the other end connected by channel 608 to line 258. Thus opposite ends of the neutralizing valve plunger 609 are subjected to the pressures respectively in lines 259 and 258.

In addition, a spring 610 is inserted in one end of the valve to provide additional bias to maintain the valve normally in the position shown in Figures 30 and 43. When in this position, a cannelure 611 formed on the valve plunger interconnects pressure port 612 with port 613 which is connected by line 581 to the vertical feed control valve. Pressure is supplied to the port 612 through a branch line 614 of channel 298 which channel receives the full discharge from pump 288 as previously described in connection with Figure 44. Therefore, during normal operation of the machine, pressure will be connected to the vertical feed valve, and if this valve interconnects the pressure line with either ratchet, a vertical feeding movement will take place; but if abnormal end pressure on the tracer 57 shifts the plunger 247 to an over-deflected position to cause an abnormal rise in pressure in channel 259 and thereby a shifting of the neutralizing valve plunger 609 to the left, it will close the pressure port 612, and interconnect port 613 with exhaust port 615 thereby immediately relieving the pressure on which every ratchet plunger is effective at the time.

*Die-sinking by reciprocating cycle method*

The machine may also be operated on a reciprocating cycle method rather than the rotary method just described, and to this end the machine will be set up as follows. The vertical feed control valve will be moved to a "neutral" position, the cycle control valve will be moved to a "reciprocate" position which will position the valve plunger in the position shown in Figure 43; and the tracer engagement selector lever will be moved to "vertical" position. The effect of all this is to disconnect the automatic vertical feed from the tracer head motor and interconnect the vertical cylinder with the secondary valve in the place of the tracer head motor so that the secondary valve will now control the flow to the feed line and to the vertical cylinder. This means that deflection of the tracer will now instead of causing rotary movement of the tracer head cause vertical movement of the tracer and cutter up and down toward and from the work and pattern.

The port 361 of the engaging control valve is now connected through line 362 and branch line 616 to port 617 of the cycle control valve, as shown in section 42' of this valve, Figure 43. The port 617 is connected by the cross bore 367 to reservoir port 618 so that the pressure on the left end of the engaging valve will immediately drop, causing shifting of the valve to the left in which position it will remain. The result of this is that channels 353 and 354 are now separately connected to the secondary valve ports 380 and 384. The channels 353 and 354 which were previously connected to channels 273 and 274 are now disconnected therefrom, due to the fact that the cross bores 349 and 350 are out of registry with their respective ports 351 and 352. The channels 273 and 274 will be interconnected with one another, due to the groove 344 being moved to the position shown in Figure 28. The channels 353 and 354 will be interconnected to channels 619 and 620 by the cross bores 621 and 622 formed in the cycle control valve plunger as shown in Figures 38 and 41. These channels are connected to the lower end of the piston rod 79, as shown in Figure 18, the channel 619 being connected to the axial bore 623 which terminates in a port 624 for supplying pressure to the upper end of the vertical cylinder to cause upward movement of the vertical slide and the channel 620 is connected to the port 625 which terminates in port 626 to cause downward movement of the vertical slide. This is true because the piston is stationary. The position of the other cross bores in the cycle control valve does not change any of the connections previously established thereby when in "profile" position.

When the various valves are thus positioned to yield the reciprocating cycle, the vertical slide immediately moves down even although the feed control lever is set at zero because even in the zero position of this lever the pump 277 is still delivering a small flow to valve 275 and part of this delivery will go to the vertical cylinder to cause the same to move slowly down at which time the tracer is undeflected.

If the tracer does not contact the pattern on its way down, but comes down at one side of the pattern for instance, then the tracer may be deflected by hand to effect engagement between tracer and pattern or the disengaging valve button may be pressed, shifting the secondary valve to such a position to cause upward movement of the tracer, and if the feed rate control lever is also moved, a feeding movement will also be obtained whereby the tracer will have a resultant angular movement up and over the pattern. The controls may now be released and the tracer will move down into engagement with the pattern and then movement of the feed control lever will cause reciprocating profiling to take place.

Upon engagement of the tracer with the pattern, the secondary valve will be moved in the usual manner and the incoming flow will be divided upon the feed line and the opposite ends of the vertical cylinder. At the end of a given stroke the operator may stop the machine and rotate the hand wheel, such as through 180 degrees to reverse the direction of movement. In rotating this hand wheel no lateral feed will be effected because the pendulum control pin is moved to its central position by stopping the machine. Therefore, if the operator desires a lateral feed at each end of the stroke, it is necessary to maintain the feed lever 227 in such a position as to insure that the pendulum control pin is slightly eccentric so that as the hand wheel is rotated a lateral feed movement will be imparted to the slides. The amount of lateral indexing effected will depend upon the rate of rotation of the hand wheel because the slides will be moving throughout this movement.

*Automatic reciprocating cycle*

The reciprocating method just described may be carried out automatically by moving the cycle control valve to its third position marked "automatic reciprocate" and even although the cross bores in the cycle control valve shown in Figures 38, 39, 40, 41 and 42 are moved angularly, no operating change will be effected thereby. The cross bore 627 in Figure 36 will be moved to a position to interconnect channel 628 with channel 629 and the cross bore 630 shown in Figure 37 will be moved to a position to interconnect channel 631 with the pressure line 463. This means that fluid will now flow from the main supply line 267 through channel 463, cross bore 630, channel 631 to the motor reversing valve 453. The fluid will flow through this valve to branch 450 and line 273 to one motor port, the returning fluid from the motor passing through channel 274, branch 451, valve 452, channel 628, cross bore 627, channel 629 to the port 632 of the progression feed rate control valve 337. The port 632 communicates with an annular groove 633 formed in the valve sleeve 337 as shown in Figures 28 and 32. The annular groove 633 has a somewhat oval-shaped opening 634, Figure 28, which as shown in Figure 42 extends a little less than half way around the periphery of the sleeve 337. The rotatable valve member 635 mounted in the sleeve 337 and rotatable by the handle 636 has a peripheral groove 637 which extends around the periphery of the valve slide more than half of the way so that when the valve is in a closed position the ends of the groove aline with the ends of the groove 634. The groove 637 is only a few thousandths of an inch deep so that upon rotation of the plunger 635 the fluid will flow through this confined space to a pair of annular grooves 638 and 639. This is a form of hydraulic resistance and controls the rate of rotation of the tracer head motor. The annular grooves 638 and 639 are connected by radial bores 640 and 641 to an axial bore 642 which opens to the interior of the machine and therefore is a reservoir channel.

The only other new connection established by the cycle control valve is that shown in Figure 35 in which the port 459 connected to the line 473 is connected by the axial groove 643 to the exhaust port 457 as shown in Figure 34. This will relieve the pressure on the pin 474, Figure 7, thereby permitting the interference block 475 to be moved into position by the spring pressed ball 476. The tracer head carries a ring 644 which is locked in various circumferential positions by the lock collar 645. This ring has an enlarged portion throughout one-half of its periphery, thereby forming two shoulders adapted to engage the interference block 475. Therefore, when fluid pressure is admitted to channel 631 by the cross bore 630 in the cycle control valve, as shown in Figure 37, the motor 272 will be rotated until one of these shoulders engages the interference block 475. This will hold the tracer head in a given position throughout one stroke of the reciprocating cycle.

Automatic reversal of the cutting stroke is performed by providing a pair of standards 646 and 647 which are adapted to be detachably connected to the rear of the table for movement therewith, each standard carrying a vertically adjustable rod 648 which has integral therewith a horizontal arm 649 positionable in the path of the tracer so that after passing beyond the limits of the work the side of the tracer button 57 will engage the arm 649. This will cause overdeflection of the tracer in such a manner as to cause the vertical slide to move upward.

The ram 54 has a bracket 650, Figure 3, in which is mounted a pair of verticaly adjustable rods 651 and 652, the rod 651 carrying a head 653 on the lower end thereof. These rods are adapted to act upon a valve mechanism mounted vertically in a housing 654 carried by the vertical slide. The axis of this valve is in direct alignment with the rod 652 so that upon upward movement of the vertical slide the valve will be moved downward in its housing. A pivoted arm 655 is carried by the upper end of the housing 654 and projects laterally therefrom for inter-engagement with the head 653 of the rod 651 so that upon downward movement of the vertical slide the arm 655 will contact the head 653 and also move the valve plunger downward. It will thus be seen that at either the upper limit or lower limit of movement of the vertical slide the valve plunger is moved in the same direction.

The plunger 656 of this valve is more particularly shown in Figure 43 and has a cannelure 657 which normally interconnects port 658 with exhaust port 659. The port 658 communicates with a cylinder 660 having a ratchet plunger 661 reciprocably mounted therein. The valve sleeve 662 terminates short of the pressure port 663 so that fluid pressure always exists in the lower end of the valve housing. This pressure port is connected by a branch 664 to the branch line 530 connected to the exhaust from the main feed rate control valve. Since the lower end of the valve housing is always supplied with pressure, there is a constant urge on the end of the plunger 656 to move the same upward which is limited by the arm 655. The plunger has an axial bore 665 which terminates in a pair of radial bores 666, thereby maintaining a constant supply of pressure in the annular groove 667. This groove communicates with the end of cylinder 668 which contains the locking plunger 669. This groove also in the normal position of the plunger communicates with cylinder 670 which has the return plunger 671 reciprocably mounted therein. Upon downward movement of the plunger 656 the pressure groove 667 is connected to the cylinder 668 causing outward movement of the ratchet plunger 661 and rotation of the ratchet pawl 672 which engages ratchet teeth 673 to rotate the two reversing valves 452 and 453, thereby changing the pressure connections to lines 273 and 274 and reverse rotation of the tracer head motor. Rotation of the tracer head motor will continue until the other shoulder engages the interlock pin 475 thereby changing the direction of feed through an angle of approximately 180 degrees. The rate of this rotation will be controlled by the progression feed rate control valve plunger 337 previously described, and this rate will also determine the amount of lateral feed or indexing in an automatic manner. Upon upward movement of the plunger 656 pressure connection will be re-established to plunger 671 and the ratchet will be returned to its starting position. It is thus possible by providing the arms 649 over the table to cause the vertical slide to execute an upward movement or a downward movement to effect this lateral indexing or feed.

Another advantage of the vertical stops is that they may be utilized to trip from a given plane. By this is meant that in reciprocating across a vertical piece that is to be finished substantially horizontal but has a triangular outline for instance, it will be evident that the actual length of each successive cutting stroke will decrease if the indexing is progressing toward the apex. If the length of each stroke were the same, it will be apparent that a lesser and lesser fractional part of the stroke is actually utilized for cutting. If now the stop rod 652 is set to trip at a predetermined given plane below said horizontal plane, it will be obvious that as the tracer button passes over the edge of the work and descends to the given plane, that a reversal will take place causing the tracer and cutter to rise and return across the surface again to the other side where the same operation will be repeated. Thus by setting one stop rod the length of each cutting stroke will be in accordance with the actual length of the surface to be finished regardless of how the outline of the pattern may vary. The reverse of this is also true such as when cutting a depression at which time the other stop rod 651 would be used.

In summarizing it is desired to call attention to the fact that flexible pipe connections are assumed to be used wherever the same may be necessary to effect hydraulic connections between relatively movable parts. The flexible pipe 684, Figures 3, 6 and 11, is utilized to return the fluid which gathers in the bottom of the slide 56 to the lower reservoir.

A safety interlock has been provided to slow the feed rate if the load on the cutter gets too great and comprises a fluid operable plunger 685, Figures 23 and 43, which is connected by channel 686 to the supply line 158 of the spindle motor so that when the supply pressure rises beyond a predetermined amount it causes the delivery of pump 277 to be reduced thereby reducing the feed rate.

It is also to be noted that the standards 646 may be relatively adjusted with respect to the table by loosening the clamp screw 700, Figure 3, by which the standards are secured in place on the dove-tail guide 701. Thus the arms or bars 649 may be variously positioned horizontally and vertically. These arms may be utilized to change the profile artificially as shown in Figure 51 where it is desired to finish one portion such as 702 first as by the profiling die-sinking method where the cutter traverses around the outline and is incrementally fed downward; and to finish the other portion such as 703 by a reciprocating method. The bar may be placed across the die at the point of intersection between the two portions as shown in full lines in Figure 51 to finish portion 702 and then moved to the dotted line position to finish the portion.

There has thus been provided an improved pattern controlled milling machine which may be utilized in a number of different ways for profiling and die-sinking purposes, whereby the machine may be selectively set up for performing any particular profiling or die-sinking operation in the most efficient and time-saving manner.

What is claimed is:

1. In a machine tool having a plurality of translatable slides the combination of fluid operable means for translating the slides, a common rate and direction control member therefor, a first fluid operable means for positioning the member to determine the rate of movement of a selected slide, and a second fluid operable device for positioning the control member to determine the direction of slide movement.

2. A milling machine having a table and a ram translatable in directions normal to each other, independent variable delivery pumps for determining movement of each slide, each pump having a rate control pendulum associated therewith, a control pin interconnecting the pendulums for individual or joint movement, and fluid operable means for shifting the pin in opposite directions to increase or decrease the rate of pump delivery.

3. In a milling machine the combination of a plurality of fluid operable slides movable in paths at right angles to one another, individual variable delivery pumps for supplying fluid to each slide, each pump having a pendulum adjustable to determine the rate and direction of slide movement, said pendulum having a neutral position whereby all slides will be stationary, and fluid operable means for shifting the pendulum from the neutral position to cause movement of a slide or slides, and additional fluid operable means effective on the pendulums to proportion the delivery of the two pumps to determine the resultant direction produced by the two slides.

4. A milling machine having a plurality of slides movable in angular directions relative to one another, separate fluid operable means for effecting movement of each slide including a variable delivery pump, individual variators for the pumps, a common rate and direction control member for the variators, said member having a neutral position for reducing the delivery of the pumps to zero, a first fluid operable motor for moving the member radially from said position for increasing the delivery of said pumps and thereby determining the resultant rate of movement of the slides, and a second fluid operable motor for moving the member circumferentially about said neutral position for determining the direction of resultant movement of the slides.

5. A milling machine having a plurality of slides, fluid operable means for effecting translation thereof including a fluid motor and a variable delivery pump for each slide, a rate control lever associated with each pump, a common power actuated pin for shifting said control levers, a rectilinear guide for said pin, means to rotate the guide about a fixed center for determining the direction of movement of the pin and thereby the direction of movement of the slides, and means to move the pin longitudinally of the guide to control the rate of resultant movement of the slides in a given direction.

6. In a milling machine a slidable carriage, a rotatable cutter carried by said carriage, a work table movable relative to said carriage and provided with a master, a tracer carried by said carriage and in contact with said master, fluid operable motors for moving said carriage and table, variable displacement pumps for controlling said motors, a primary valve operated by said tracer, a secondary valve, a pilot circuit controlled by the primary valve for determining the position of the secondary valve, fluid operable means controlled by said secondary valve for adjusting the proportionate displacement of said variable delivery pumps and thereby the relative feeding movement between cutter and work, and additional means for controlling the rate of said movement.

7. In a milling machine a slidable carriage, a rotatable cutter carried by said carriage, a slidable work table provided with a master, a tracer carried by said carriage and in contact with said master, individual fluid motors for actuating said carriage and work table, individual pumps for supplying fluid to said motors, said pumps being variable to control the relative rates of movement of the parts, and a fluid control circuit for said pumps including a piston operatively connected for joint or several pump adjustment, a secondary valve operatively connected for controlling movement of the piston, and a primary valve operatively connected to said tracer for controlling the position of the secondary valve and thereby the relative motion between said carriage and said work table to direct said cutter in the outline of said master.

8. In a milling machine a slidable carriage, a rotatable cutter carried by said carriage, a work table slidable crosswise of the carriage and provided with a master, a tracer carried by said carriage for contacting the master, fluid operable motors for transmitting motion to said carriage and table, individual variable delivery pumps connected in closed circuit with the respective motors, a primary valve operated by said tracer, a secondary valve operated by said primary valve, a fluid circuit controlled by said secondary valve, fluid operable means in the circuit for varying the ratio of pump displacements to determine the resultant relative movement of the table and carriage, and additional means for jointly adjusting the pumps to determine the rate of resultant movement by the secondary control circuit for controlling.

9. The combination in an automatic profile milling machine of a pair of variable displacement pumps for determining relative movement between the cutter and work, a first fluid operable mechanism for proportioning the delivery of said pumps relative to one another to determine the resultant direction of said movement, a second fluid operable mechanism for simultaneously varying the displacement of said pumps without disturbing the proportion therebetween, a tracer controlled mechanism operatively connected for controlling the first named mechanism, and manually operated means connected for controlling the second named mechanism.

10. In a device for remotely controlling the position of a member, the combination of individual means for producing pressures at opposite ends of the member, adjustable valve mechanism for controlling said pressures and normally positionable to hold said member at rest, means to vary the volume of flow from one of said pressure producing means and thereby create a pressure differential causing movement of the member, and means in said valve mechanism movable in response to said pressure differential to readjust said pressures in a manner to stop the movement of the member.

11. In a mechanism of the class described, a pressure cylinder having a part therein subjectable to the pressure at opposite ends of the cylinder, a supply channel for delivering fluid to one end of the cylinder, fluid resistance means for variably impeding the flow of fluid from the channel to control the pressure therein, means creating an opposing pressure at the opposite end of said cylinder, and means responsive to volumetric changes in the flow in the supply channel to vary said opposing pressure.

12. In a control mechanism for a movable part, the combination of opposed piston portions connected to the part, pressure chambers containing said portions, a first channel connected to one chamber, means to maintain a constant volumetric flow in said channel, a second channel connected to the other chamber for delivering pressure fluid thereto, fluid resistance means for controlling the escape of fluid from said channels and thereby the respective pressures therein, means to vary the volume of flow in one channel and thereby disturb the ratio of the opposing pressures to cause movement of the part, and means responsive to movement of the part for automatically readjusting the opposed pressures to stop movement of the part.

13. In a mechanism for controlling the movement of a part from a distant controller, the combination of a fluid channel extending from the controller to the part, means to maintain a continuous flow in the channel, means connecting the part for subjection to the fluid pressure in the channel, additional means for creating an opposing pressure upon said part, and means operative by the controller to vary the pressure in said channel relative to the opposing pressure to cause movement of the part.

14. In a machine tool having a part operatively connected for movement by a variable displacement pump, the combination of means for controlling the displacement of said pump including a fluid operable member connected for determining the displacement thereof, and thereby the rate of movement of the part, a second fluid operable member connected for controlling the direction of movement to be imparted by the pump, a source of pressure, individual channels extending therefrom to the respective control members, and a valve mechanism for distributing flow to the respective channels.

15. In a machine tool having a part operatively connected for movement by a variable displacement pump, the combination of means for controlling the output of said pump including a fluid operable member operatively connected to the pump for determining the displacement thereof and thereby the rate of movement of the part, a second fluid operable member connected for controlling the direction of movement to be imparted by the pump, a source of pressure, individual channels extending to the respective control members, a valve mechanism for distributing flow to the respective channels, and means between the source of pressure and said valve mechanism for determining actuation of said first fluid operable member to vary pump displacement.

16. In a machine tool having a fluid operable part and a variable displacement pump having a pair of ports connected for opposite actuation of the part and a displacement control pendulum, the combination of means to control said pump, said pendulum having a neutral position corresponding to zero displacement and other positions at opposite sides thereof to determine the port through which fluid is to be delivered, means to control said pendulum including a fluid operable member operatively connected to the pendulum, and means to control the position of said member by controlling rate of flow of fluid thereto.

17. In a control mechanism for a part movable rectilinearly and curvilinearly, the combination of separate fluid operable devices for moving the part in each manner, a source of fluid pressure, valve means for dividing the flow from said source to said fluid operable devices to cause individual or simultaneous movements of the part in one or both manners, and additional means to vary the flow of fluid to said valve means to vary the rate of movement.

18. In a mechanism for controlling the movement of a part, the combination of a pair of fluid channels, means connecting the part for subjection to the pressure in said channels whereby said part will be stationary when the respective pressures are in a predetermined ratio and will move when said ratio is disturbed, a fluid resistance means controlling the escape of flow from a first of said channels and thereby the pressure therein, said resistance means being responsive to pressure changes in said first channel to adjust itself automatically in such a manner as to keep said pressure constant, additional means responsive to said pressure changes in said first channel to effect a momentary inverse pressure change in the second channel to permit movement of the part in one direction or cause movement of the part in an opposite direction.

19. In a control mechanism for a fluid operable part having variable external forces acting thereon, opposed piston elements for moving said part and maintain it at rest against said forces, means to control pressure on said elements including a main source of pressure, a pair of branch channels extending therefrom, individual pumps in the branch channels super-charged from the main source, one of said pumps effecting a constant delivery to a first of said piston elements, a control valve mechanism for determining the pressure on said first element, means connecting the other pump to the second of said piston elements, a second control valve for determining the pressure on said second element, and means responsive to pressure changes on the one of said elements to control both of said valve mechanisms.

20. A pattern controlled milling machine for reproducing work from a pattern comprising a cutter, a power circuit for controlling the direction of resultant feed movement between cutter and work in two right angular paths, or in any radial direction in the four quadrants formed by the intersection of said paths including fluid operable motors, individual variable displacement pumps connected to the respective motors, a common control element for said pumps, and tracer controlled means for automatically positioning said element to cause distribution of fluid by either pump to its motor for movement in right angular paths, or simultaneous distribution of fluid by both pumps to their respective motors for movement in the quadrantal paths.

21. A pattern controlled milling machine for reproducing work from a pattern comprising a cutter, a power circuit for controlling the direction of resultant feed movement between cutter and work in two right angular paths, or in any radial direction in the four quadrants formed by the intersection of said paths, including fluid operable motors, individual variable displacement pumps for the motors, a pair of channels connecting each pump with its motor, a rotatable element having a pin positionable eccentric to the axis of said element, means connecting the pin to said pumps for controlling the displacement thereof, and tracer controlled means for rotatably positioning the pin to cause delivery of fluid by one pump to its motor, or simultaneous delivery by both pumps to their respective motors to effect a feed movement selectively in the right angular paths or in the quadrantal paths.

22. A pattern controlled milling machine for reproducing work from a pattern comprising a cutter, a power circuit for controlling the direction of resultant feed movement between cutter and work in right angular paths or in any radial direction in the four quadrants formed by the intersection of said paths including a plurality of fluid operable motors, individual sources of pressure for said motors, means coupling the motors to their respective sources of pressure for several or simultaneous actuation thereby, power actuable means for controlling operation of said coupling means, and tracer mechanism for controlling energization of said power actuable means, and thereby the direction of the resultant feed movement by the motors.

23. A pattern controlled milling machine for reproducing work from a pattern comprising a cutter, a power circuit for controlling the direction of resultant feed movement between cutter and work in right angular paths or in any radial direction in the four quadrants formed by the intersection of said paths, including a pair of fluid operable motors, individual variable displacement pumps for said motors, a common prime mover for the pumps, parallel channels connecting each motor to its pump in a closed circuit, a pump displacement control mechanism effective to cause operation of the motors individually or jointly, and tracer control means for automatically adjusting said mechanism to cause operation of the motors severally for movement in the right angular paths, and jointly for movement in the quadrantal paths, the resultant rate of movement effected in any path being the same.

24. A pattern controlled milling machine for reproducing work from a pattern comprising a cutter, a power circuit for controlling the direction of resultant feed movement between cutter and work in right angular paths or in any radial direction in the four quadrants formed by the intersection of said paths, including a plurality of slides, fluid operable motors coupled to each slide having individual variable displacement pumps for supplying fluid thereto, mechanism connected to the pumps for controlling the displacement thereof either severally or simultaneously, a common prime mover for said pumps, means effective on said mechanism to vary the resultant feed rate, and tracer control means automatically effective on said mechanism to proportion the delivery of said pumps and thereby determine the path of the resultant feed movement.

25. A pattern controlled milling machine for reproducing work from a pattern comprising a cutter, a plurality of slides for effecting relative movement between the work and cutter, a power circuit for controlling the direction of resultant feed movement effected by said slides including fluid operable motors, individual variable displacement pumps connected to said motors in a closed circuit, mechanism for controlling the displacement of said pumps either individually or simultaneously, tracer mechanism including a reciprocable control member for actuating said mechanism, a tracer member adapted to contact the pattern, and fluid operable means controlled by the tracer for reciprocating said element to determine the proportion of fluid delivery by said pumps and thereby the direction of resultant feed movement between the cutter and work.

26. A pattern controlled milling machine for reproducing work from a pattern comprising a cutter, a plurality of slides for effecting relative movement between the work and cutter, said slides having individual fluid operable motors coupled thereto, individual variable displacement pumps for supplying fluid to the respective motors to cause operation thereof at variable rates and in either direction, a pump displacement control mechanism, a power circuit for controlling said mechanism to determine the direction of resultant feed movement effected by the slides including a source of pressure, a rotatable element, tracer control means for determining rotation of said element and thereby a simultaneous increase in the displacement of one pump and a decrease in the displacement of the other pump, said tracer control means including a valve having a neutral position to stop said rotation, and an operating position on either side thereof, and means to increase the rate of rotation of said element upon increase in departure of said valve from its neutral position.

27. A pattern controlled milling machine for reproducing work from a pattern including a cutter, a plurality of slides for effecting relative movement between work and cutter, fluid operable motors coupled to the individual slides, individual variable displacement pumps connected in closed circuits to the respective motors, a power circuit for controlling the proportion between the displacement of said pumps and thereby the direction of resultant feed movement between cutter and work including a rotatable member operatively connected for changing the displacement of said pumps, rotation of said element in a clockwise direction effecting a corresponding change clockwise in the angle of the resultant movement, or in a counterclockwise direction to effect a corresponding change counter-clockwise in the angle of the resultant feed movement, a source of power, a universally mounted tracer, a control valve coupled to the tracer for movement to a neutral position upon predetermined deflection thereof, and means controlled by said valve upon movement in one direction from said neutral position to effect clockwise rotation of said member, and in the other direction to effect counter-clockwise rotation of said member.

28. A pattern controlled milling machine for reproducing work from a pattern including a cutter, a plurality of slides for effecting relative movement between work and cutter, fluid operable motors coupled to the individual slides, individual variable displacement pumps connected in closed circuits to the respective motors, a power circuit for controlling the proportion between the displacement of said pumps and thereby the direction of resultant feed movement between cutter and work including a rotatable member operatively connected for changing the displacement of said pumps, rotation of said element in a clockwise direction effecting a corresponding change clockwise in the angle of the resultant movement, or in a counter-clockwise direction to effect a corresponding change counter-clockwise in the angle of the resultant feed movement, a source of power, a universally mounted tracer, a control valve coupled to the tracer for movement to a neutral position upon predetermined deflection thereof, means controlled by said valve upon movement in one direction from said neutral position to effect clockwise rotation of said member, and in the other direction to effect counter-clockwise rotation of said member, the rate of rotation of the member in either direction increasing with the amount of departure of the valve from its neutral position.

29. A pattern controlled milling machine for reproducing work from a pattern comprising a cutter, a plurality of slides for effecting relative movement between the work and cutter, fluid operable motors coupled to the slides, individual variable displacement pumps connected for operation of the motors at various rates and in opposite directions, a power circuit for controlling the displacement of said pumps in various proportions to determine thereby the direction of resultant feed movement between cutter and work including a rotatable pump displacement control member, rotation of said member in a clockwise direction effecting a corresponding change clockwise in the angle of the resultant movement, and rotation counter-clockwise effecting a corresponding change in that direction, a source of power, a universally mounted tracer, a control valve coupled to the tracer for movement to a neutral position upon predetermined deflection of the tracer, means controlled by the valve upon movement in one direction from said neutral position to effect clockwise rotation of the control member, and in the other direction from neutral to effect counter-clockwise rotation of the control member, and auxiliary means to reverse the direction of rotation effected by the valve member.

30. A pattern controlled milling machine for reproducing work from a pattern comprising a cutter, a plurality of slides movable in angularly related directions for effecting the resultant feed movement between cutter and work, individual piston and cylinder motors coupled to the slides, separate variable displacement pumps coupled to the respective cylinders at opposite ends thereof, a power control circuit for controlling the displacement of said pumps including a rotatable pump displacement control member, means coupling the member to said pumps for individual or simultaneous adjustment thereof, an additional motor for rotating said member to determine the proportion between the displacements of said pumps and thereby the actual velocities of said pistons, a source of power, and tracer control means including a universally mounted tracer arm for coupling the power for rotation of said member whereby the slide motors will be individually or jointly actuated to effect a resultant feed movement in a direction as determined by the pattern.

31. A pattern controlled milling machine for reproducing work from a pattern comprising a cutter, a plurality of slides movable in angularly related directions for effecting a resultant feed movement between cutter and work, fluid operable motors coupled to the slides and each including a piston and cylinder, separate variable displacement pumps connected to respective cylinders at opposite ends thereof, a common prime mover for said pumps, a power control circuit for determining the proportion between pump displacements including a rotatable pump displacement control member, means coupling the member to said pumps for individual or simultaneous displacement adjustment thereof, an additional motor for rotatably positioning said member, a source of power, tracer control means including a universally mounted tracer arm for coupling the power to said additional motor to effect rotation of the pump displacement control member in opposite directions whereby the slide motors will be individually or jointly actuated to effect a resultant feed movement in a direction determined by the pattern, and additional means for changing the effect produced by said tracer on said additional motor.

32. In a pattern controlled machine tool having a work support and a tool support, the combination of a single fluid operable motor for determining relative movement between the supports in one direction, a pair of fluid operable motors for determining relative movement between the supports in a plurality of directions normal to the first direction, a tracer controlled mechanism, and means controlled by said mechanism for proportioning the rate of movement effected by the single motor relative to the resultant rate of movement effected by said pair of motors.

33. In a pattern controlled machine tool having a work support and a tool support, the combination of a single fluid operable motor for determining relative movement between the supports in one direction, a pair of fluid operable motors for determining relative movement between the supports in a plurality of directions normal to the first direction, individual sources of pressure for said pair of motors, manually positionable means for proportioning the flow from said sources to said pair of motors to determine the angle of resultant movement effected thereby, and a tracer controlled mechanism including means for determining the proportion between the rate of movement effected by said single motor and the resultant rate of movement effected by said pair of motors.

34. A pattern controlled machine tool having a supporting frame, a work table mounted on said frame, a ram mounted on said frame for movement normal to the direction of movement of the table, a cutter slide carried by said ram for movement normal to the direction of movement of the table, individual fluid operable motors for the table, ram and slide, a tracer controlled mechanism, means for operatively connecting any two of said motors for control by said tracer mechanism for determining a cutting path lying in a horizontal plane or in two vertical planes normal to one another; or for operatively coupling all of said fluid operable motors to said tracer mechanism for determining a cutting path in a quadrantal vertical plane lying between said intersecting vertical planes.

35. In a machine tool of the class described having a work support and a cutter spindle, the combination of means for actuating one of said parts including a prime mover, a variable displacement hydraulic motor, a pump operable by the prime mover for supplying fluid to said motor, a transmission extending from the motor to the part and terminating in two branches, one of which has a higher speed ratio than the other, and means to utilize selectively either branch for actuation of the part by the prime mover.

36. In a machine tool of the class described having a work support and a cutter spindle, the combination of means for actuating one of said parts including a prime mover, a variable displacement hydraulic motor, a pump operable by the prime mover for supplying fluid to said motor, a transmission extending from the motor to the part to be actuated, said transmission terminating in two branches of different speed ratios, means to couple the branches selectively for actuation of the part, and means to vary the displacement of the motor and thereby the output rate of the branch being utilized.

37. In a machine tool of the class described having a work support and a cutter spindle, the combination of means for actuating one of said parts including a prime mover, a variable displacement hydraulic motor, means operable by the prime mover for supplying fluid to said motor, motion transmitting means extending from the motor to the part including a high speed branch and a relatively low speed branch, means to selectively couple the branches to the part for actuation thereof, and a throttle valve for by-passing variable quantities of fluid from the fluid supply means to reservoir to vary the speed of said motor.

38. In a milling machine having a work support and a cutter spindle, the combination of means for actuating one of said parts, including a variable displacement hydraulic motor, motion transmitting means coupling the motor to the part, said motor having a maximum displacement for yielding a minimum output rate, a constant delivery pump, means to couple the entire output of the pump to the motor to obtain said minimum rate, and means intermediate the pump and motor for by-passing variable quantities of fluid for obtaining rates below said minimum rate.

39. In a machine tool of the class described having a work support and a cutter spindle, the combination of a transmission for actuating one of said parts including a drive shaft, branch trains for selectively coupling the drive shaft to the part in different speed ratios, and means for variable rotation of the shaft including a motor having a rotatable cylinder block, gearing coupling the block to the shaft, pairs of cylinders arranged in the block side by side in radial planes, and means for charging the cylinders by pairs successively with fluid pressure to effect rotation of the shaft, and means to vary the displacement of one of the pair of cylinders relative to the other to vary the output rate.

40. In a machine tool having a cutter support and a work support, the combination of an hydraulic circuit including a main pump for effecting relative movement between the supports, a cutter spindle, means for effecting rotation of the spindle during said relative movement including a variable speed transmission, said transmission including a variable displacement hydraulic motor and a constant displacement pump for supplying fluid to said motor, and a common prime mover for actuating both of said pumps.

41. In a machine tool having a work support and a cutter spindle, the combination of means for supporting the spindle for relative movement with respect to the work support including a frame, a ram reciprocably mounted on the frame, a slide reciprocably mounted on the ram for movement normal to the direction of ram movement, a spindle journaled in the slide, a variable speed hydraulic unit carried by the ram and terminating in a rotatable member, parallel transmissions carried by the slide and operatively connected with the spindle, and motion transmitting means operable by said rotatable member and selectively connectible to the terminals of said parallel transmissions for actuation of the spindle regardless of relative movement between the slide and ram.

42. In a machine tool of the class described, the combination of a work table, a supporting frame therefor, a ram reciprocably mounted on said frame, a vertical slide carried by the ram, means for supporting a cutter spindle in said slide including a quill having means for journaling the spindle therein, a bracket carried by the quill, a transmission for the spindle including a prime mover carried by the ram, rate change gearing carried by said bracket, motion transmitting means coupling the prime mover to said gearing including a splined connection, manually operable means for adjusting the quill and bracket relative to the vertical slide for determining the position of the spindle relative to the table, and power operable means for adjusting the slide for additionally determining the position of the spindle relative to the table.

43. In a machine tool of the class described, the combination of a work table, a supporting frame therefor, a ram reciprocably mounted on said frame, a vertical slide carried by the ram, means for supporting a cutter spindle in said slide including a quill having means for journaling the spindle therein, a bracket carried by the quill, a transmission for the spindle including a prime mover carried by the ram, rate change gearing carried by said bracket, motion transmitting means coupling the prime mover to the gearing including a splined connection, manually operable means for adjusting the quill and bracket relative to the vertical slide for determining the position of the spindle relative to the table, power operable means for adjusting the slide for additionally determining the position of the spindle relative to the table, said last named means including a cylinder and piston, one of which is connected to the slide, and a servo-controlled mechanism for determining the admission of fluid to said cylinder.

44. In a machine tool of the class described, the combination of a work table, a supporting frame therefor, a ram reciprocably mounted on said frame, a vertical slide carried by the ram, means for supporting a cutter spindle in said slide including a quill having means for journaling the spindle therein, a bracket carried by the quill, a transmission for the spindle including a prime mover carried by the ram, rate change gearing carried by said bracket, motion transmitting means coupling the prime mover to the gearing including a splined connection, manually operable means for adjusting the quill and bracket relative to the vertical slide for determining the position of the spindle relative to the table, and means carried by the ram and having a sliding connection with said bracket for shifting said rate change gearing.

45. In a machine tool having a work support and a tool spindle, the combination of means for actuating one of said parts including a reversible hydraulic motor, motion transmitting means coupling the motor to said part, a constant displacement pump for supplying fluid to said motor, means in said motor for reversing the direction of movement of the part including a rotatable member, valve means for coupling the fluid output of said pump to the motor for actuation thereof, and an interlock responsive to pressure of the fluid output for preventing operation of the reverser during actuation of the spindle.

46. In a machine tool having a work support and a tool spindle, the combination of means for actuating one of said parts including a reversible hydraulic motor, motion transmitting means coupling the motor to the part, a constant displacement pump for supplying fluid to said motor, means in said motor for reversing its direction of movement including a rotatable member, means for coupling the fluid output of said pump to the motor, an interlock responsive to the pressure of the fluid supplied to the motor for preventing operation of the reverser during actuation of the part, and an additional fluid operable interlock to insure that the motor is adjusted to zero before the reversing takes place.

47. In a pattern controlled machine tool for reproducing substantially rectilinear profiles, the combination of means for supporting a work piece and a cutter for relative movement, power operable means for effecting said movement including an angularly positionable direction determinator, hydraulic means to control the position of said determinator including a tracer mechanism, a distributor valve, connections between said valve and said determinator for effecting angular adjustment clockwise or counterclockwise thereof, and fluid operable means including a control valve for positioning said distributor valve to reverse the direction of movement between the work and cutter upon completion of the profiling operation.

48. In a pattern controlled machine tool for reproducing substantially rectilinear profiles, the combination of means for supporting a work piece and a cutter for relative movement, power operable means for effecting said movement including an angularly positionable direction determinator, hydraulic means to control the position of said determinator including a tracer mechanism, a distributor valve, connections between said valve and said determinator for effecting angular adjustment clockwise or counterclockwise thereof, fluid operable means including a control valve for positioning said distributor valve to reverse the direction of movement between the work and cutter upon completion of the profiling operation, and manually operable means for effecting an intermittent feed between the parts normal to the direction of said relative movement during the reverse movement.

49. In a pattern controlled machine tool for reproducing a substantially rectilinear profile of a pattern on a work piece, the combination of a pair of slides for supporting a cutter and a work piece respectively, a pair of cylinders arranged normal to one another for moving the slides, a tracer controlled mechanism including a main valve for determining proportional distribution of fluid to the cylinders to cause relative movement between the cutter and work in accordance with the profile, additional means for positioning said valve including a fluid operable part, and a control valve therefor, manually operable at the end of the profiling operation for shifting the main valve to a position to cause a return relative movement between the cutter and work with the cutter out of engagement with the work.

50. In a pattern controlled machine tool having a cutter support and a work support, the combination of means for effecting relative movement between said supports for reproducing a pattern having a closed outline comprising a tracer engageable with the pattern, normally arranged pistons and cylinders operatively connected to the respective supports, fluid control means governed by the tracer for determining the volumetric distribution of fluid to said cylinders to cause a relative circumambience between the tracer and pattern and thereby a similar relative movement between the cutter and work, fluid operable means for effecting relative movement between the cutter and work in a direction normal to the plane of the pattern including a servo-motor control mechanism, and a ratchet mechanism automatically operable at the completion of each circumambulatory movement to operate the servo-motor mechanism.

51. In a pattern controlled machine tool having a first horizontal slide for supporting a pattern and a work piece and a second horizontal slide arranged normal to the first slide for supporting a cutter and tracer, the combination of a piston and cylinder operatively connected to the respective slides, a fluid operable control mechanism governed by the tracer for determining proportional distribution of fluid to said motors in a manner to cause a relative circumambience between the tracer and pattern, a servo-motor connected to the cutter and tracer support, and a ratchet mechanism automatically operable upon completion of each movement of the tracer about the pattern for actuating said servo-motor a predetermined amount to cause a downward feed of the cutter and tracer relative to the work and pattern.

52. In a pattern controlled machine tool having a first horizontal slide for supporting a pattern and a work piece, and a second horizontal slide arranged normal to the first slide for supporting a cutter and tracer, the combination of a piston and cylinder operatively connected to the respective slides, a fluid operable control mechanism governed by the tracer for determining proportional distribution of fluid to said motors, an additional fluid operable motor connected to the cutter and tracer support, and valve means selectively operable upon completion of each movement of the tracer about the pattern for causing the motor to effect an incremental upward or a downward relative feed movement between the cutter and work.

53. A pattern controlled machine tool having a pair of normally arranged fluid operable slides for supporting a cutter and a work piece for relative movement in any direction lying in a prescribed plane, a rotary hydraulic motor, means controlled by said motor for determining the proportional distribution of fluid for operation of said slides, control means including a tracer for governing said motor to cause said tracer and cutter to move in a circumambulatory path about a pattern, a servo-motor operatively connected for effecting relative movement between the cutter and work in a direction normal to said plane, a ratchet mechanism for operating said servo-motor, means operatively connecting said ratchet mechanism with said rotary hydraulic motor for operating said ratchet mechanism once for each revolution of the motor, said connection including lost motion means whereby said ratchet mechanism will be unaffected by re-entrant surfaces in the pattern.

54. In a pattern controlled machine tool having a first horizontal slide for supporting a pattern and a work piece, and a second horizontal slide movable normal to the first slide for supporting a cutter and tracer, each slide having a piston and cylinder operatively connected thereto, a fluid operable control mechanism governed by the tracer for determining proportional distribution of fluid to said cylinders in a manner to cause the tracer to circumambulate about the pattern, a servo-motor mechanism operatively connected for moving the cutter and tracer in a direction normal to the planes of said slides, a ratchet mechanism automatically operable upon completion of each movement of the tracer about the pattern for actuating said servo-motor a predetermined amount to cause an incremental downward feed of the cutter and tracer relative to the work and pattern, said ratchet mechanism including a ratchet wheel and a pawl, fluid operable means for maintaining engagement between the pawl and the ratchet wheel, and valve means responsive to excessive end pressure on the tracer to release the fluid pressure on said pawl and stop the downward feeding movement.

55. A pattern controlled machine tool having a cutter and a work support, the axis of said cutter lying normal to said work support, a fluid operable motor for traversing said work support, a second fluid operable motor connected for moving said cutter axially, a tracer controlled mechanism including a means for determining axial movement of the cutter in accordance with a profile during traversing movement of the table, a manually controlled member, and means operable by said member upon completion of a traversing movement of the table to reverse the flow to said first member and thereby effect a reversal in the direction of table movement, and additional means simultaneously operable by said member to effect an indexing movement between the cutter and table in a direction normal to said cutter axis.

56. A pattern controlled machine tool having a cutter and a work support, the axis of said cutter lying normal to said work support, a fluid operable motor for traversing said work support, a second fluid operable motor connected for moving said cutter axially, a tracer controlled mechanism including means for determining axial movement of the cutter in accordance with a profile during traversing movement of the table, a manually controlled member, means operable by said member upon completion of a traversing movement of the table to stop said movement of the table, manually operable means for reversing the direction of movement of the table, additional manually operable means for indexing the cutter spindle axially to increase the depth of cut whereby upon re-starting of the machine a return cut will be made over the same cutting path but at a greater depth.

57. In a pattern controlled machine tool having a work support and a cutter spindle whose axis lies normal to the plane of said support, the combination of power means for effecting relative movement therebetween in a direction parallel to the axis of said spindle, a relatively movable pattern and tracer for controlling said means, power means for effecting a second relative movement between the cutter and work support in a plane normal to the axis of said spindle, a rotatable direction determinator for said last named power means including a pointer for indicating the direction of movement in said plane, power operable means for rotating said determinator including adjustable stop means for predetermining said direction, and trip means automatically operable in response to relative movement between the parts in the first named direction to reverse said power operable means, and a second stop for limiting the reverse movement of the director to one-half of a revolution whereby the direction of relative movement of the parts in said plane will be reversed.

58. In a pattern controlled machine tool having means for supporting a cutter and tracer in operative relation to a work piece and a pattern respectively, the combination of power operable means governed by the tracer for determining relative movement between the cutter and work in two planes normal to one another, a direction determinator rotatable to different angular positions for controlling and indicating the direction of relative movement in one of said planes, fluid operable means for rotating said determinator, a fixed stop, a first abutment carried by the determinator and adjustable to contact said fixed stop to effect a prescribed direction of movement, a second abutment carried by the determinator, a reversing valve for said fluid operable means to cause reverse rotation of the determinator and engagement of the second abutment with said stop, said second abutment being positioned to limit the rotation to one-half a revolution whereby the direction of relative movement between the cutter and work will be reversed.

59. In a pattern controlled machine tool having means for supporting a cutter spindle and a tracer in operative relation to a work support and a pattern respectively, the combination of power operable means governed by the tracer for determining relative movement between the cutter spindle and the work in two planes normal to one another, a direction determinator rotatable to different angular positions for controlling and indicating the direction of relative movement in one of said planes, fluid operable means for rotating said determinator, a fixed stop, a first abutment carried by the determinator and adjustable to abut said fixed stop under influence of said fluid operable means to effect a prescribed direction of movement, a second stop carried by the determinator, a reversing valve for said fluid operable means to cause engagement of the second abutment with said stop, said second abutment being positioned to limit the rotation to an angle of 180 degrees whereby the direction of relative movement between the cutter and work will be reversed, and means trip operable upon a predetermined amount of separation in an axial direction between the cutter spindle and the work support for actuating said reversing valve.

60. In a pattern controlled machine tool having a work support and a cutter spindle, the combination of power operable means governed by a tracer in engagement with a pattern for determining advance and retraction of the cutter spindle toward and from the work support to determine a profile in accordance with the pattern, power means for effecting a relative traversing movement between the cutter spindle and the work support and including a control member angularly positionable for determining the direction of said traversing movement, fluid operable means for rotating said member in a given direction, a first means for stopping said member in a position corresponding to the direction desired, a unidirectionally operable reversing valve for said fluid operable means, a second stop means for limiting the movement of the member in a reverse direction and such amount as to reverse the direction of traverse movement between the cutter and work, and a fluid operable ratchet mechanism for actuating said reversing valve upon an abnormal retracting movement between the cutter and work support.

61. In a pattern controlled machine tool having a cutter support and a work support, the combination of means for controlling relative movement therebetween, including a pattern carried by one of said supports, power operable means for determining relative approach and retraction between the supports including a tracer engageable with said pattern for controlling said means as to rate and direction, additional power operable means for effecting a relative traversing movement between said supports including a control member having a first position for determining the direction of said traversing movement, and a second position for effecting reversal in the direction of said traversing movement, fluid operable means for oscillating said member between its two positions, a unidirectionally operable control valve for said fluid means having successive positions for alternate movement of the member from one position to the other, and means operable upon predetermined separation between the cutter support and work support to index said valve.

62. In a die-sinking machine for producing intaglio dies the combination of a tracer, a cutter, a work support, means controlled by the tracer for effecting a relative reciprocating movement between the cutter and work support, additional means controlled by the tracer for causing relative approach or retraction between the cutter and work support during said reciprocatory movement to reproduce a surface in intaglio in the work, and means trip operable upon maximum separation between the cutter and work caused by the tracer passing over the rim of the intaglio surface to reverse the direction of said reciprocatory movement and simultaneously effect a relative lateral indexing between the cutter and work support.

63. In a pattern controlled machine tool for reproducing the surface of a pattern lying substantially in a horizontal plane, the combination of a tracer for scanning said pattern by successive reciprocations and indexible cross movements, means to support a cutter and a work piece, fluid operable means under control of the tracer for causing relative approach and retraction between the cutter and the work during a reciprocating movement, reversing means effective at the end of each stroke of the reciprocating movement including trip means operable by a predetermined maximum separation between the cutter and work, and artificial means effective on the tracer at the end of each stroke for causing said predetermined separation.

64. In a pattern controlled machine tool for reproducing a surface of a pattern in relief by reciprocating scanning, the combination of a tracer engageable with the pattern, power operable means controlled by the tracer for determining relative approach or retraction between the cutter and work, additional power operable means for effecting a relative traversing movement between the cutter and work, a reverser for said last named power operable means including a trip controlled member, means responsive to movement of the tracer beyond the periphery of said relief surface to trip said member.

65. A pattern controlled machine tool for reproducing portions of a pattern surface which lie between parallel planes one end of the surface lying in one plane and the other end of the surface lying in a spaced plane, a tracer for engaging the surface, a cutter, power operable means controlled by the tracer for causing the cutter to move in similitude with the tracer, said means causing a relative traversing movement of the tracer across said surface, and a second movement normal to the first movement whereby the tracer will pass from one plane to the other, and a common means trip operable upon the tracer reaching either plane for reversing the direction of said traversing movement.

66. A pattern controlled machine tool for producing intaglio dies having steep side walls comprising a deflectible tracer and a tool support, a power circuit operatively connected for causing movement of the tool support in similitude to the tracer, including a tracer controlled mechanism for governing the action of said circuit, means to arrange said circuit whereby deflection of the tracer will cause a circumambulatory movement of the tracer around the periphery of the die to form the side walls thereof, and means to rearrange the circuit whereby deflection of the tracer will cause a relative traversing movement across the die to form the bottom wall thereof.

67. In a pattern controlled machine tool having a first horizontal slide for supporting a pattern and a work piece, and a second horizontal slide arranged for movement normal to the first slide and supporting a metal working tool and a tracer, the combination of fluid operable motors connected to the respective slides for actuation thereof, pressure fluid supply means for the motors, a fluid operable control mechanism governed by the tracer for determining proportional distribution of fluid to said motors, an additional fluid motor connected for movement of the tool and tracer toward and from the first slide, valve means for the last named motor selectively operable upon completion of each movement of the tracer about the pattern to cause a step by step upward or downward relative feed movement between the tool and work, and means to vary the length of each step.

68. In a pattern controlled machine tool having a tool support and a work support, and fluid operable means for moving said supports, the combination of a rotatable tracer head, means controlled by the angular position of said head for determining the direction of relative movement between said supports, an hydraulic motor coupled for rotation of the head, means to couple a source of fluid pressure directly to the motor to cause rotation thereof, an adjustable stop for limiting rotation of the head and thereby fixing the direction of relative movement between the tool and work, a tracer controlled mechanism carried by the head, means to couple the motor for control by said tracer mechanism, and simultaneously render said stop ineffective during control of the head by the tracer mechanism.

69. In a pattern controlled machine tool the combination of a tracer, a metal working tool, a work support, a power circuit for effecting relative movement between the tool and work support including a tracer controlled valve, a pair of channels alternately connectible to pressure by the valve in accordance with the position of the tracer, a pair of angularly related fluid operable motors operatively connected for effecting relative movement between the tool and work support in angularly related directions, an angularly positionable member for determining different proportional operation of said motors and thereby the direction of a cutting path lying in one plane, a third motor operatively connected for moving one of said parts toward and from the other and thereby determining a cutting path lying in a second plane, fluid operable means for positioning said member, and a cycle control valve for selectively connecting said pair of channels for control of said member, or for control of said third motor whereby the plane of the cutting path may be determined in accordance with the desired plane of relative movement between the tracer and pattern.

70. In a pattern controlled machine tool the combination of a tracer, a metal working tool, a work support, a power circuit operatively connected for causing relative movement of the tool in similitude to the tracer including a series of fluid operable motors, an angularly positionable part operatively connected for proportioning the rate of operation of a pair of said motors and thereby the resultant direction produced thereby, a fluid operable motor for rotating said part, a stop for limiting the angular movement of the part to thereby determine a fixed direction of movement, a pressure line and a return line, a valve mechanism for coupling said lines to the motor in a manner to cause rotation of the part against said stop, means operable at the end of said movement to reposition said valve mechanism and thereby reverse the connections to said motor, a second stop for limiting the reverse movement of the part to a semi-circle, said movement of the part causing relative movement between the tool and work in a semi-circular path whereby an indexible cross feed is effected simultaneously with a reversal.

71. In a pattern controlled machine tool the combination of a tracer, a metal working tool, a work support, a power circuit operatively connected for causing a relative movement of the tool in similitude to the tracer including a series of fluid operable motors, an angularly positionable part operatively connected for proportioning the rate of operation of a pair of said motors and thereby the resultant direction produced thereby, a fluid operable motor for rotating said part, a stop for limiting the angular movement of the part to thereby determine a fixed direction of movement, a pressure line and a return line, a valve mechanism for coupling said lines to the motor in a manner to cause rotation of the part against said stop, means operable at the end of said movement to reposition said valve mechanism and reverse the connections to said motor, a second stop for limiting the reverse movement of the part to a semi-circle, said movement of the part causing relative movement between the tool and work in a semi-circular path whereby an indexible cross feed is effected simultaneously with a reversal in the direction of the rectilinear movement, and a throttle valve in said return line for varying the time of the semi-circular movement and thereby the length of the cross feed movement.

72. In a pattern controlled machine tool the combination of a tracer, a metal working tool, a work support, a power circuit operatively connected for causing a relative movement of the tool in similitude to the tracer inclumg a series of fluid operable motors, an angularly positionable part operatively connected for proportioning the rate of operation of a pair of said motors and thereby the resultant direction produced thereby, a fluid operable motor for rotating said part, a stop for limiting the angular movement of the part to thereby determine a fixed plane of movement, a pressure line and a return line, a valve mechanism for coupling said lines to the motor in a manner to cause rotation of the part against said stop, means operable at the end of said movement to reposition said valve mechanism and thereby reverse the connections to said motor, a second stop for limiting the reverse movement of the part to a semi-circle, said movement of the part causing relative movement between the tool and work support in a semi-circular path whereby an indexible cross feed is effected simultaneously with a reversal, a throttle valve in said return line for varying the time of the semi-circular movement and thereby the length of the cross feed movement, and indicating means associated with said throttle valve for indicating the length of cross feed for each position of the valve.

73. In a pattern controlled machine tool having a tracer for scanning a pattern, a work support and a tool support mounted for relative movement, the combination of a power circuit controlled by the tracer for governing the direction of said relative movement including a power rotatable direction determinator, a motor therefor, means to couple the motor for control by the tracer whereby a closed cutting path may be effected lying in a prescribed plane, a servo-mechanism including a piston and cylinder for effecting a step by step relative movement between the tool and work in a direction normal to said plane, and means to disconnect said motor and connect the opposite ends of said cylinder for control by the tracer for effecting movement in a cutting path lying in a plane normal to said first plane, and means to render said servo mechanism ineffective during said last named connection.

74. In a pattern controlled machine tool having a work support and a tool support arranged for movement in directions normal to each other, separate fluid operable motors for actuating each support, a slide for moving the tool support transversely of the work support, a rotatable tracer head carried by the tool support, a fluid operable motor for rotating said head, a tracer controlled mechanism including a distributor valve having a pressure port, a feed port, and an additional pair of ports, a cycle control valve having means for connecting said pair of ports to the tracer head motor for control by the tracer whereby profiling operations in a horizontal plane may be automatically performed, means to move said cycle control valve to a second position for disconnecting the pair of ports from the tracer head motor and connecting them to a third motor, and simultaneously connecting the tracer head motor to the source of pressure, and means to limit the movement of the motor to a prescribed amount whereby profiling operations in a vertical plane may be automatically performed.

75. In a pattern controlled machine tool having a work support and a tool support mounted for relative movement in three directions each normal to the other, separate fluid operable motors for effecting each directional movement, a tracer mounted in a rotatable tracer head carried by one of said supports, means to support a pattern on the other support, a fluid rotatable motor coupled for angularly positioning the tracer head, means controlled by the angular position of the tracer head for determining effective proportional operation of two of said motors and thereby the direction of a cutting path lying in one plane, a servo-control mechanism connected with a third fluid operable motor for indexibly adjusting the spacing between the work support and tool support during relative movement in said plane including a fluid operable ratchet mechanism operable by the tracer head motor, a cycle control valve having a first position for coupling the tracer head motor for control by the tracer, and a second position for disconnecting the tracer head motor from control by the tracer and connecting said third fluid operable motor for control by the tracer, and fluid operable means connectible to pressure by said valve when in the second position for disconnecting said servo-mechanism from control of said third motor.

76. In a universal pattern controlled machine tool the combination with a power circuit for effecting relative movement between a tool and work in similitude to relative movement between a tracer and pattern, of control means for said circuit, including a cycle control valve having a manually operable part movable to a first position whereby the operative effect of said circuit will be a profiling operation; to a second position whereby the operative effect of said circuit will be a reciprocating cycle under manual control; or to a third position whereby the operative effect of said circuit will be an automatic reciprocating cycle.

77. A milling machine having a plurality of slides, fluid operable means for effecting translation thereof, control means therefor including a rotatable member, a control part co-axially positionable with said member and operatively connected for control of said fluid operable means to stop translation of said slides, means to move said part radially with respect to the axis of said member for initiating translation by said fluid operable means, and a hand wheel attached to said rotatable member for varying the circumferential position of said part and thereby the direction of the resultant movement of said slides.

78. In a pattern controlled machine tool having a plurality of slides, fluid operable means for effecting translation thereof, a rate control lever for each slide, a common member for controlling each lever, a rotatable tracer head for supporting said member, a first means for moving the member radially from the center of said head to shift said rate control levers, and a steering wheel attached to the tracer head having an arrow thereon lying in the plane of movement of said member for circumferentially positioning said member to control the rate of resultant movement of the slides, the direction of the resultant movement being in the direction in which the arrow points.

79. In a pattern controlled machine tool having a pattern support, a tracer, a relatively movable cutter and work support, and power means therefor, the combination of means on the pattern support selectively positionable with respect to the pattern for artificially changing the contour thereof whereby one portion of the pattern may be reproduced before another portion.

80. In a pattern controlled machine tool having a tracer and a support for a pattern, the combination of means carried by said support for altering the contour of the pattern including a bar adapted to be applied to the face of the pattern, a standard for supporting said bar, and means to adjust said standard and thereby the bar longitudinally and toward and from said support.

81. In a machine tool having a work support and a tool support, translatable in directions normal to each other, the combination of separate fluid operable means for translating each support, independent reversible variable delivery pumps for determining movement of each slide, said pumps being mounted co-axially, a co-axial prime mover for actuating said pumps, a rate control pendulum associated with each pump, a control pin extending parallel to the axis of said pumps and interconnected with the pendulums thereof for individually or jointly shifting the same.

82. In a machine tool having a work support and a tool support, the combination of a fluid operable motor connected to one of said supports, a pump having a pair of ports connected to said motor, and a control pendulum having a central position for reducing the pump displacement to zero, and means to move said pendulum in either direction from said central position to cause delivery of the pump through one port or the other to effect reversible operation of the motor, said means including a control pin operatively connected to the pendulum, a rotatable support for the pin, a radial guide for the pin, said guide terminating at the axis of rotation of the support, means to move the pin concentric with said axis to position the pendulum in its center position, and means to rotatably position said support to determine the direction of movement of the pendulum by the pin with respect to said central position.

83. In a universal pattern controlled machine tool, the combination with a work support and a tool support, and a pattern and a tracer carried by the respective suports, of a first fluid operable means for effecting relative movement between the suports in one plane, a fluid operable device having a pair of ports for determining the direction of said relative movement a second fluid operable means for effecting relative movement between the supports in a direction normal to said plane, a pair of channels, a control valve having a source of pressure connected thereto and operatively connected for control by the tracer to selectively determine the coupling of said channels to the source of pressure, and a cycle control valve for selectively connecting said channels to said pair of ports or to said second fluid operable means whereby the tracer may selectively control the formation of a profile in either one of two planes lying normal to each other.

84. In a pattern controlled machine tool, the combination of a pair of actuable members for effecting relative movement between a tool and work, of means for actuating said members including an electric motor, power connections between the motor and each of said members including individual rate control means of the stepless variety and each adjustable to a zero rate position, a tracer for following a pattern, and means operatively connecting said tracer for individual or simultaneous adjustment of said rate controllers.

85. In a milling machine, a pair of actuable members for effecting relative movement between a cutter support and a work support, a tracer and a master, individual motors for actuating said members, individual devices for supplying power to said motors and each including a rate controller, a control circuit including a power operable member operatively connected for joint or several adjustment of said rate controllers, and power amplifying means controlled by the tracer for determining power adjustment of said control member.

86. In a pattern controlled machine tool having a work support and a tool support, the combination of a first power operable mechanism for effecting relative movement between the supports in one direction, a pair of additional power operable mechanisms for producing relative movement between the supports differently than the first relative movement, and a tracer controlled mechanism for governing the operative effect produced by said mechanisms.

87. In a pattern controlled machine tool having a work support and a tool support, the combination of a first motor for determining movement between the supports in one direction, a pair of motors for determining movement between the supports in a second direction, and a tracer control mechanism for determining the proportionate rate of the two movements and thereby the direction of the resultant cutting path.

88. A pattern controlled machine tool having a bed, a work table mounted thereon, a ram supported by the bed for movement crosswise of said table, a cutter slide carried by said ram and movable thereon in a direction normal to the movement of the ram, individual power operable motors for the table, ram and slide, a tracer controlled mechanism, means for operatively connecting any two of said motors for control by said tracer mechanism for determining two planes of the cutting path; or for operatively coupling all of said motors to said tracer mechanism for determining a cutting path lying in planes other than the first and second mentioned planes.

89. In a pattern controlled machine tool having a work support and a cutter spindle, the combination of power means for effecting relative movement between the support and spindle, a relatively movable pattern tracer for controlling said means, power operable means for effecting the second direction of relative movement between the work support and spindle, a direction determinator for said last-named means including a pointer, power actuable means for moving said determinator including an adjustable stop, and trip means operable by the stop to reverse said power actuable reverse means and a second stop for limiting the amount of said reverse movement.

90. A pattern controlled machine tool including a tool support, a work support, means for effecting universal relative movement of the supports in a plane including motor elements, power circuits coupled with the motor elements for effecting joint or individual actuations thereof, a direction determinator coupled with said power circuits for varying their relative effectiveness to determine the resultant directional movement between tool and work supports, and power means for effecting a predetermined timed partial rotation of the direction determinator, whereby a correspondingly timed relative semi-circular movement will be effected between tool and work supports.

91. In a machine of the character described, the combination with supporting means for a pattern and work piece as a first pair, additional supporting means for a pattern engaging tracer and work engaging tool as a second pair, means intervening said parts whereby said pairs may be given relative movement in any direction in a plane substantially paralleling the major extent of the work piece to be operated upon, additional means intervening the parts whereby the pairs may be given an additional relative movement in a direction toward and from said plane, settable means for determining the relative direction of movement of the pairs in the first plane, and additional automatically operable means for effecting relative movement of the pairs in a direction toward and from said plane simultaneously with their relative movement in the plane.

92. In a machine of the character described, the combination with a rotatable tool, a support therefor, a work support, means intervening said supports to effect relative movement of said supports in a path in any radial direction as respects the axis of rotation of the tool, means for determining the direction of said path, and automatic means for effecting relative axial movement of the tool and work concurrently with the relative movement of said parts in the selected radial direction.

93. In a machine of the character described, the combination with a rotatable tool, a support therefor, a work support, means intervening said supports to effect relative movement of said supports in a path in any radial direction as respects the axis of rotation of the tool, means for determining the direction of said path, automatic means for effecting relative axial movement of the tool and work concurrently with the relative movement of said parts in the selected radial direction, and means for automatically effecting successive lateral displacements of said first-mentioned path, substantially as and for the purpose described.

94. In a machine of the character described, the combination with a rotatable tool, a support therefor, a work support, means intervening said supports to effect relative movement of said supports in a path in any radial direction as respects the axis of rotation of the tool, means for determining the direction of said path, automatic means for effecting relative axial movement of the tool and work concurrently with the relative movement of said parts in the selected radial direction, and a selector device for disassociating the automatic means from control of the axial movement and rendering the same effective as respects the individual components of the radial movement.

95. In a machine of the character described, the combination with a bed, a table translatable thereon, a column rising from the bed, a transversely shiftable slide movable on the column into overlying relation with the table and a second slide terminally mounted on the first and supporting a cutter and tracer for movement in a direction toward and from the table, independent hydraulic means for effecting movement of each of said parts, separate power circuits for actuation of said means, a hydraulic control circuit, and tracer operable means for varying the reaction of the hydraulic control circuit on the power circuits whereby the operation of the several independent hydraulic means is determined by said tracer.

96. The method of reproducing a three-dimensional article of irregular contour consisting in relatively moving the pattern and a follower in a peripheral orbital path, simultaneously effecting a non-reversible relative feeding of said parts in a direction transversely of the plane of said path and simultaneously effecting corresponding movements of a work piece blank and cutting tool, whereby the shape of the pattern is ultimately reproduced on the work piece blank by a continuous sinuous cutting action.

97. The process of reproducing a three-dimensional configuration of work pieces in accordance with a pattern consisting in respectively engaging the work and pattern with a tool and follower and effecting relative movement of the tool and work under guidance of the engagement between pattern and tracer in a continuous circuitous path substantially corresponding to a cross section at the moment of the pattern and simultaneously effecting a unidirectional intermittent relative feeding of the parts in a direction normal to the plane of said path.

98. A tracer controlled machine for automatic reproduction of three-dimensional patterns by a continuous sinuous cut comprising a first support for a pattern and work piece, and a second support for a tracer and tool, means intervening said supports permitting three relative directional movements thereof whereby a plane of movement may be established by any two of said directional movements and a third relative movement effected transversely with respect to said plane, means for effecting individual relative movements, a control mechanism for combining the said relative movements including means to effect successive transverse scanning movements of a pattern in combination with a movement toward and from the pattern during scanning and means to effect an arcuate relative adjustment of the parts between successive scanning paths whereby a continuous and unbroken path is reproduced on the work by the cutter.

99. A tracer controlled machine for automatic reproduction of three-dimensional patterns by a continuous sinuous cut comprising a first support for a pattern and work piece, and a second support for a tracer and tool, means intervening said supports permitting three relative directional movements thereof whereby a plane of movement may be established by any of two of said directional movements and a third relative movement effected transversely with respect to said plane, means for effecting individual relative movements, a control mechanism for combining the said relative movements including means to effect continuous relative movement of the supports in an undulating circumambient path about a contour in a selected plane, and means for simultaneously effecting an irreversible relative feeding movement of the supports in a selected direction whereby a continuous and unbroken path is reproduced on the work by the cutter.

100. A tracer controlled machine for automatic reproduction of three-dimensional patterns by a continuous sinuous cut comprising a first support for a pattern and work piece, and a second support for a tracer and tool, means intervening said supports permitting three relative directional movements thereof whereby a plane of movement may be established by any two of said directional movements and a third relative movement effected transversely with respect to said plane, power means for effecting individual relative movements, control mechanism for said power means including hydraulic control circuits intervening said power means and the tracer, and a variably positionable selector device effective in various positions differently to couple the control circuits with the tracer whereby automatic continuous reproduction by continuous path scanning or in a spiral contouring movement may be effected.

BERNARD SASSEN.